(12) United States Patent
Yang et al.

(10) Patent No.: US 9,998,951 B2
(45) Date of Patent: Jun. 12, 2018

(54) TRAINING SEQUENCE GENERATION FOR WIRELESS COMMUNICATION NETWORKS

(71) Applicant: QUALCOMM Incorporated, San Diego, CA (US)

(72) Inventors: Lin Yang, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 15/227,573

(22) Filed: Aug. 3, 2016

(65) Prior Publication Data

US 2017/0041825 A1   Feb. 9, 2017

Related U.S. Application Data

(60) Provisional application No. 62/265,314, filed on Dec. 9, 2015, provisional application No. 62/261,794, filed on Dec. 1, 2015, provisional application No. 62/257,629, filed on Nov. 19, 2015, provisional application No. 62/245,653, filed on Oct. 23, 2015, provisional application No. 62/210,942, filed on Aug. 27, 2015, provisional application No. 62/201,543, filed on Aug. 5, 2015.

(51) Int. Cl.
*H04W 28/06* (2009.01)
*H04L 27/26* (2006.01)

(52) U.S. Cl.
CPC ......... *H04W 28/065* (2013.01); *H04L 27/262* (2013.01); *H04L 27/2613* (2013.01)

(58) Field of Classification Search
None
See application file for complete search history.

(56) References Cited

FOREIGN PATENT DOCUMENTS

WO   WO-2013033231 A2   3/2013

OTHER PUBLICATIONS

International Search Report and Written Opinion—PCT/US2016/045548—ISA/EPO—dated Oct. 31, 2016.
Moon S., et al., "Considerations on LTF Sequence Design; 11-15-0584-00-00ax-considerations-on-ltf-sequence-design", IEEE Draft, 11-15-0584-00-00AX-Considerations-on-LTF-Sequence-Design, IEEE-SA Mentor, Piscataway, NJ, USA, vol. 802. 11ax, May 11, 2015 (May 11, 2015), pp. 1-14, XP068094444.
Zhang H., et al., "HE-LTF Proposal; 11-15-0349-02-00ax-he-ltf-Proposal", IEEE Draft, 11-15-0349-02-00AX-HE-LTF-Proposal, IEEE-SA Mentor, Piscataway, NJ, USA, vol. 802. 11ax, No. 2, Mar. 10, 2015 (Mar. 10, 2015), pp. 1-43, XP068082992.

*Primary Examiner* — Kevin C Harper
*Assistant Examiner* — Derrick V Rose
(74) *Attorney, Agent, or Firm* — Knobbe, Martens, Olson & Bear, LLP

(57) ABSTRACT

Methods and apparatuses for communicating over a wireless communication network using a resource unit are disclosed herein. One method includes generating a high-efficiency long training (HE-LTF) field, based on at least one of a sequence $x=[+1, +1, +1, -1, -1, -1, +1, -1, -1, +1, -1]$, a rotation pattern $C=[c1-cy]$, a sequence $M1=[c1.\!*x, c2.\!*x, c3.\!*x, c4.\!*x, c5.\!*x, c6.\!*x, c7.\!*x, c8.\!*x, c9.\!*x, c10.\!*x, c11.\!*x]$, a sequence $M2=[+1, +1, +1, +1, +1, -1, -1, +1, +1, -1, +1, -1, +1]$, and a sequence $M3=[+1, +1, +1, -1, -1, +1, -1]$. The method further includes transmitting the HE-LTF field.

22 Claims, 19 Drawing Sheets

| Bandwidth | 20MHz | | 40MHz | | 80MHz | |
|---|---|---|---|---|---|---|
| FFT Size | 256 | | 512 | | 1024 | |
| # of TAUs x Tones/TAU | 9x26 | 1x242 | 19x26 | 18x26 | 2x242 | 38x26 | 36x26 | 4x242 |
| # of tones for allocation | 234 | 242 | 494 | 468 | 484 | 988 | 936 | 968 |
| # of DC+guard+leftover | 22 | 14 | 18 | 44 | 28 | 36 | 88 | 56 |

FIG. 5

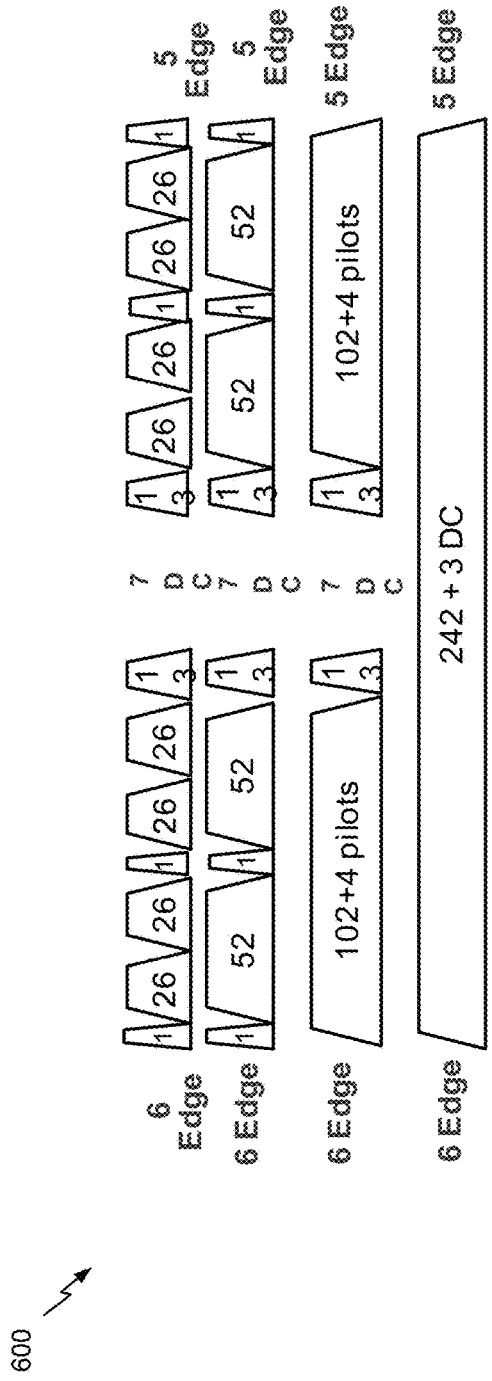

| 5.8605 | 4.892 | 4.4808 | 5.9646 | 6.2197 | 5.8605 | 4.892 | 4.4808 | 5.9646 |
|---|---|---|---|---|---|---|---|---|
| 5.3013 | | 5.7625 | | | 5.3013 | | 5.7625 | |
| 5.45 | | | | | 5.5476 | | | |
| 4.8793 | | | | | | | | |

FIG. 6C

| 5.8605 | 4.892 | 4.4808 | 5.9646 | 5.8503 | 5.8605 | 4.892 | 4.4808 | 5.9646 |
|---|---|---|---|---|---|---|---|---|
| 5.381 | | 5.991 | | | 5.381 | | 5.991 | |
| 5.662 | | | | | 5.1734 | | | |
| 5.127 | | | | | | | | |

FIG. 6D

| 3.9901 | 3.9133 | 3.9606 | 3.6176 | 3.8154 | 3.9133 | 3.9901 | 3.6176 | 3.9606 |
|---|---|---|---|---|---|---|---|---|
| 6.0523 | | 6.2031 | | | 5.7625 | | 6.2111 | |
| 5.921 | | | | | 6.1438 | | | |
| 5.872 | | | | | | | | |

FIG. 6E

| 3.9901 | 3.9133 | 3.9606 | 3.6176 | 3.8154 | 3.9901 | 3.9133 | 3.9606 | 3.6176 |
|---|---|---|---|---|---|---|---|---|
| 5.8045 | | 5.4729 | | | 5.8045 | | 5.4729 | |
| 6.541 | | | | | 5.7013 | | | |
| 5.9293 | | | | | | | | |

FIG. 6F

| 5.7625 | 4.7645 | 5.221 | 6.4636 | 6.1622 | 6.4636 | 5.221 | 4.7645 | 5.7625 |
|---|---|---|---|---|---|---|---|---|
| 6.5097 | | 6.7626 | | | 6.7626 | | 6.5097 | |
| 6.3968 | | | | | 6.3968 | | | |
| 4.8727 | | | | | | | | |

FIG. 6G

| 5.9957 | 4.4963 | 5.0742 | 5.7872 | 5.696 | 5.9957 | 4.4963 | 5.0742 | 5.7872 |
|---|---|---|---|---|---|---|---|---|
| 5.8848 | | 5.9251 | | | 5.8848 | | 5.9251 | |
| 5.6426 | | | | | 5.8272 | | | |
| 5.9036 | | | | | | | | |

FIG. 6H

| 5.9957 | 4.4963 | 5.0742 | 5.7872 | 4.1017 | 5.9957 | 4.4963 | 5.0742 | 5.7872 |
|---|---|---|---|---|---|---|---|---|
| 5.8848 | | 5.9251 | | | 5.8848 | | 5.9251 | |
| 6.1022 | | | | | 5.1062 | | | |
| 5.8854 | | | | | | | | |

FIG. 6I

| 4.5965 | 4.9798 | 4.5965 | 4.9798 | 5.696 | 4.5965 | 4.9798 | 4.5965 | 4.9798 |
|---|---|---|---|---|---|---|---|---|
| 5.0356 | | 5.4415 | | | 5.2862 | | 5.0246 | |
| 5.7188 | | | | | 5.9001 | | | |
| 5.9291 | | | | | | | | |

FIG. 6J

| 4.5965 | 4.9798 | 4.5965 | 4.9798 | 4.1017 | 4.5965 | 4.9798 | 4.5965 | 4.9798 |
|---|---|---|---|---|---|---|---|---|
| 5.0356 | | 5.4415 | | | 5.2862 | | 5.0246 | |
| 5.7188 | | | | | 5.9001 | | | |
| 5.8522 | | | | | | | | |

FIG. 6K

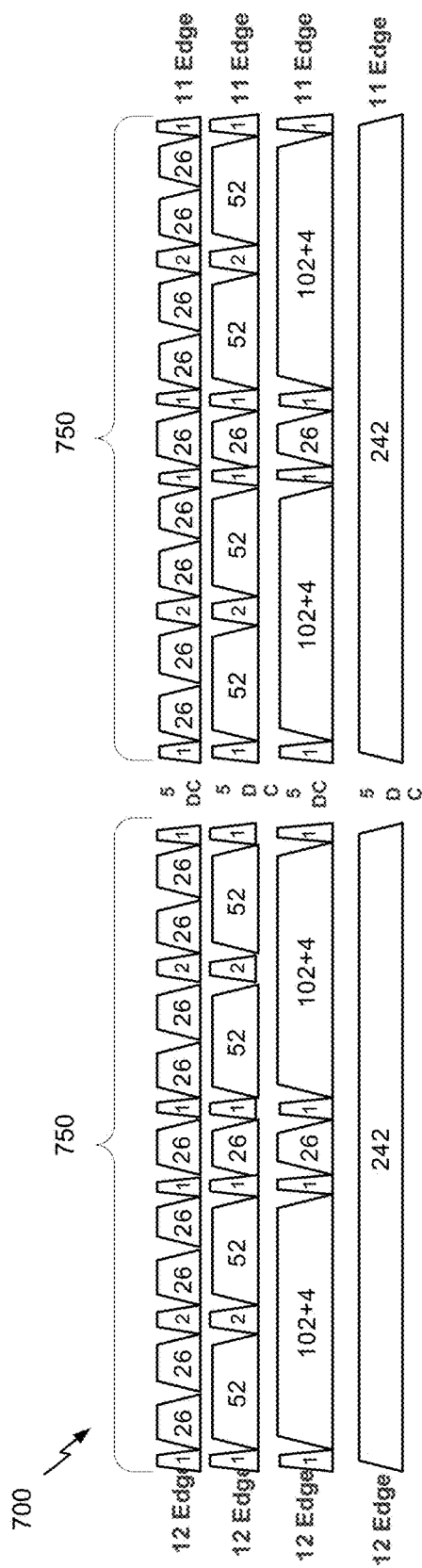

FIG. 7C

| 5.861 | 4.8932 | | 5.861 | 4.8932 | 4.4812 | 5.966 | 4.4812 | | 5.861 | | 4.4812 | 5.966 | 4.4812 | |
|---|---|---|---|---|---|---|---|---|---|---|---|---|---|---|
| 5.381 | 5.5118 | 5.966 | 5.381 | 5.5118 | 5.7625 | 5.9993 | | | 5.5118 | 5.7625 | 5.9993 | | 5.7625 | |
| 5.5986 | | | 5.8388 | | 5.2259 | | | 5.861 | | 5.2259 | | 5.7625 | 5.9993 | 6.0831 |
| | 6.0265 | | | | | | | | 6.5274 | | | | | |
| | | | | 5.3215 | | | | | | | | | | |

FIG. 7D

| 5.861 | 4.8932 | | 5.861 | 4.8932 | 4.4812 | 5.966 | 4.4812 | | 5.861 | | 4.4812 | 5.966 | 4.4812 | |
|---|---|---|---|---|---|---|---|---|---|---|---|---|---|---|
| 5.381 | 5.5118 | 5.966 | 5.381 | 5.5118 | 5.7625 | 5.9993 | | | 5.5118 | 5.7625 | 5.9993 | | 5.7625 | |
| 5.9336 | | | 5.8388 | | 5.2259 | | | 5.861 | | 5.2259 | | 5.7625 | 5.9993 | 6.0348 |
| | 5.7043 | | | | | | | | 5.7286 | | | | | |
| | | | | 5.7175 | | | | | | | | | | |

FIG. 7E

| 5.861 | 4.8932 | | 5.861 | 4.8932 | 4.4812 | 5.966 | 4.4812 | | 5.861 | | 4.4812 | 5.966 | 4.4812 | |
|---|---|---|---|---|---|---|---|---|---|---|---|---|---|---|
| 5.381 | 5.5118 | 5.966 | 5.381 | 5.5118 | 5.7625 | 5.9993 | | | 5.5118 | 5.7625 | 5.9993 | | 5.7625 | |
| 5.906 | | | 5.8388 | | 5.2259 | | | 5.861 | | 5.2259 | | 5.7625 | 5.9993 | 5.6131 |
| | 5.7726 | | | | | | | | 5.8685 | | | | | |
| | | | | 5.4693 | | | | | | | | | | |

GENERATE A HIGH-EFFICIENCY LONG TRAINING (HE-LTF) FIELD, BASED AT LEAST ONE OF A SEQUENCE X = [ +1 +1 +1 -1 -1 -1 +1 -1 -1 +1 -1 ], A ROTATION PATTERN C = [C1–CY], A SEQUENCE $M_1$ = [ C1.*X, C2.*X, C3.*X, C4.*X, C5.*X, C6.*X, C7.*X, C8.*X, C9.*X, C10.*X, C11.*X ], A SEQUENCE $M_2$ = [ +1 +1 +1 +1 +1 -1 -1 +1 +1 -1 +1 -1 +1 ], AND A SEQUENCE $M_3$ = [ +1 +1 +1 -1 -1 +1 -1 ], ACCORDING TO AT LEAST ONE OF:

[ $M_1$, 0, 0, 0, C12.*$M_1$ ] FOR TRANSMISSION OVER A 20 MHZ CHANNEL,

[C12.* $M_1$(61:121), 0, C13.* $M_1$(1:61)] FOR TRANSMISSION OVER A 20 MHZ CHANNEL,

[$M_1$, C12.*$M_1$, 0, 0, 0, 0, 0, C13.*$M_1$, C14.*$M_1$] FOR TRANSMISSION OVER A 40 MHZ CHANNEL,

[$M_1$, 0, 0, 0, C12.* $M_1$] FOR A 40 MHZ HE-LTF FOR TRANSMISSION OVER A 40 MHZ CHANNEL,

[$M_1$(121:-1:1), 0, 0, 0, C12.* $M_1$] FOR TRANSMISSION OVER A 40 MHZ CHANNEL,

[$M_1$, C12.*$M_1$, C13.*$M_1$, C14.*$M_1$, C15.*$M_2$, C16, 0, 0, 0, 0, 0, C17, C18.*$M_2$, C19.*$M_1$, C20.*$M_1$, C21.*$M_1$, C22.*$M_1$] FOR TRANSMISSION OVER AN 80 MHZ CHANNEL, AND

[C12.*$M_1$, C13.*$M_1$, C14.*$M_3$, 0, 0, 0, C15.*$M_3$, C16.*$M_1$, C17.*$M_1$] FOR TRANSMISSION OVER AN 80 MHZ CHANNEL

920

TRANSMIT A PACKET INCLUDING THE HE-LTF FIELD

FIG. 9

| | | | | |
|---|---|---|---|---|
| 242 | | | | |
| 2x242 | 5.9635 | 5.9990 | 5.9635 | 5.9990 |
| 996 | 6.2851 | | 7.2673 | |
| 2x996 | 6.8254 | | | |

FIG. 12A

| | | | | |
|---|---|---|---|---|
| 242 | | | | |
| 2x242 | 6.3222 | 6.3980 | 6.3980 | 6.3222 |
| 996 | 6.0766 | | 6.6913 | |
| 2x996 | 6.7151 | | | |

FIG. 12B

| | | | | |
|---|---|---|---|---|
| 242 | | | | |
| 2x242 | 6.3980 | 6.3222 | 6.3222 | 6.3980 |
| 996 | 6.6913 | | 6.0766 | |
| 2x996 | 6.8629 | | | |

FIG. 12C

| 242   |        |        |        |        |        |        |        |
|-------|--------|--------|--------|--------|--------|--------|--------|
| 2x242 | 6.3222 || 6.3980 || 6.3980 || 6.3222 |
| 996   | 6.0766 |||| 6.7130 |||
| 2x996 | 6.9880 |||||||

FIG. 12D

TRAINING SEQUENCE GENERATION FOR WIRELESS COMMUNICATION NETWORKS

PRIORITY CLAIM

This application claims the benefit of U.S. Provisional Application No. 62/201,543, filed Aug. 5, 2015; U.S. Provisional Application No. 62/210,942, filed Aug. 27, 2015; U.S. Provisional Application No. 62/245,653, filed Oct. 23, 2015; U.S. Provisional Application No. 62/257,629, filed Nov. 19, 2015; U.S. Provisional Application No. 62/261,794, filed Dec. 1, 2015; and U.S. Provisional Application No. 62/265,314, filed Dec. 9, 2015, each of which is hereby incorporated herein by reference in its entirety.

FIELD

Certain aspects of the present disclosure generally relate to wireless communications, and more particularly, to methods and apparatuses for generating training sequences for wireless messages.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in wireless networks.

SUMMARY

Various implementations of systems, methods and devices within the scope of the appended claims each have several aspects, no single one of which is solely responsible for the desirable attributes described herein. Without limiting the scope of the appended claims, some features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides an apparatus configured to communicate over a wireless communication network. The apparatus includes a memory that stores instructions. The apparatus further includes a processor coupled with the memory and configured to execute the instructions to generate a high-efficiency long training (HE-LTF) field according to at least one of: [Ga, c1, c2.*Ga, c3, c4, c5, c6, c7, c8, c9, c10, 0, c11, c12, c13, c14, c15, c16, c17, c18, c19.*Gb, c20, c21.*Gb] for transmission over a 40 MHz channel, wherein Ga=[+1, +1, +1, +1, −1, +1, +1, −1, −1, +1, −1, +1, −1, +1, −1, −1, +1, −1, +1, +1, +1, −1, −1, +1, +1, +1], Gb=[+1, +1, +1, +1, −1, +1, +1, −1, −1, +1, −1, +1, +1, +1, +1, +1, −1, +1, −1, −1, −1, +1, +1, −1, −1, −1], and [c1, c2, c3, c4, c5, c6, c7, c8, c9, c10, c11, c12, c13, c14, c15, c16, c17, c18, c19, c20, c21]=[+1, +1, +1, −1, +1, −1, +1, −1, −1, −1, +1, +1, −1, −1, +1, −1, +1, +1, +1, +1, −1]; [+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1] for transmission over a 40 MHz channel, wherein M2=[+1, +1, +1, +1, +1, −1, −1, +1, +1, −1, +1, −1, +1], M22=[M2(1:7), −M2(8:13)], and M23=[−M2(1:6), M2(7:13)]; [+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1] for transmission over a 40 MHz channel; [B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1], 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for transmission over a 160 MHz channel, wherein [A1, A2, A3, A4, A5]=[+1, −1, +1, +1, −1], [B1, B2, B3, B4, B5]=[+1, +1, +1, +1, +1], Sa=[+1, +1, +1, −1, +1, +1, +1, −1, −1, +1, −1, +1, −1], Sap=[+1, +1, −1, −1, +1, +1, +1, −1, +1, +1, −1, +1, −1], Sac=Sa with even indices reversed, Sapc=Sap with even indices reversed, Sb=[+1, +1, +1, −1, −1, −1, −1, +1, −1, −1, −1, +1, −1], Sbp=[+1, +1, +1, +1, −1, −1, −1, +1, −1, −1, +1, +1, −1], Sbc=Sb with even indices reversed, Sbpc=Sbp with even indices reversed, and Sc=[+1, −1, −1, −1, +1, +1, +1, +1, −1, −1, +1, +1, −1, +1]; or [B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1], 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for transmission over an 80+80 MHz channel; and The apparatus further includes a transmitter configured to transmit a packet including the HE-LTF field.

BRIEF DESCRIPTION OF THE DRAWINGS

FIG. 5 is an illustration of a 20 MHz, a 40 MHz, and an 80 MHz transmission.

FIG. 6A shows an example 20 MHz transmission, according to various embodiments.

FIG. 6B-6K show worst-case peak-to-average power ratios (PAPRs) for each resource unit in FIG. 6A, according to various embodiments.

FIG. 7A shows an example 40 MHz transmission, according to various embodiments.

FIG. 7B-7H show worst-case PAPRs for each resource unit in FIG. 7A, according to various embodiments.

FIG. 8A shows an example 80 MHz transmission, according to various embodiments.

FIG. 8B-8F show worst-case PAPRs for each resource unit in FIG. 8A, according to various embodiments.

FIG. 9 shows a flowchart for an example method of communicating over a wireless communication network.

FIG. 12A-12D show worst-case PAPRs for each resource unit in an example 160 MHz transmission, according to various embodiments.

DETAILED DESCRIPTION

Figure 1:
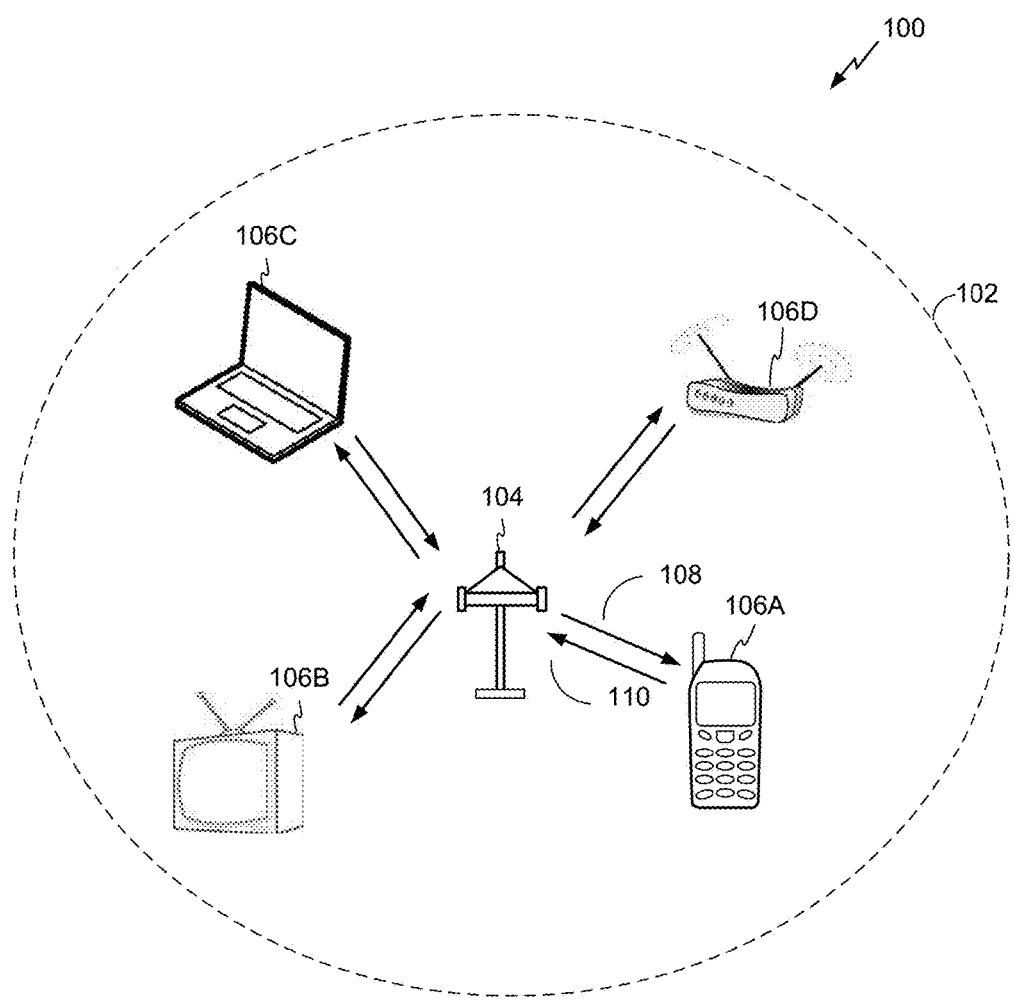
FIG. 1 illustrates an example of a wireless communication system in which aspects of the present disclosure can be employed.

Various aspects of the novel systems, apparatuses, and methods are described more fully hereinafter with reference to the accompanying drawings. The teachings of this disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency (HE) 802.11 protocol using orthogonal frequency-division multiplexing (OFDM), direct sequence spread spectrum (DSSS) communications, a combination of OFDM and DSSS communications, or other schemes.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, an STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, signals can be transmitted and received between the AP 104 and the STAs 106 in accordance with CDMA techniques. If this is the case, the wireless communication system 100 can be referred to as a CDMA system.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 may not have a central AP 104, but rather can function as a peer-to-peer network between the STAs 106. Accordingly, the functions of the AP 104 described herein can alternatively be performed by one or more of the STAs 106.

Figure 2:
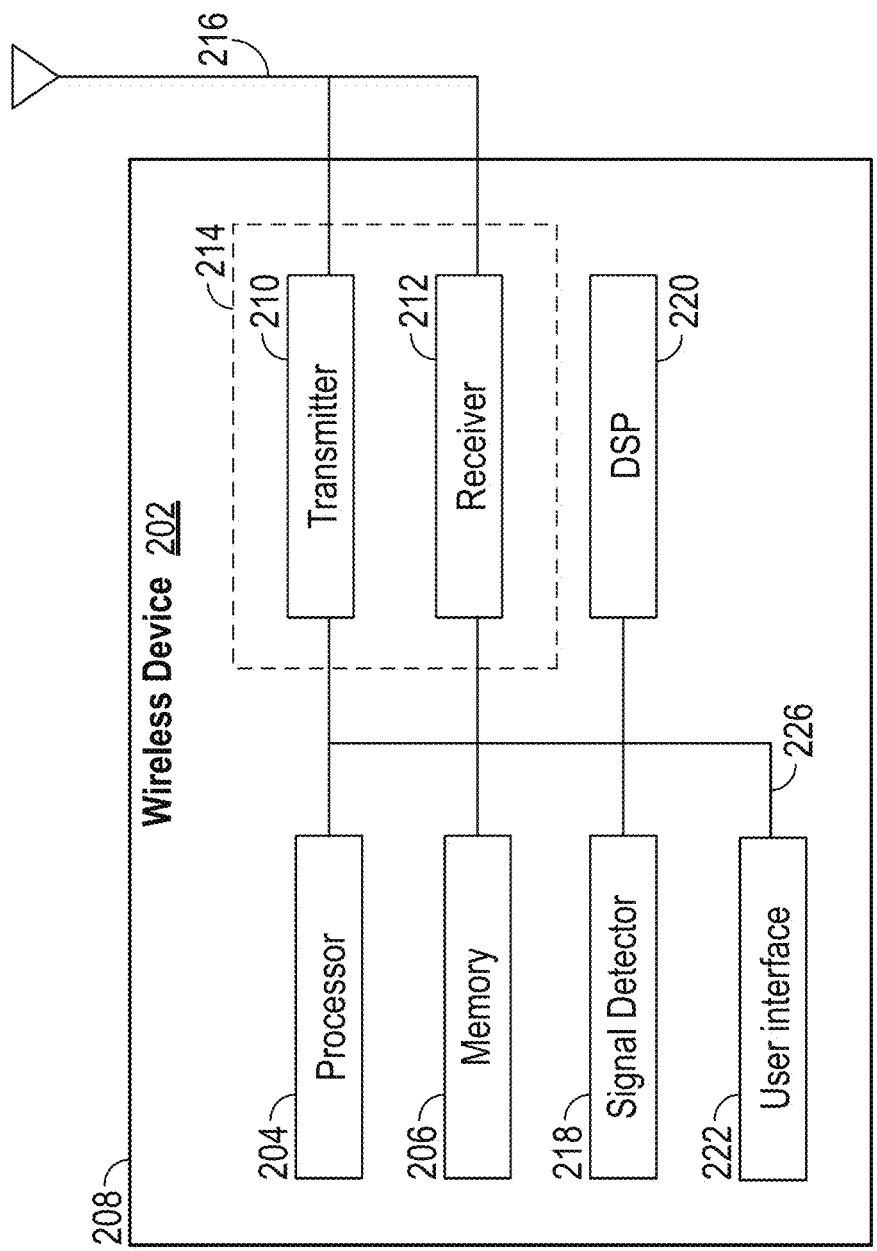
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106 transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate with each other in accessing a wireless medium. In some embodiments, the high-efficiency 802.11 protocol described herein can allow for HEW and legacy stations to interoperate according to various OFDMA tone plans (which can also be referred to as tone maps). In some embodiments, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 3.2 μs, a 2× symbol duration can be 6.4 μs, and a 4× symbol duration can be 12.8 μs. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Efficient Tone Plan Design for Multicarrier Allocation

Figure 3:
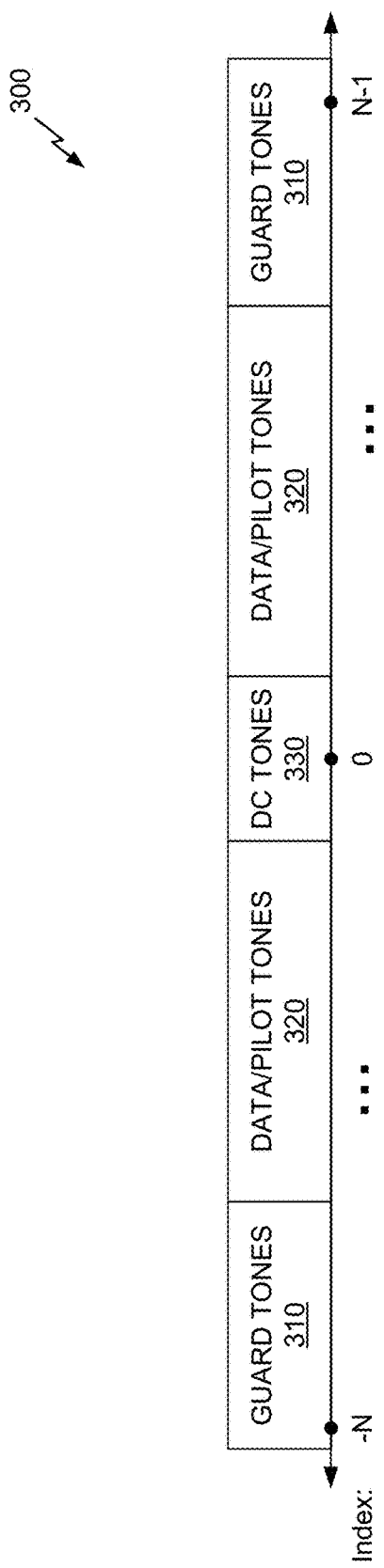
FIG. 3 shows an example 2N-tone plan, according to one embodiment.

FIG. 3 shows an example 2N-tone plan 300, according to one embodiment. In an embodiment, the tone plan 300 corresponds to OFDM tones, in the frequency domain, generated using a 2N-point FFT. The tone plan 300 includes 2N OFDM tones indexed N to N−1. The tone plan 300 includes two sets of edge tones 310, two sets of data/pilot tones 320, and a set of direct current (DC) tones 330. In various embodiments, the edge tones 310 and DC tones 330 can be null. In various embodiments, the tone plan 300 includes another suitable number of pilot tones and/or includes pilot tones at other suitable tone locations.

In some aspects, OFDMA tone plans may be provided for transmission using a 4× symbol duration, as compared to various IEEE 802.11 protocols. For example, 4× symbol duration may use a number of symbols which are each 12.8 ms in duration (whereas symbols in certain other IEEE 802.11 protocols may be 3.2 ms in duration).

In some aspects, the data/pilot tones 320 of a transmission 300 may be divided among any number of different users. For example, the data/pilot tones 320 may be divided among between one and eight users. In order to divide the data/pilot tones 320, an AP 104 or another device may signal to the various devices, indicating which devices may transmit or receive on which tones (of the data/pilot tones 320) in a particular transmission. Accordingly, systems and methods for dividing the data/pilot tones 320 may be desired, and this division may be based upon a tone plan.

A tone plan may be chosen based on a number of different characteristics. For example, it may be beneficial to have a simple tone plan, which can be consistent across most or all bandwidths. For example, an OFDMA transmission may be transmitted over 20, 40, or 80 MHz, and it may be desirable to use a tone plan that can be used for any of these bandwidths. Further, a tone plan may be simple in that it uses a smaller number of building block sizes. For example, a tone plan may contain a unit which may be referred to as a resource unit (RU) or tone allocation unit (TAU). This unit may be used to assign a particular amount of bandwidth to a particular user. For example, one user may be assigned bandwidth as a number of RUs, and the data/pilot tones 320 of a transmission may be broken up into a number of RUs. In some aspects, it may be beneficial to have a single size of RU. For example, if there were two or more sizes of RU, it may require more signaling to inform a device of the tones that are allocated to that device. In contrast, if all tones are broken up into RUs of consistent size, signaling to a device may simply require telling a device a number of RUs assigned to that device. Accordingly, using a single RU size may reduce signaling and simplify tone allocation to various devices.

A tone plan may also be chosen based on efficiency. For example, transmissions of different bandwidths (e.g., 20, 40, or 80 MHz) may have different numbers of tones. Thus, it may be beneficial to choose a RU size that leaves fewer tones leftover after the creation of the RUs. For example, if a RU was 100 tones, and if a certain transmission included 199 tones, this may leave 99 tones leftover after creating one RU. Thus, 99 tones may be considered "leftover" tones, and this may be quite inefficient. Accordingly, reducing the number of leftover tones may be beneficial. It may also be beneficial if a tone plan is used which allows for the same tone plan to be used in both UL and DL OFDMA transmissions. Further, it may be beneficial if a tone plan is configured to preserve 20 and 40 MHz boundaries, when needed. For example, it may be desirable to have a tone plan which allows each 20 or 40 MHz portion to be decoded separately from each other, rather than having allocations which are on the boundary between two different 20 or 40 MHz portions of the bandwidth. For example, it may be beneficial for interference patterns to be aligned with 20 or 40 MHz channels. Further, it may be beneficial to have channel binding, such that when a 20 MHz transmission and a 40 MHz transmission are transmitted, to create a 20 MHz "hole" in the transmission when transmitted over 80 MHz. This may allow, for example, a legacy packet to be transmitted in this unused portion of the bandwidth. Finally, it may also be advantageous to use a tone plan which provides for fixed pilot tone locations in various different transmissions, such as in different bandwidths.

Generally, a number of different implementations are presented. For example, certain implementations have been made which include multiple different building blocks, such as two or more different tone units. For example, there may be a basic tone unit (BTU), and a small tone unit (STU), which is smaller than the basic tone unit. Further, the size of the BTU itself may vary based upon the bandwidth of the transmission. In another implementation, resource blocks are used, rather than tone units. However, in some aspects, it may be beneficial to use a single resource unit RU for all bandwidths of transmissions in OFDMA.

In various embodiments, tone plans discussed herein can be used for transmission of packets including one or more short training fields (STFs), long training fields (LTF), and data fields. One example of a packet including these fields is shown in FIG. 4.

Figure 4:
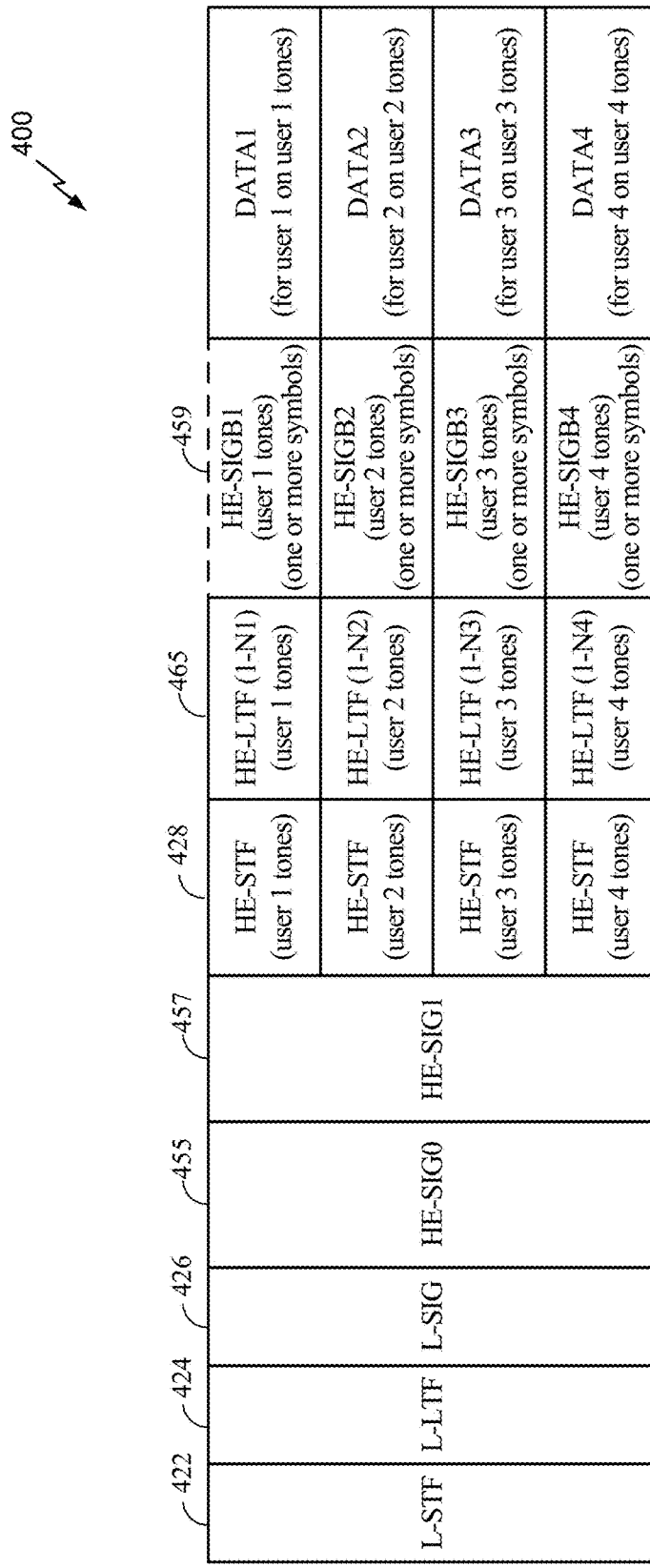
FIG. 4 illustrates an exemplary structure of a physical-layer packet which can be used to enable backward-compatible multiple access wireless communications.

FIG. 4 illustrates an exemplary structure of a physical-layer packet 400 which can be used to enable backward-compatible multiple access wireless communications. In this example physical-layer packet, a legacy preamble including an L-STF 422, L-LTF 426, and L-SIG 426 are included. In various embodiments, each of the L-STF 422, L-LTF 426, and L-SIG 426 can be transmitted using 20 MHz, and multiple copies can be transmitted for each 20 MHz of spectrum that the AP 104 (FIG. 1) uses. A person having ordinary skill in the art can appreciate that the illustrated physical-layer packet can include additional fields, fields can be rearranged, removed, and/or resized, and the contents of the fields varied.

This frame includes a short training field 422, a long training field 424, and a signal field 426. The training fields do not transmit data, but they allow synchronization between the AP and the receiving STAs for decoding the data in the data field 428.

The signal field 426 delivers information from the AP to the STAs about the nature of the packet being delivered. The information in the SIG field describes the modulation scheme of the data in the packet (e.g., BPSK, 16QAM, 64QAM, etc.), and the packet length. This information is used by a STA to decode the data in the packet when the packet is intended for the STA. When a packet is not intended for a particular STA, the STA can defer any communication attempts during the time period defined in the length field of the SIG symbol 426, and can, to save power, enter a sleep mode during the packet period.

As features have been added to IEEE 802.11, changes to the format of the SIG fields in data packets were developed to provide additional information to STAs. To provide backward compatibility for systems containing IEEE 802.11a/b/g devices, the data packet 400 can include STF, LTF, and SIG fields of these earlier systems, noted as L-STF 422, L-LTF 424, and L-SIG 426 with a prefix L to denote that they are "legacy" fields. When a legacy device configured to operate with IEEE 802.11a/b/g receives such a packet, it can receive and decode the L-SIG field 426 as a normal 11a/b/g packet. However, as the device continued decoding additional bits, they may not be decoded successfully because the format of the data packet after the L-SIG field 426 is different from the format of an 11a/b/g packet, and the CRC check performed by the device during this process can fail. This causes these legacy devices to stop processing the packet, but still defer any further operations until a time period has passed defined by the length field in the initially decoded L-SIG. In contrast, new devices compatible with the packet 400 would process the packet 400.

This packet 400 also contains an HE-SIG0 symbol 455, and one or more HE-SIG1 symbols 457 (which can be variable in length), and an optional HE-SIGB symbol 459 (which can be analogous to a VHT-SIGB field). In various embodiments, the structure of these fields can be backward compatible with IEEE 802.11a/b/g/n/ac devices, and can also signal OFDMA HE devices that the packet is an HE packet. To be backward compatible with IEEE 802.11a/b/g/n/ac devices, appropriate modulation can be used on each of these symbols. In some implementations, the HE-SIG0 field 455 can be modulated with BPSK modulation. This can have the same effect on 802.11a/b/g/n devices as is currently the case with 802.11ac packets that also have their first SIG symbol BPSK modulated. For these devices, it does not matter what the modulation is on the subsequent HE-SIG symbols 457. In various embodiments, the HE-SIG0 field 455 can be modulated and repeated across multiple channels.

In various embodiments, the HE-SIG1 field 457 can be BPSK or QBPSK modulated. If BPSK modulated, an 11ac device can assume the packet is an 802.11a/b/g packet, and can stop processing the packet, and can defer for the time defined by the length field of L-SIG 426. If QBPSK modulated, an 802.11ac device can produce a CRC error during preamble processing, and can also stop processing the packet, and can defer for the time defined by the length field of L-SIG. To signal HE devices that this is an HE packet, at least the first symbol of HE-SIG1 457 can be QBPSK modulated.

The information necessary to establish an OFDMA multiple access communication can be placed in the HE-SIG fields 455, 457, and 459 in a variety of positions. In various embodiments, the HE-SIG0 455 can include one or more of: a duration indication, a bandwidth indication (which can be, for example, 2 bits), a BSS color ID (which can be, for example, 3 bits), an UL/DL indication (which can be, for example, a 1-bit flag), a cyclic redundancy check (CRC) (which can be, for example, 4 bits), and a clear channel assessment (CCA) indication (which can be, for example, 2 bits).

In various embodiments, the HE-SIG1 field 457 can include a tone allocation information for OFDMA operation. The example of FIG. 4 can allow four different users to be each assigned a specific sub-band of tones and a specific number of MIMO space time streams. In various embodiments, 12 bits of space time stream information allows three bits for each of four users such that 1-8 streams can be assigned to each one. 16 bits of modulation type data allows four bits for each of four users, allowing assignment of any one of 16 different modulation schemes (16QAM, 64QAM, etc.) to each of four users. 12 bits of tone allocation data allows specific sub-bands to be assigned to each of four users.

One example SIG field scheme for sub-band (also referred to herein as sub-channel or channel) allocation includes a 6-bit Group ID field as well as 10 bits of information to allocate sub-band tones to each of four users. The bandwidth used to deliver a packet can be allocated to STAs in multiples of some number of MHz. For example, the bandwidth can be allocated to STAs in multiples of B MHz. The value of B can be a value such as 1, 2, 5, 10, 15, or 20 MHz. The values of B can be provided by a two bit allocation granularity field. For example, the HE-SIG 457 can contain one two-bit field, which allows for four possible values of B. For example, the values of B can be 5, 10, 15, or 20 MHz, corresponding to values of 0-3 in the allocation granularity field. In some aspects, a field of k bits can be used to signal the value of B, defining a number from 0 to N, where 0 represents the least flexible option (largest granularity), and a high value of N represents the most flexible option (smallest granularity). Each B MHz portion can be referred to as a sub-band.

The HE-SIG1 457 can further use 2 bits per user to indicate the number of sub-bands allocated to each STA. This can allow 0-3 sub-bands to be allocated to each user. The group-id (G_ID) can be used in order to identify the STAs, which can receive data in an OFDMA packet. This 6-bit G_ID can identify up to four STAs, in a particular order, in this example.

The training fields and data which are sent after the HE-SIG symbols can be delivered by the AP according to the allocated tones to each STA. This information can potentially be beam formed. Beam forming this information can have certain advantages, such as allowing for more accurate decoding and/or providing more range than non-beam formed transmissions.

Depending on the space time streams assigned to each user, different users can use a different number of HE-LTFs 465. Each STA can use a number of HE-LTFs 465 that allows channel estimation for each spatial stream associated with that STA, which can be generally equal to or more than the number of spatial streams. LTFs can also be used for frequency offset estimation and time synchronization. Because different STAs can receive a different number of HE-LTFs, symbols can be transmitted from the AP 104 (FIG. 1) that contain HE-LTF information on some tones and data on other tones.

In some embodiments, HE-LTF fields can be constructed as follows: (a) Sequence generation: Generate the VHT-LTF sequence in the frequency-domain over the channel bandwidth; (b) Phase rotation: Apply appropriate phase rotation for each 20 MHz cyclic shift diversity (CSD): Apply CSD for each space-time stream and frequency segment; (e) Spatial mapping: Apply a Q matrix; (f) inverse discrete Fourier transform (IDFT): Compute the inverse discrete Fourier transform; (g) Insert guard interval (GI) and apply windowing: Prepend a GI and apply windowing; (h) Analog and radio frequency (RF): Up-convert the resulting complex baseband waveform associated with each transmit chain to an RF signal according to the center frequency of the desired channel and transmit. In various embodiments, construction of the HE-LTF fields can be performed in a different order, can utilize additional actions, and/or some actions can be omitted.

In some aspects, sending both HE-LTF information and data on the same OFDM symbol can be problematic. For example, this can increase the peak-to-average power ratio (PAPR) to too high a level. Thus, it can be beneficial to instead to transmit HE-LTFs 465 on all tones of the transmitted symbols until each STA has received at least the required number of HE-LTFs 465. For example, each STA can need to receive one HE-LTF 465 per spatial stream associated with the STA. Thus, the AP can be configured to transmit a number of HE-LTFs 465 to each STA equal to the largest number of spatial streams assigned to any STA. For example, if three STAs are assigned a single spatial stream, but the fourth STA is assigned three spatial streams, in this aspect, the AP can be configured to transmit four symbols of HE-LTF information to each of the four STAs before transmitting symbols containing payload data.

It is not necessary that the tones assigned to any given STA be adjacent. For example, in some implementations, the sub-bands of the different receiving STAs can be interleaved. For example, if each of user-1, and user-2 receive three sub-bands, while user-4 receives two sub-bands, these sub-bands can be interleaved across the entire AP bandwidth. For example, these sub-bands can be interleaved in an order such as 1, 2, 4, 1, 2, 4, 1, 2. In some aspects, other methods of interleaving the sub-bands can also be used. In some aspects, interleaving the sub-bands can reduce the negative effects of interferences or the effect of poor reception from a particular device on a particular sub-band. In some aspects, the AP can transmit to STAs on the sub-bands that the STA prefers. For example, certain STAs can have better reception in some sub-bands than in others. The AP can thus transmit to the STAs based on at least in part on which sub-bands the STA can have better reception. In some aspects, the sub-bands can also not be interleaved. For example, the sub-bands can instead be transmitted as 1, 1, 1, 2, 2, 2, 4, 4. In some aspects, it can be pre-defined whether or not the sub-bands are interleaved.

In the example of FIG. 4, HE-SIG0 455 symbol modulation can be used to signal HE devices that the packet is an HE packet. Other methods of signaling HE devices that the packet is an HE packet can also be used. In the example of FIG. 4, the L-SIG 426 can contain information that instructs HE devices that an HE preamble can follow the legacy preamble. For example, the L-SIG 426 can contain a low-energy, 1-bit code on the Q-rail which indicates the presence of a subsequent HE preamble to HE devices sensitive to the Q signal during the L-SIG 426. A very low amplitude Q signal can be used because the single bit signal can be spread across all the tones used by the AP to transmit the packet. This code can be used by high efficiency devices to detect the presence of an HE-preamble/packet. The L-SIG 426 detection sensitivity of legacy devices need not be significantly impacted by this low-energy code on the Q-rail. Thus, these devices can be able to read the L-SIG 426, and not notice the presence of the code, while HE devices can be able to detect the presence of the code. In this implementation, all of the HE-SIG fields can be BPSK modulated if desired, and any of the techniques described herein related to legacy compatibility can be used in conjunction with this L-SIG signaling.

In various embodiments, any HE-SIG field 455-459 can contain bits defining user-specific modulation type for each multiplexed user. For example, the optional HE-SIGB 459 field can contain bits defining user-specific modulation type for each multiplexed user.

FIG. 5 is an illustration of a 20 MHz, a 40 MHz, and an 80 MHz transmission. As shown in FIG. 5, each transmission can be formed from a combination of one or more 26-tone RUs, or one or more 242-tone RUs. Generally, 26 tones in an IEEE 802.11ax transmission may be transmitted over a bandwidth of 2.03 MHz and 242 tones can be transmitted over a bandwidth of 18.91 MHz. For example, in one implementation, a 20 MHz transmission, having an FFT size of 256, can include 234 allocation tones formed from nine 26-tone RUs, leaving 22 remaining tones for DC tones, edge tones, and other leftover tones. The 234 allocation tones can be used as data and pilot tones. In another implementation, a 20 MHz transmission, having an FFT size of 256, can include 242 allocation tones formed from one 242-tone RU, leaving 14 remaining tones for DC tones, edge tones, and other leftover tones. The 242 allocation tones can be used as data and pilot tones.

As another example, in one implementation, a 40 MHz transmission, having an FFT size of 512, can include 494 allocation tones formed from 19 26-tone RUs, leaving 18 remaining tones for DC tones, edge tones, and other leftover tones. The 494 allocation tones can be used as data and pilot tones. In another implementation, a 40 MHz transmission, having an FFT size of 512, can include 468 allocation tones formed from 18 26-tone RUs, leaving 44 remaining tones for DC tones, edge tones, and other leftover tones. The 468 allocation tones can be used as data and pilot tones. In another implementation, a 40 MHz transmission, having an FFT size of 512, can include 484 allocation tones formed from two 242-tone RUs, leaving 28 remaining tones for DC tones, edge tones, and other leftover tones. The 484 allocation tones can be used as data and pilot tones.

As another example, in one implementation, an 80 MHz transmission, having an FFT size of 1024, can include 988 allocation tones formed from 38 26-tone RUs, leaving 36 remaining tones for DC tones, edge tones, and other leftover tones. The 988 allocation tones can be used as data and pilot tones. In another implementation, an 80 MHz transmission, having an FFT size of 1024, can include 936 allocation tones formed from 36 26-tone RUs, leaving 88 remaining tones for DC tones, edge tones, and other leftover tones. The 936 allocation tones can be used as data and pilot tones. In another implementation, an 80 MHz transmission, having an FFT size of 1024, can include 968 allocation tones formed from four 242-tone RUs, leaving 56 remaining tones for DC tones, edge tones, and other leftover tones. The 968 allocation tones can be used as data and pilot tones.

In various embodiments, the location of the 9th 26 tone block for 20 MHz implementations and the $19^{th}$ 26-tone block for 40 MHz implementations, can either cross DC or at the edges. In one embodiment, the last 26-tone block can be distributed around DC when the number of DC+leftover tones is greater than 6. In another embodiment, the last 26-tone block can be distributed at the edges when the number guards tones+leftover tones is greater than 12 20 MHz implementations and greater than 18 for 40 MHz implementations. In an embodiment, the allowed allocation unit size can be limited to reduce the TX mode. In an embodiment, the $19^{th}$ 26-tone RU in 40 MHz can go unused if the allocation unit is 2×26. In an embodiment, the $37^{th}$ and $38^{th}$ 26-tone blocks in 80 MHz implementations can go unused if the allocation unit is 4×26. In some embodiments, 26-tone blocks can be aligned with 242 tone blocks via leftover tones. In various embodiments, 242 allocations will not destroy nearby 26-tone block usage. In various embodiments, leftover tones can be used as extra DC tones, guard tones, or as a common or control channel.

As indicated above, a number of tones may be leftover in certain transmissions. These tones can be used for a number of different uses. For example, these tones may be used as additional DC or edge tones. It may be noted here that some illustrated implementations include transmissions having an odd number of RUs. Because of the odd number of RUs, one of the RUs will cross the DC tones (that is, include tones on each side of the DC tones). In other illustrated implementations, an even number of RUs are present, so no RU will cross the DC tones.

In some aspects, if a STA is assigned multiple RUs, encoding may be performed across all the assigned RUs. For sub-band OFDMA communications, interleaving may be done in two layers. First, all the bits of a device may be distributed evenly across all RUs assigned to the device. For example, bits 1, 2, 3, . . . N may be assigned to RUs 1, 2, 3, . . . N, and so on. Accordingly, each individual RU may be interleaved within the RU. Thus, only one size of interleaver may be used, that is, the size of a RU. In a distributed OFDMA system, interleaving may or may not be needed. In some aspects, a RU may be chosen, at least in part, based on how many pilot tones may be needed for the RU. For example, a RU of 26 may be beneficial in implementations where only two pilot tones per RU are used. In implementations where more pilot tones are used, other RUs may be used. Generally, when considering the size of a RU, there is a trade-off between signaling costs, pilot costs, and leftover tones. For example, when smaller RUs are used, the number of pilot tones needed (compared to the number of data tones) may increase as a proportion of the total number of tones in a RU. Further, when smaller RUs are used, signaling may require more data to transmit, since there will be a higher total number of RUs which must be allocated to various devices in an OFDMA transmission. However, as larger RUs are used, there are potentially more leftover tones, which may reduce overall throughput for a given bandwidth and be inefficient.

As discussed, various tone plans discussed herein can be used for transmission of the HE-LTF 465 (FIG. 4). In various embodiments, a single stream pilot is used for the HE-LTF 465 for single user (SU), DL and UL OFDMA, and DL multi-user (MU) MIMO transmissions. In other words, in some embodiments pilot tones can be transmitted only on a first spatial stream. Thus, pilot tones can be multiplied by the R matrix (discussed above with respect to formation of the HE-LTF 465) while all other tones are multiplied by the P matrix (discussed above with respect to formation of the HE-LTF 465). In general, any P value unequal to R value can change the base HE-LTF sequence, and different P and R values lead to different peak-to-average power ratios (PAPRs).

In an embodiment, HE-LTF sequence optimization can be performed by determining a sequence that minimizes the maximal PAPR over all possible P and R values (see Equation 1, where S are sequences for all possible extra tone values and rotations on a base sequence). Because PAPR depends only on the product of P and R values, $\{P, R\}=\{e^{j\varphi}, 1\}$ and $\{-e^{j\varphi}, -1\}$ give same sequence rotated by 180 degrees. All possible values for P.*R for up to 8 spatial streams are given by: [+1, −1, exp(−j*pi/3) exp(−j*2*pi/3) exp(−j*4*pi/3) exp(−j*5*pi/3)]. As used herein, the notation ".*" indicates element-wise vector multiplication.

$$HELTF = \min_A \{\max_{P,A}[PAPR(s,P,R)]\} \quad (1)$$

Various HE-LTF sequences are disclosed herein that advantageously provide low PAPR for 4× and 2×HE-LTF symbol durations. As used herein, a "2×" HE-LTF can be equivalent to modulating every other tone in an OFDM symbol of 4×HE-LTF. Thus, in some embodiments, a 2×HE- LTF can have a symbol duration of 6.4 μs excluding GI, which can be equivalent to modulating every other tone in a 12.8 μs symbol 4×HE-LTF.

Figures 7F, 7G, 7H:
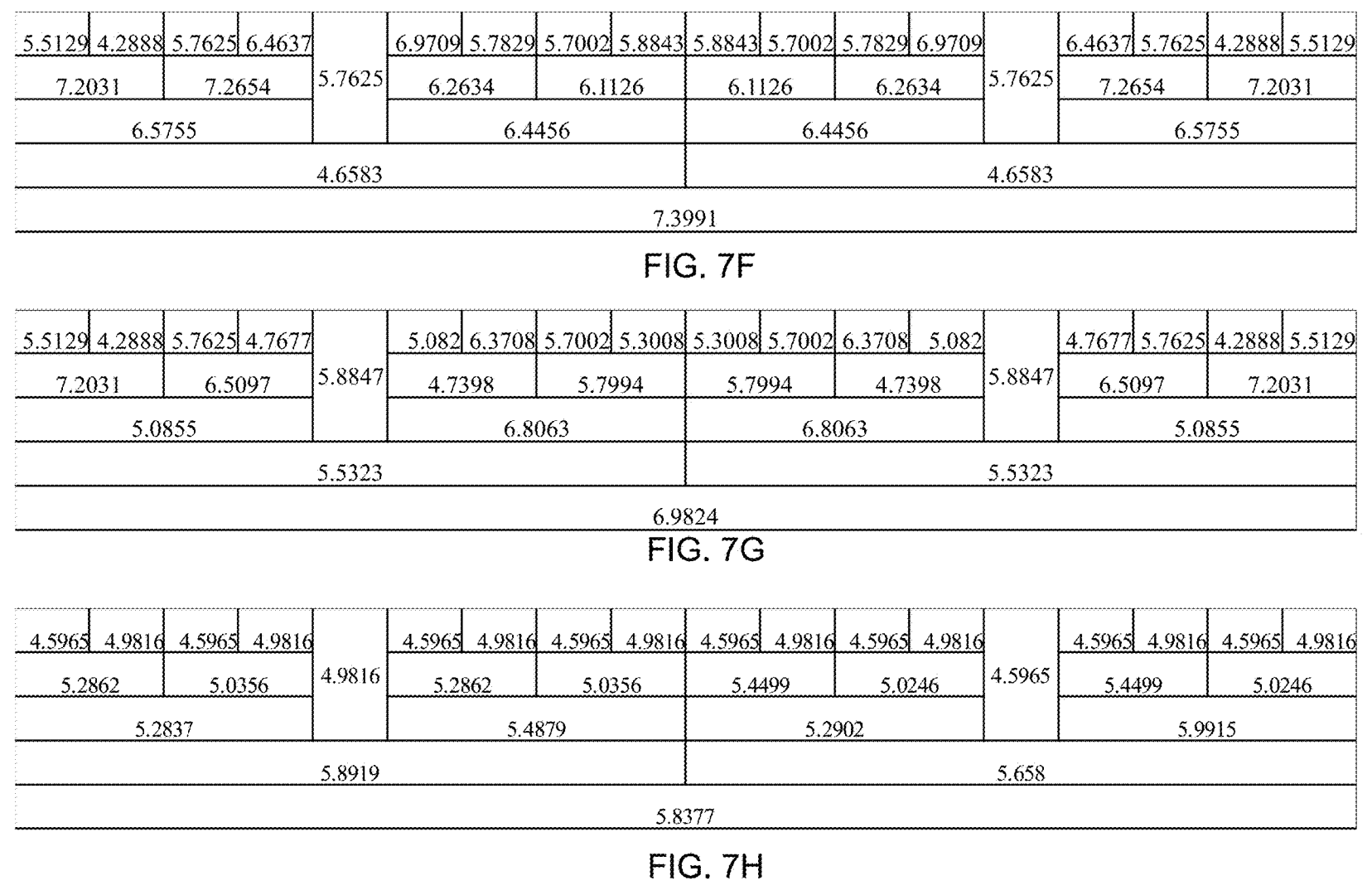
Figures 8A, 8B:
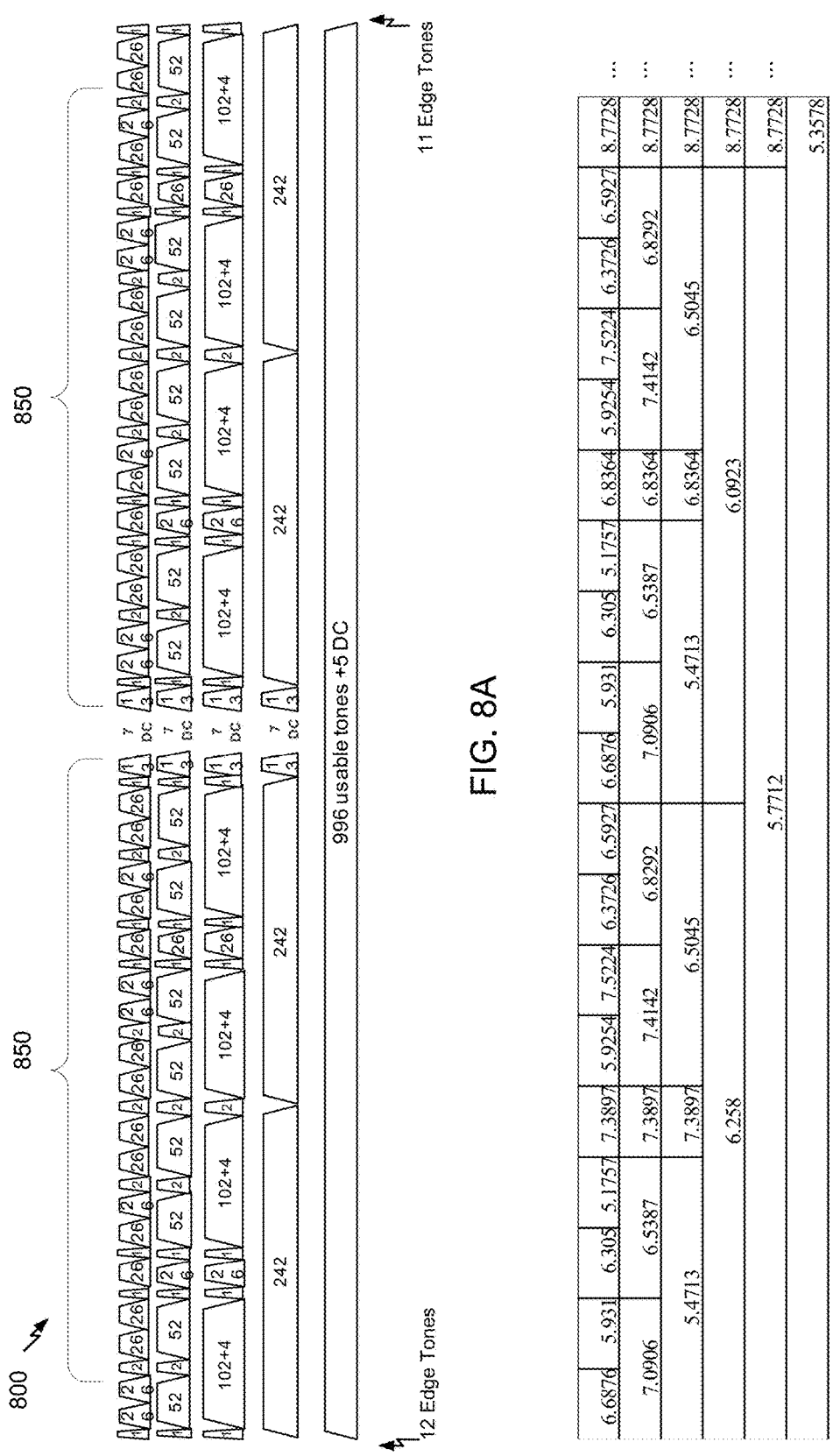

FIGS. 6A, 7A, and 8A show example 20 MHz, 40 MHz, and 80 MHz transmissions using 26-, 52-, 106-, 242-, and/or 996-tone allocations, according to various embodiments.

LTF for 20 MHz PPDU

FIG. 6A shows example 20 MHz transmissions 600. The transmissions 600 have 6 left edge tones, 7 DC tones, and 5 right edge tones, and a total of 234 or 242 usable tones. Although FIG. 6A shows four example transmissions 600 using various combinations of 26-, 52-, 106-, 107-, and 242-tone blocks, allocations within any given transmission can include multiple tone blocks of different sizes, having different arrangements, in various embodiments.

The first of the illustrated transmissions 600 includes nine 26-tone blocks (with one 26-tone block being divided into two 13-tone portions), 6 left edge tones, 5 right edge tones, 2*A outer leftover tones, 2*B middle leftover tones, 2*C inner leftover tones, 3 DC tones, and 2*D additional DC tones. In the illustrated embodiment, A=1, B=1, C=0, and D=2. As discussed herein, leftover tones can variously be used as edge tones, DC tones, control tones, additional guard tones (for example, in the case of non-contiguous channel bonding), and the like. In an embodiment, pilot tones can be located at tone indices −116, −102, −90, −76, −62, −48, −36, −22, −10, 10, 22, 36, 48, 62, 76, 90, 102, and 116.

The second of the illustrated transmissions 600 includes four 52-tone blocks, one 26-tone block being divided into two 13-tone portions, 6 left edge tones, 5 right edge tones, 2*A outer leftover tones, 2*B middle leftover tones, 2*C inner leftover tones, 3 DC tones, and 2*D additional DC tones. In the illustrated embodiment, A=1, B=1, C=0, and D=2. As discussed herein, leftover tones can variously be used as edge tones, DC tones, control tones, additional guard tones (for example, in the case of non-contiguous channel bonding), and the like. In an embodiment, pilot tones can be located at tone indices −116, −102, −90, −76, −62, −48, −36, −22, −10, 10, 22, 36, 48, 62, 76, 90, 102, and 116.

The third of the illustrated transmissions 600 includes two blocks having 106 tones (102 usable, plus 4 pilot), one 26-tone block being divided into two 13-tone portions, 6 left edge tones, 5 right edge tones, 3 DC tones, and 2*D additional DC tones. In the illustrated embodiment, D=2. In another embodiment, the 106-tone blocks can be replaced with 107-tone blocks including 102 usable tones, plus 5 pilot tones, and the leftover tones adjusted accordingly. As discussed herein, leftover tones can variously be used as edge tones, DC tones, control tones, additional guard tones (for example, in the case of non-contiguous channel bonding), and the like. In an embodiment, pilot tones can be located at tone indices −116, −90, −48, −22, −10, 10, 22, 48, 90, and 116.

The fourth of the illustrated transmissions 600 includes a single 242-tone block having 3 DC tones, 6 left edge tones, 5 right edge tones. In an embodiment, pilot tones can be located at tone indices −116, −90, −48, −22, 22, 48, 90, and 116.

In various embodiments, the transmission 600 of FIG. 6A can be used for transmission of an HE-LTF (such as the HE-LTF 465 of FIG. 4) for a 20 MHz PPDU. The HE-LTF can be constructed with a base sequence x=[+1, +1, +1, −1, −1, −1, +1, −1, −1, +1, −1] (11 tones). A rotation pattern C=[c1, c2, c3, c4, c5, c6, c7, c8, c9, c10, c11, c12, . . . ], consisting of ±1 values, can be applied to the base sequence x, resulting in a sequence M1=[c1.*x, c2.*x, c3.*x, c4.*x, c5.*x, c6.*x, c7.*x, c8.*x, c9.*x, c10.*x, c11.*x] (121 tones).

In one 4×HE-LTF embodiment, a 242-tone LTF (plus three DC tones), indexed (−122:122), can be formed as [M1, 0, 0, 0, c12.*M1]. In one embodiment, the rotation pattern C can be [+1, +1, +1, −1, −1, −1, +1, −1, −1, +1, −1, +1]. In another embodiment, the rotation pattern C can be [−1, −1, −1, +1, +1, +1, −1, +1, +1, −1, +1, +1]. These rotation patterns can advantageously minimize the worst-case PAPRs for allocations of 242-tone RUs, as shown in FIG. 6B. For example, the first row of FIG. 6B shows worst-case PAPRs (in dB) for each 24-tone RU shown in the first row of FIG. 6A, respectively. The second row of FIG. 6B shows worst-case PAPRs (in dB) for each 52- and 26-tone RU shown in the second row of FIG. 6A, respectively. The third row of FIG. 6B shows worst-case PAPRs (in dB) for each 106- and 26-tone RU shown in the third row of FIG. 6A, respectively. The fourth row of FIG. 6B shows worst-case PAPR (in dB) for the 242+3DC RU shown in the fourth row of FIG. 6A, respectively.

In another 4×HE-LTF embodiment, a 242-tone LTF (plus three DC tones), indexed (−122:122), can be formed as [+1, c1.*Ga, c2.*Gb, c3, c4.*Ga, c5.*Gb, c6.*Ga(1:13), c7, c8, 0, 0, 0, c9, c10, c11.*Ga(14:26), c12.*Ga, c13.*Gb, c14, c15.*Ga, c16.*Gb, c17], where Ga is [+1, +1, +1, +1, −1, +1, +1, −1, −1, +1, −1, +1, −1, +1, −1, −1, +1, −1, +1, +1, +1, −1, −1, +1, +1, +1] and Gb is [+1, +1, +1, +1, −1, +1, +1, −1, −1, +1, −1, +1, +1, +1, +1, +1, −1, +1, −1, −1, −1, +1, +1, −1, −1, −1] (together forming a length-26 Golay pair). In one embodiment, the rotation pattern C can be [+1, −1, +1, +1, +1, +1, −1, +1, −1, +1, −1, −1, +1, +1, +1, +1, −1]. These rotation patterns can advantageously minimize the worst-case PAPRs for allocations of 242-tone RUs, as shown in FIG. 6C. For example, the first row of FIG. 6C shows worst-case PAPRs (in dB) for the 26-tone RU shown in the first row of FIG. 6A. The second row of FIG. 6C shows worst-case PAPRs (in dB) for each 52- and 26-tone RU shown in the second row of FIG. 6A, respectively. The third row of FIG. 6C shows worst-case PAPRs (in dB) for each 106- and 26-tone RU shown in the third row of FIG. 6A, respectively. The fourth row of FIG. 6C shows worst-case PAPR (in dB) for the 242+3DC RU shown in the fourth row of FIG. 6A, respectively.

In another 4×HE-LTF embodiment, a 242-tone LTF (plus three DC tones), indexed (−122:122), can be formed as [+1, c1.*Ga, c2.*Gb, c3, c4.*Ga, c5.*Gb, c6.*Ga(1:13), c7, c8, 0, 0, 0, c9, c10, c6.*Ga(14:26), c11.*Ga, c12.*Gb, c13, c14.*Ga, c15.*Gb, c16], where Ga is [+1, +1, +1, +1, −1, +1, +1, −1, −1, +1, −1, +1, −1, +1, −1, −1, +1, −1, +1, +1, +1, −1, −1, +1, +1, +1] and Gb is [+1, +1, +1, +1, −1, +1, +1, −1, −1, +1, −1, +1, +1, +1, +1, +1, −1, +1, −1, −1, −1, +1, +1, −1, −1, −1] (together forming a length-26 Golay pair). In one embodiment, the rotation pattern C can be [−1, −1, −1, +1, −1, +1, +1, −1, +1, +1, −1, −1, +1, −1, +1, +1]. These rotation patterns can advantageously minimize the worst-case PAPRs for allocations of 242-tone RUs, as shown in FIG. 6D. For example, the first row of FIG. 6D shows worst-case PAPRs (in dB) for the 26-tone RU shown in the first row of FIG. 6A. The second row of FIG. 6D shows worst-case PAPRs (in dB) for each 52- and 26-tone RU shown in the second row of FIG. 6A, respectively. The third row of FIG. 6D shows worst-case PAPRs (in dB) for each 106- and 26-tone RU shown in the third row of FIG. 6A, respectively. The fourth row of FIG. 6D shows worst-case PAPR (in dB) for the 242+3DC RU shown in the fourth row of FIG. 6A, respectively.

In another 4×HE-LTF embodiment, a 242-tone LTF (plus three DC tones), indexed (−122:122), can be formed as [+1, c1.*N1, c2.*N2, c3, c4.*N1, c5.*N2, c6.*Nc(1:13), c7, c8, 0, 0, 0, c9, c10, c6.*Nc(14:26), c11.*N2, c12.*N1, c13, c14.*N2, c15.*N1, c16], where N1 is [+1, +1, +1, +1, +1, +1, +1, +1, +1, −1, +1, −1, −1, −1, +1, +1, −1, +1, −1, +1, +1, −1, −1, +1, −1, +1], N2 is [+1, −1, +1, +1, −1, +1, +1, +1, −1, −1, −1, −1, −1, +1, +1, +1, −1, −1, +1, +1, +1, −1, +1, +1, +1, +1], and Nc is [+1, +1, +1, +1, −1, −1, +1, +1, +1, +1, −1, +1, −1, +1, −1, +1, −1, +1, −1, −1, +1, +1, −1, −1, +1, +1, −1, +1] (together forming advantageous length-26 sequences considering pilot structures in relevant OFDMA tone plans). In one embodiment, the rotation pattern C can be [−1, +1, −1, +1, +1, −1, +1, +1, +1, +1, −1, −1, +1, +1, −1, −1].

These rotation patterns can advantageously minimize the worst-case PAPRs for allocations of 242-tone RUs, as shown in FIG. 6E. For example, the first row of FIG. 6E shows worst-case PAPRs (in dB) for the 26-tone RU shown in the first row of FIG. 6A. The second row of FIG. 6E shows worst-case PAPRs (in dB) for each 52- and 26-tone RU shown in the second row of FIG. 6A, respectively. The third row of FIG. 6E shows worst-case PAPRs (in dB) for each 106- and 26-tone RU shown in the third row of FIG. 6A, respectively. The fourth row of FIG. 6E shows worst-case PAPR (in dB) for the 242+3DC RU shown in the fourth row of FIG. 6A, respectively.

In another 4×HE-LTF embodiment, a 242-tone LTF (plus three DC tones), indexed (−122:122), can be formed as [+1, c1.*O1, c2.*O2, c3, c4.*O1, c5.*O2, c6.*Oc(1:13), c7, c8, 0, 0, 0, c9, c10, c6.*Oc(14:26), c11.*O1, c12.*O2, c13, c14.*O1, c15.*O2, c16], where O1 is [+1, −1, +1, −1, +1, −1, +1, −1, +1, +1, +1, +1, −1, +1, +1, −1, −1, −1, −1, −1, +1, +1, −1, −1, −1, −1], O2 is [+1, −1, +1, +1, −1, +1, +1, +1, −1, −1, −1, −1, −1, +1, +1, +1, −1, −1, +1, +1, +1, −1, +1, +1, +1, +1], and Oc is [+1, +1, +1, +1, −1, −1, +1, +1, +1, +1, −1, +1, −1, +1, −1, +1, −1, +1, −1, −1, +1, +1, −1, −1, +1, +1, −1, +1] (together forming advantageous length-26 sequences considering pilot structures in relevant OFDMA tone plans). In one embodiment, the rotation pattern C can be [+1, +1, −1, −1, +1, +1, −1, −1, +1, −1, −1, −1, +1, −1, +1, −1]. These rotation patterns can advantageously minimize the worst-case PAPRs for allocations of 242-tone RUs, as shown in FIG. 6F. For example, the first row of FIG. 6F shows worst-case PAPRs (in dB) for the 26-tone RU shown in the first row of FIG. 6A. The second row of FIG. 6F shows worst-case PAPRs (in dB) for each 52- and 26-tone RU shown in the second row of FIG. 6A, respectively. The third row of FIG. 6F shows worst-case PAPRs (in dB) for each 106- and 26-tone RU shown in the third row of FIG. 6A, respectively. The fourth row of FIG. 6F shows worst-case PAPR (in dB) for the 242+3DC RU shown in the fourth row of FIG. 6A, respectively.

In another 4×HE-LTF embodiment, a 242-tone LTF (plus three DC tones), indexed (−122:122), can be formed as $LTF_{242}(-122:122)$=[+1, −Ga, −Gb, −1, Ga, −Gb, Ga(1:13), +1, −1, 0, 0, 0, +1, +1, Ga(14:26), −Ga, −Gb, +1, −Ga, Gb, +1] where Ga=[+1, +1, +1, +1, −1, +1, +1, −1, −1, +1, −1, +1, −1, +1, −1, +1, −1, +1, +1, +1, −1, −1, +1, +1, +1], and Gb=[+1, +1, +1, +1, −1, +1, +1, −1, −1, +1, −1, +1, +1, +1, +1, +1, −1, +1, −1, −1, −1, +1, +1, −1, −1, −1] (together forming a length-26 Golay pair). In various embodiments, this LTF pattern can advantageously minimize the worst-case PAPRs for allocations of 242-tone RUs, as shown in FIG. 6D. For example, the first row of FIG. 6D shows worst-case PAPRs (in dB) for the 26-tone RU shown in the first row of FIG. 6A. The second row of FIG. 6D shows worst-case PAPRs (in dB) for each 52- and 26-tone RU shown in the second row of FIG. 6A, respectively. The third row of FIG. 6D shows worst-case PAPRs (in dB) for each 106- and 26-tone RU shown in the third row of FIG. 6A, respectively. The fourth row of FIG. 6D shows worst-case PAPR (in dB) for the 242+3DC RU shown in the fourth row of FIG. 6A, respectively.

In one 2×HE-LTF embodiment, a 242-tone LTF (plus one DC tone) can be formed as [c12.*M1(61:121), 0, c13.*M1(1:61)]. In one embodiment, the rotation pattern C can be [+1, +1, −1, −1, −1, −1, +1, −1, +1, +1, −1, +1, −1]. In another embodiment, the rotation pattern C can be [+1, +1, −1, −1, −1, −1, +1, −1, +1, +1, −1, −1, +1]. In another embodiment, the rotation pattern C can be [−1, −1, +1, +1, +1, +1, −1, +1, −1, −1, +1, +1, −1]. In another embodiment, the rotation pattern C can be [−1, −1, +1, +1, +1, +1, −1, +1, −1, −1, +1, −1, +1]. These rotation patterns can advantageously provide PAPRs for allocations of 242-tone RUs, as shown in FIG. 6G. For example, the first row of FIG. 6G shows worst-case PAPRs (in dB) for each 24-tone RU shown in the first row of FIG. 6A, respectively. The second row of FIG. 6G shows worst-case PAPRs (in dB) for each 52- and 26-tone RU shown in the second row of FIG. 6A, respectively. The third row of FIG. 6G shows worst-case PAPRs (in dB) for each 106- and 26-tone RU shown in the third row of FIG. 6A, respectively. The fourth row of FIG. 6G shows worst-case PAPR (in dB) for the 242-tone RU shown in the fourth row of FIG. 6A, respectively.

In another 2×HE-LTF embodiment, a 242-tone LTF (plus one DC tone) can be formed as [+1, c1.*Ma, c2.*Mb, c3.*Ma, c3.*Mb, c4.*M4, c5, 0, c6, c7.*M4(7:−1:1), c8.*Ma, c9.*Mb, c10.*Ma, c10.*Mb, c11], where M4 is [+1, +1, +1, −1, −1, +1, −1], Ma is Ga(1:2:25), and Mb is Gb(1:2:25). In one embodiment, the rotation pattern C can be [+1, −1, +1, +1, −1, −1, +1, +1, −1, −1, −1]. These rotation patterns can advantageously provide PAPRs for allocations of two 106-tone RUs and 242-tone RUs, as shown in FIG. 6H. For example, the first row of FIG. 6H shows worst-case PAPRs (in dB) for each 24-tone RU shown in the first row of FIG. 6A, respectively. The second row of FIG. 6H shows worst-case PAPRs (in dB) for each 52- and 26-tone RU shown in the second row of FIG. 6A, respectively. The third row of FIG. 6H shows worst-case PAPRs (in dB) for each 106- and 26-tone RU shown in the third row of FIG. 6A, respectively. The fourth row of FIG. 6H shows worst-case PAPR (in dB) for the 242-tone RU shown in the fourth row of FIG. 6A, respectively.

In another 2×HE-LTF embodiment, a 242-tone LTF (plus one DC tone) can be formed as [+1, c1.*Ma, c2.*Mb, c3.*Ma, c3.*Mb, c4.*M5(1:7), c5, 0, c6, c4.*M5(8:14), c7.*Ma, c8.*Mb, c9.*Ma, c9.*Mb, c10], where M5 is [+1, +1, −1, +1, −1, +1, +1, +1, −1, −1, −1, −1, −1, +1], Ma is Ga(1:2:25), and Mb is Gb(1:2:25). In one embodiment, the rotation pattern C can be [−1, +1, +1, +1, +1, −1, +1, −1, +1, +1]. These rotation patterns can advantageously provide PAPRs for allocations of two 106-tone RUs and 242-tone RUs, as shown in FIG. 6I. For example, the first row of FIG. 6I shows worst-case PAPRs (in dB) for each 24-tone RU shown in the first row of FIG. 6A, respectively. The second row of FIG. 6I shows worst-case PAPRs (in dB) for each 52- and 26-tone RU shown in the second row of FIG. 6A, respectively. The third row of FIG. 6I shows worst-case PAPRs (in dB) for each 106- and 26-tone RU shown in the third row of FIG. 6A, respectively. The fourth row of FIG. 6I shows worst-case PAPR (in dB) for the 242-tone RU shown in the fourth row of FIG. 6A, respectively.

In another 2×HE-LTF embodiment, a 242-tone LTF (plus one DC tone) can be formed as [+1, c1.*M2, c2.*M22, c3.*M2, c4.*M23, c5.*M4, c6, 0, c7, c8.*M4(7:−1:1), c9.*M2, c10.*M22, c11.*M2, c12.*M23, c13], where M2 is [+1, +1, +1, +1, +1, −1, −1, +1, +1, −1, +1, −1, +1], M22 is [M2(1:7), −M2(8:13)], M23 is [−M2(1:6), M2(7:13)], and M6 is [+1, +1, −1, −1, −1, +1, +1, +1, −1, −1, +1, −1, −1, +1]. In one embodiment, the rotation pattern C can be [−1, +1, +1, −1, −1, −1, +1, −1, −1, −1, +1, +1, −1]. These rotation patterns can advantageously provide PAPRs for allocations of two 106-tone RUs and 242-tone RUs, as shown in FIG. 6J. For example, the first row of FIG. 6J shows worst-case PAPRs (in dB) for each 24-tone RU shown in the first row of FIG. 6A, respectively. The second row of FIG. 6J shows worst-case PAPRs (in dB) for each 52- and 26-tone RU shown in the second row of FIG. 6A, respectively. The third row of FIG. 6J shows worst-case PAPRs (in dB) for each 106- and 26-tone RU shown in the third row of FIG. 6A, respectively. The fourth row of FIG. 6J shows worst-case PAPR (in dB) for the 242-tone RU shown in the fourth row of FIG. 6A, respectively.

In another 2×HE-LTF embodiment, a 242-tone LTF can be formed as $LTF_{242}(-122:2:122)$=[+1, −M2, M22, M2, −M23, −M4, −1, 0, +1, −M4(7:−1:1), −M2, −M22, M2, M23, −1], where M2 is [+1, +1, +1, +1, +1, −1, −1, +1, +1, −1, +1, −1, +1], M22 is [M2(1:7), −M2(8:13)], M23 is [−M2(1:6), M2(7:13)], and M4 is [+1, +1, +1, −1, −1, +1, −1]. In various embodiment, this LTF pattern can advantageously provide PAPRs for allocations of two 106-tone RUs and 242-tone RUs, as shown in FIG. 6J. For example, the first row of FIG. 6J shows worst-case PAPRs (in dB) for each 24-tone RU shown in the first row of FIG. 6A, respectively. The second row of FIG. 6J shows worst-case PAPRs (in dB) for each 52- and 26-tone RU shown in the second row of FIG. 6A, respectively. The third row of FIG. 6J shows worst-case PAPRs (in dB) for each 106- and 26-tone RU shown in the third row of FIG. 6A, respectively. The fourth row of FIG. 6J shows worst-case PAPR (in dB) for the 242-tone RU shown in the fourth row of FIG. 6A, respectively.

In another 2×HE-LTF embodiment, a 242-tone LTF (plus one DC tone) can be formed as [+1, c1.*M2, c2.*M22, c3.*M2, c4.*M23, c5.*M6(1:7), c6, 0, c7, c5.*M6(8:14), c8.*M2, c9.*M22, c10.*M2, c11.*M23, c12], where M2 is [+1, +1, +1, +1, +1, −1, −1, +1, +1, −1, +1, −1, +1], M22 is [M2(1:7), −M2(8:13)], M23 is [−M2(1:6), M2(7:13)], and M6 is [+1, +1, −1, −1, −1, +1, +1, +1, −1, −1, +1, −1, −1, +1]. In one embodiment, the rotation pattern C can be [−1, +1, +1, −1, −1, +1, +1, +1, +1, −1, −1, +1]. These rotation patterns can advantageously provide PAPRs for allocations of two 106-tone RUs and 242-tone RUs, as shown in FIG. 6K. For example, the first row of FIG. 6K shows worst-case PAPRs (in dB) for each 24-tone RU shown in the first row of FIG. 6A, respectively. The second row of FIG. 6K shows worst-case PAPRs (in dB) for each 52- and 26-tone RU shown in the second row of FIG. 6A, respectively. The third row of FIG. 6K shows worst-case PAPRs (in dB) for each 106- and 26-tone RU shown in the third row of FIG. 6A, respectively. The fourth row of FIG. 6K shows worst-case PAPR (in dB) for the 242-tone RU shown in the fourth row of FIG. 6A, respectively.

LTF for 40 MHz PPDU

FIG. 7A shows example 40 MHz transmissions 700. The transmissions 700 have 12 left edge tones, 5 DC tones, and 11 right edge tones, and a total of 484 usable tones. Although FIG. 7A shows four example transmissions 700 using various combinations of 26-, 52-, 106-, 107-, and 242-tone blocks, allocations within any given transmission can include multiple tone blocks of different sizes, having different arrangements, in various embodiments. In the illustrated embodiment, each 40 MHz transmission 700 is a duplicate of two 20 MHz transmissions 750, which, in various embodiments, can be the 20 MHz transmissions 600 of FIG. 6A or any other 20 MHz transmission discussed herein.

The first of the illustrated transmissions 700 includes two 20 MHz portions 750 each including nine 26-tone blocks, 2*A outer leftover tones, 2*B middle leftover tones, 2*C inner leftover tones, and 2*D additional inner leftover tones. In the illustrated embodiment, A=1, B=2, C=0, and D=1. As discussed herein, leftover tones can variously be used as edge tones, DC tones, control tones, additional guard tones (for example, in the case of non-contiguous channel bonding), and the like. In an embodiment, pilot tones can be located at tone indices −238, −224, −212, −198, −184, −170, −158, −144, −130, −116, −104, −90, −78, −64, −50, −36, −24, −10, 10, 24, 36, 50, 64, 78, 90, 104, 116, 130, 144, 158, 170, 184, 198, 212, 224, and 238.

The second of the illustrated transmissions 700 includes two 20 MHz portions 750 each including four 52-tone blocks, one 26-tone block, 2*A outer leftover tones, 2*B middle leftover tones, 2*C inner leftover tones, and 2*D additional inner leftover tones. In the illustrated embodiment, A=1, B=2, C=0, and D=1. As discussed herein, leftover tones can variously be used as edge tones, DC tones, control tones, additional guard tones (for example, in the case of non-contiguous channel bonding), and the like. In an embodiment, pilot tones can be located at tone indices −238, −224, −212, −198, −184, −170, −158, −144, −130, −116, −104, −90, −78, −64, −50, −36, −24, −10, 10, 24, 36, 50, 64, 78, 90, 104, 116, 130, 144, 158, 170, 184, 198, 212, 224, and 238.

The third of the illustrated transmissions 700 includes two 20 MHz portions 750 each including two blocks having 106 tones (102 usable, plus 4 pilot), one 26-tone block, +1, additional left edge tone, +1, additional right edge tone, and D leftover tones on each side of the 26-tone block. In the illustrated embodiment D=1. As discussed herein, leftover tones can variously be used as edge tones, DC tones, control tones, additional guard tones (for example, in the case of non-contiguous channel bonding), and the like. In an embodiment, pilot tones can be located at tone indices −238, −212, −170, −144, −130, −116, −104, −78, −36, −10, 10, 36, 78, 104, 116, 130, 144, 170, 212, and 238.

The fourth of the illustrated transmissions 700 includes two 20 MHz portions 750. Each 20 MHz portion 750 includes a single 242-tone block. In an embodiment, pilot tones can be located at tone indices −238, −212, −170, −144, −104, −78, −36, −10, 10, 36, 78, 104, 144, 170, 212, and 238.

In various embodiments, the transmission 700 of FIG. 7A can be used for transmission of an HE-LTF (such as the HE-LTF 465 of FIG. 4) for a 40 MHz PPDU. The HE-LTF can be constructed with a base sequence x=[+1, +1, +1, −1, −1, −1, +1, −1, −1, +1, −1] (11 tones). A portion of a rotation pattern C=[c1, c2, c3, c4, c5, c6, c7, c8, c9, c10, c11, c12, c13, c14, . . . ], consisting of ±1 values, can be applied to the base sequence x, resulting in a sequence M1=[c1.*x, c2.*x, c3.*x, c4.*x, c5.*x, c6.*x, c7.*x, c8.*x, c9.*x, c10.*x, c11.*x] (121 tones).

In one 4×HE-LTF embodiment, a 484-tone LTF (plus five DC tones) can be formed as [M1, c12.*M1, 0, 0, 0, 0, 0, c13.*M1, c14.*M1]. In one embodiment, the rotation pattern C can be [+1, −1, +1, +1, −1, +1, +1, +1, −1, −1, −1, +1, −1, +1]. In another embodiment, the rotation pattern C can be [−1, +1, −1, −1, +1, −1, −1, −1, +1, +1, +1, +1, −1, +1]. These rotation patterns can advantageously minimize the worst-case PAPRs for allocations of 484-tone RUs, as shown in FIG. 7B. For example, the first row of FIG. 7B shows worst-case PAPRs (in dB) for each 24-tone RU shown in the first row of FIG. 7A, respectively. The second row of FIG. 7B shows worst-case PAPRs (in dB) for each 52- and 26-tone RU shown in the second row of FIG. 7A, respectively. The third row of FIG. 7B shows worst-case PAPRs (in dB) for each 106- and 26-tone RU shown in the third row of FIG. 7A, respectively. The fourth row of FIG. 7B shows worst-case PAPRs (in dB) for each 242-tone RU shown in the fourth row of FIG. 7A, respectively. The fifth row of FIG. 7B shows the worst-case PAPR (in dB) for a single-user "whole bandwidth" tone plan having 5 DC tones in various embodiments.

In another 4×HE-LTF embodiment, a 484-tone LTF (plus five DC tones) can be formed as [+1, c1.*[Ga, Gb], c2, c3, c4.*[Ga, −Gb], c5, c6.*Gb, c7, c8*[Ga, Gb], c9, c10, c11.*[Ga, −Gb], c12, 0, 0, 0, 0, 0, b1, b2.*[Ga, Gb], b3, b4, b5.*[Ga, −Gb], b6, b7.*Ga, b8, b9.*[Ga, Gb], b10, b11, b12.*[Ga, −Gb], b13], where Ga is [+1, +1, +1, +1, −1, +1, +1, −1, −1, +1, −1, +1, −1, +1, −1, −1, +1, −1, +1, +1, +1, −1, −1, +1, +1, +1] and Gb is [+1, +1, +1, +1, −1, +1, +1, −1, −1, +1, −1, +1, −1, +1, +1, +1, +1, −1, +1, −1, −1, −1, +1, −1, −1, −1] (together forming a length-26 Golay pair). In one embodiment, the rotation pattern C can be [+1, +1, +1, −1, −1, −1, −1, +1, +1, +1, +1, −1] and the rotation pattern B can be [−1, −1, −1, −1, +1, −1, +1, +1, +1, +1, +1, +1, +1]. These rotation patterns can advantageously minimize the worst-case PAPRs for allocations of 484-tone RUs, as shown in FIG. 7C. For example, the first row of FIG. 7C shows worst-case PAPRs (in dB) for each 24-tone RU shown in the first row of FIG. 7A, respectively. The second row of FIG. 7C shows worst-case PAPRs (in dB) for each 52- and 26-tone RU shown in the second row of FIG. 7A, respectively. The third row of FIG. 7C shows worst-case PAPRs (in dB) for each 106- and 26-tone RU shown in the third row of FIG. 7A, respectively. The fourth row of FIG. 7C shows worst-case PAPRs (in dB) for each 242-tone RU shown in the fourth row of FIG. 7A, respectively. The fifth row of FIG. 7C shows the worst-case PAPR (in dB) for a single-user "whole bandwidth" tone plan having 5 DC tones in various embodiments.

In another 4×HE-LTF embodiment, a 484-tone LTF (plus five DC tones) can be formed as [+1, c1.*[Ga, Gb], c2, c3, c4.*[Ga, −Gb], c5, c6.*Gb, c7, c1.*[Ga, Gb], c8, c9, c4.* [−Ga, Gb], c10, 0, 0, 0, 0, 0, b1, c1.*[−Ga, −Gb], b2, b3, c4.*[−Ga, Gb], b4, b5.*Ga, b6, c1.*[Ga, Gb], b7, b8, c4.* [−Ga, Gb], b9], where Ga is [+1, +1, +1, +1, −1, +1, +1, −1, −1, +1, −1, +1, −1, +1, −1, −1, +1, −1, +1, +1, +1, −1, −1, +1, +1, +1] and Gb is [+1, +1, +1, +1, −1, +1, +1, −1, −1, +1, −1, +1, +1, +1, +1, +1, −1, +1, −1, −1, −1, +1, +1, −1, −1, −1] (together forming a length-26 Golay pair). In one embodiment, the rotation pattern C can be [−1, +1, −1, +1, +1, +1, −1, −1, −1, +1] and the rotation pattern B can be [−1, +1, +1, −1, −1, −1, +1, −1, +1]. These rotation patterns can advantageously minimize the worst-case PAPRs for allocations of two 242-tone RUs and one 484-tone RU, as shown in FIG. 7D. For example, the first row of FIG. 7D shows worst-case PAPRs (in dB) for each 24-tone RU shown in the first row of FIG. 7A, respectively. The second row of FIG. 7D shows worst-case PAPRs (in dB) for each 52- and 26-tone RU shown in the second row of FIG. 7A, respectively. The third row of FIG. 7D shows worst-case PAPRs (in dB) for each 106- and 26-tone RU shown in the third row of FIG. 7A, respectively. The fourth row of FIG. 7D shows worst-case PAPRs (in dB) for each 242-tone RU shown in the fourth row of FIG. 7A, respectively. The fifth row of FIG. 7D shows the worst-case PAPR (in dB) for a single-user "whole bandwidth" tone plan having 5 DC tones in various embodiments.

In another 4×HE-LTF embodiment, a 484-tone LTF (plus five DC tones) can be formed as [+1, c1.*[Ga, Gb], c2, c3, c4.*[Ga, −Gb], c5, c6.*Gb, c7, c1.*[Ga, Gb], c8, c9, c4.* [−Ga, Gb], c10, 0, 0, 0, 0, 0, b1, c1.*[Ga, −Gb], b2, b3, c4.*[−Ga, Gb], b4, b5.*Ga, b6, c1.*[Ga, Gb], b7, b8, c4.* [−Ga, Gb], b9], where Ga is [+1, +1, +1, +1, −1, +1, +1, −1, −1, +1, −1, +1, −1, +1, −1, −1, +1, −1, +1, +1, +1, −1, −1, +1, +1, +1] and Gb is [+1, +1, +1, +1, −1, +1, +1, −1, −1, +1, −1, +1, +1, +1, +1, +1, −1, +1, −1, −1, −1, +1, +1, −1, −1, −1, −1] (together forming a length-26 Golay pair). In one embodiment, the rotation pattern C can be [−1, −1, −1, +1, +1, +1, −1, −1, −1, +1] and the rotation pattern B can be [−1, +1, +1, +1, −1, +1, −1, +1, −1]. These rotation patterns can advantageously minimize the worst-case PAPRs for allocations of four 106-tone RUs, two 242-tone RUs, and one 484-tone RU, as shown in FIG. 7E. For example, the first row of FIG. 7E shows worst-case PAPRs (in dB) for each 24-tone RU shown in the first row of FIG. 7A, respectively. The second row of FIG. 7E shows worst-case PAPRs (in dB) for each 52- and 26-tone RU shown in the second row of FIG. 7A, respectively. The third row of FIG. 7E shows worst-case PAPRs (in dB) for each 106- and 26-tone RU shown in the third row of FIG. 7A, respectively. The fourth row of FIG. 7E shows worst-case PAPRs (in dB) for each 242-tone RU shown in the fourth row of FIG. 7A, respectively. The fifth row of FIG. 7E shows the worst-case PAPR (in dB) for a single-user "whole bandwidth" tone plan having 5 DC tones in various embodiments.

In another 4×HE-LTF embodiment, a 484-tone LTF (plus five DC tones) can be formed as $LTF_{484}$=[+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1], where Ga is [+1, +1, +1, +1, −1, +1, +1, −1, −1, +1, −1, +1, −1, +1, +1, +1, −1, −1, +1, +1, +1, +1, −1, +1, +1, +1] and Gb is [+1, +1, +1, +1, −1, +1, +1, −1, −1, +1, −1, +1, +1, +1, +1, −1, +1, −1, −1, −1, +1, +1, −1, −1, −1, −1] (together forming a length-26 Golay pair). In various embodiment, this LTF pattern can advantageously minimize the worst-case PAPRs for allocations of four 106-tone RUs, two 242-tone RUs, and one 484-tone RU, as shown in FIG. 7E. For example, the first row of FIG. 7E shows worst-case PAPRs (in dB) for each 24-tone RU shown in the first row of FIG. 7A, respectively. The second row of FIG. 7E shows worst-case PAPRs (in dB) for each 52- and 26-tone RU shown in the second row of FIG. 7A, respectively. The third row of FIG. 7E shows worst-case PAPRs (in dB) for each 106- and 26-tone RU shown in the third row of FIG. 7A, respectively. The fourth row of FIG. 7E shows worst-case PAPRs (in dB) for each 242-tone RU shown in the fourth row of FIG. 7A, respectively. The fifth row of FIG. 7E shows the worst-case PAPR (in dB) for a single-user "whole bandwidth" tone plan having 5 DC tones in various embodiments.

In another 4×HE-LTF embodiment, a 484-tone LTF (plus five DC tones) can be formed as 4×HE-$LTF_{484}$ (−244:244) @40 MHz=[+1, −1, −1, −1, −1, +1, −1, −1, +1, +1, −1, +1, −1, +1, −1, +1, +1, +1, −1, +1, −1, +1, +1, −1, +1, −1, +1, −1, −1, −1, +1, −1, −1, +1, +1, −1, +1, −1, −1, −1, −1, +1, +1, +1, −1, +1, +1, +1, −1, +1, −1, +1, +1, +1, +1, −1, −1, +1, +1, −1, −1, −1, −1, +1, +1, −1, +1, +1, −1, −1, +1, −1, +1, +1, −1, −1, −1, −1, +1, +1, −1, +1, +1, +1, −1, −1, +1, +1, −1, −1, −1, −1, +1, −1, −1, +1, +1, −1, +1, −1, −1, −1, −1, −1, +1, −1, +1, +1, +1,
−1, −1, +1, +1, +1, +1, +1, +1, +1, +1, −1, +1, +1, −1, −1,
+1, −1, +1, +1, +1, +1, +1, −1, +1, −1, −1, −1, +1, +1, −1,
−1, −1, −1, −1, −1, −1, +1, −1, −1, +1, −1, +1, −1, +1, −1,
+1, −1, +1, +1, −1, +1, −1, −1, −1, +1, +1, −1, −1, −1, −1,
−1, −1, −1, +1, −1, −1, +1, +1, −1, +1, −1, −1, −1, −1, −1,
+1, −1, +1, +1, +1, −1, +1, +1, +1, −1, −1, −1, −1, −1, +1,
−1, +1, −1, −1, +1, +1, −1, +1, +1, −1, +1, +1, −1, +1, +1,
−1, −1, −1, +1, +1, −1, −1, −1, +1, +1, +1, +1, −1, +1, +1,
−1, −1, +1, −1, +1, +1, +1, +1, +1, −1, +1, −1, −1, −1, +1,
+1, −1, −1, −1, +1, 0, 0, 0, 0, 0, −1, +1, +1, +1, +1, −1, +1,
+1, −1, −1, +1, −1, +1, −1, +1, −1, −1, +1, −1, +1, +1, +1,
−1, −1, +1, +1, +1, +1, +1, +1, +1, −1, +1, +1, −1, −1, +1,
−1, +1, +1, +1, +1, +1, +1, −1, +1, −1, −1, −1, +1, +1, −1, −1,
−1, +1, +1, −1, −1, −1, −1, +1, −1, −1, +1, +1, −1, +1, −1,
+1, −1, +1, +1, −1, +1, −1, −1, −1, +1, +1, −1, −1, −1, +1,
+1, +1, +1, −1, +1, −1, −1, −1, +1, +1, +1, +1, +1, +1,
−1, +1, −1, −1, −1, +1, +1, −1, −1, −1, +1, −1, −1, −1, −1,
+1, −1, −1, +1, +1, −1, +1, −1, +1, −1, +1, +1, −1, +1, −1,
−1, −1, +1, −1, −1, −1, +1, −1, −1, −1, +1, −1, +1, −1,
+1, +1, −1, +1, −1, +1, +1, −1, −1, +1, −1, −1, −1, +1,
+1, −1, −1, −1, −1, −1, −1, −1, +1, −1, −1, +1, −1, +1, +1,
−1, −1, −1, −1, −1, +1, −1, +1, +1, −1, −1, −1, +1, +1, +1,
−1, +1, −1, −1, −1, −1, +1, −1, −1, +1, +1, −1, +1, −1, +1,
−1, +1, −1, −1, +1, −1, −1, +1, +1, −1, −1, +1, +1, −1, +1,
+1, +1, −1, +1, +1, −1, −1, +1, −1, +1, +1, +1, +1, −1,
+1, −1, −1, −1, +1, +1, −1, −1, −1, −1].

In one 2×HE-LTF embodiment, a 484-tone LTF (plus three DC tones), can be formed as [M1, 0, 0, 0, c12.*M1]. In one embodiment, the rotation pattern C can be [+1, +1, +1, −1, −1, −1, +1, −1, −1, +1, −1, +1]. In another embodiment, the rotation pattern C can be [−1, −1, −1, +1, +1, +1, −1, +1, +1, −1, +1, +1]. These rotation patterns can advantageously provide PAPRs for allocations of 484-tone RUs, as shown in FIG. 7F. For example, the first row of FIG. 7F shows worst-case PAPRs (in dB) for each 24-tone RU shown in the first row of FIG. 7A, respectively. The second row of FIG. 7F shows worst-case PAPRs (in dB) for each 52- and 26-tone RU shown in the second row of FIG. 7A, respectively. The third row of FIG. 7F shows worst-case PAPRs (in dB) for each 106- and 26-tone RU shown in the third row of FIG. 7A, respectively. The fourth row of FIG. 7F shows worst-case PAPRs (in dB) for each 242-tone RU shown in the fourth row of FIG. 7A, respectively. The fifth row of FIG. 7F shows the worst-case PAPR (in dB) for a single-user "whole bandwidth" tone plan having 5 DC tones in various embodiments.

In another 2×HE-LTF embodiment, a 484-tone LTF (plus three DC tones), can be formed as [M1(121:−1:1), 0, 0, 0, c12.*M1] (where 121:−1:1 denotes the elements in M1 are taken from the last one to the first one. In one embodiment, the rotation pattern C can be [+1, −1, −1, −1, +1, +1, +1, +1, +1, −1, +1, +1]. In another embodiment, the rotation pattern C can be [−1, +1, +1, +1, −1, −1, −1, −1, −1, +1, −1, +1]. These rotation patterns can advantageously provide PAPRs for allocations of 484-tone RUs, as shown in FIG. 7G. For example, the first row of FIG. 7G shows worst-case PAPRs (in dB) for each 24-tone RU shown in the first row of FIG. 7A, respectively. The second row of FIG. 7G shows worst-case PAPRs (in dB) for each 52- and 26-tone RU shown in the second row of FIG. 7A, respectively. The third row of FIG. 7G shows worst-case PAPRs (in dB) for each 106- and 26-tone RU shown in the third row of FIG. 7A, respectively. The fourth row of FIG. 7G shows worst-case PAPRs (in dB) for each 242-tone RU shown in the fourth row of FIG. 7A, respectively. The fifth row of FIG. 7G shows the worst-case PAPR (in dB) for a single-user "whole bandwidth" tone plan having 5 DC tones in various embodiments.

In another 2×HE-LTF embodiment, a 484-tone LTF (plus three DC tones), can be formed as [+1, c1.*[M2, M22], c2, c3.*[M2, −M22], c4.*M23, c5, c6.*[M2, M22], c7, c8.*[−M2, M22], 0, 0, 0, b1.*[−M2, M23], b2, b3.*[−M2, −M23], b4, b5.*M2, b6.*[M2, −M23], b7, b8.*[−M2, −M23], b9], where M2 is [+1, +1, +1, +1, +1, −1, −1, +1, +1, −1, +1, −1, +1], M22 is [M2(1:7), −M2(8:13)], and M23 is [−M2(1:6), M2(7:13)]. In one embodiment, the rotation pattern C can be [−1, +1, −1, −1, −1, +1, −1, +1] and the rotation pattern B can be [+1, +1, −1, +1, +1, −1, +1, +1, +1]. These rotation patterns can advantageously provide PAPRs for allocations of four 106-tone RUs, two 242-tone RUs, and 484-tone RUs, as shown in FIG. 7H. For example, the first row of FIG. 7H shows worst-case PAPRs (in dB) for each 24-tone RU shown in the first row of FIG. 7A, respectively. The second row of FIG. 7H shows worst-case PAPRs (in dB) for each 52- and 26-tone RU shown in the second row of FIG. 7A, respectively. The third row of FIG. 7H shows worst-case PAPRs (in dB) for each 106- and 26-tone RU shown in the third row of FIG. 7A, respectively. The fourth row of FIG. 7H shows worst-case PAPRs (in dB) for each 242-tone RU shown in the fourth row of FIG. 7A, respectively. The fifth row of FIG. 7H shows the worst-case PAPR (in dB) for a single-user "whole bandwidth" tone plan having 5 DC tones in various embodiments.

In another 2×HE-LTF embodiment, a 484-tone LTF (plus three DC tones) can be formed as $LTF_{484}(-244:2:244)$=[+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1], where M2 is [+1, +1, +1, +1, +1, −1, −1, +1, +1, −1, +1, −1, +1], M22 is [M2(1:7), −M2(8:13)], and M23 is [−M2(1:6), M2(7:13)]. In various embodiment, this LTF pattern can advantageously provide PAPRs for allocations of four 106-tone RUs, two 242-tone RUs, and 484-tone RUs, as shown in FIG. 7H. For example, the first row of FIG. 7H shows worst-case PAPRs (in dB) for each 24-tone RU shown in the first row of FIG. 7A, respectively. The second row of FIG. 7H shows worst-case PAPRs (in dB) for each 52- and 26-tone RU shown in the second row of FIG. 7A, respectively. The third row of FIG. 7H shows worst-case PAPRs (in dB) for each 106- and 26-tone RU shown in the third row of FIG. 7A, respectively. The fourth row of FIG. 7H shows worst-case PAPRs (in dB) for each 242-tone RU shown in the fourth row of FIG. 7A, respectively. The fifth row of FIG. 7H shows the worst-case PAPR (in dB) for a single-user "whole bandwidth" tone plan having 5 DC tones in various embodiments.

In another 2×HE-LTF embodiment, a 484-tone LTF can be formed as 2×HE-$LTF_{484}$(−244:2:244) @40 MHz=[+1,
−1, −1, −1, −1, −1, +1, +1, −1, −1, +1, −1, +1, −1, −1, −1,
−1, −1, −1, +1, +1, +1, +1, +1, −1, +1, +1, −1, −1, −1,
−1, −1, +1, +1, −1, −1, +1, −1, −1, +1, +1, +1, +1, +1,
−1, −1, −1, −1, +1, −1, −1, +1, +1, +1, +1, −1, +1,
−1, −1, +1, −1, +1, −1, −1, +1, +1, +1, +1, −1, −1, +1,
+1, −1, +1, −1, +1, +1, +1, +1, +1, −1, −1, −1, +1,
−1, +1, −1, −1, −1, −1, −1, −1, +1, −1, −1, +1, −1,
+1, −1, +1, +1, +1, +1, −1, −1, −1, +1, −1, −1, −1,
0, 0, 0, −1, −1, −1, −1, −1, +1, −1, −1, +1, −1, −1, −1,
−1, −1, −1, −1, −1, −1, +1, +1, −1, −1, +1, +1, +1,
+1, +1, +1, +1, −1, +1, −1, +1, −1, +1, −1, −1, +1,
−1, +1, −1, −1, +1, −1, +1, −1, +1, +1, +1, +1, +1,
+1, −1, +1, +1, −1, +1, −1, +1, −1, −1, −1, −1, +1,
+1, −1, −1, +1, −1, +1, −1, −1, −1, −1, −1, +1, −1, +1, +1, −1, +1, −1, +1, +1, −1, −1, −1, −1, −1, +1, +1, −1, −1,
+1, −1, +1, −1, +1, +1, +1, +1, +1, −1, +1, −1, −1, +1, −1,
+1, −1, +1].

As used herein, it will be understood by one skilled in the art that the notation (X:Y:Z) uses MATLAB™ vector indexing notation and indicates every Y-th value of a vector from X to Z. Because the remaining values are zero, the full sequence can also be denoted as 2×HE-LTF$_{484}$(−244:244) @40 MHz=[+1, 0, −1, 0, −1, 0, −1, 0, −1, 0, −1, 0, +1, 0, +1,
0, −1, 0, −1, 0, +1, 0, −1, 0, +1, 0, −1, 0, −1, 0, −1, 0, −1,
0, −1, 0, −1, 0, +1, 0, +1, 0, +1, 0, +1, 0, −1, 0, +1, 0, −1,
0, +1, 0, +1, 0, −1, 0, −1, 0, −1, 0, −1, 0, −1, 0, +1, 0, +1,
0, −1, 0, −1, 0, +1, 0, −1, 0, +1, 0, −1, 0, +1, 0, +1, 0, +1,
0, +1, 0, +1, 0, −1, 0, −1, 0, −1, 0, +1, 0, −1, 0, +1, 0, +1,
0, −1, 0, +1, 0, +1, 0, +1, 0, +1, 0, +1, 0, −1, 0, +1, 0, −1,
0, −1, 0, +1, 0, −1, 0, +1, 0, −1, 0, −1, 0, +1, 0, +1, 0, +1,
0, +1, 0, +1, 0, −1, 0, −1, 0, +1, 0, +1, 0, −1, 0, +1, 0, −1,
0, +1, 0, +1, 0, +1, 0, +1, 0, +1, 0, +1, 0, −1, 0, −1, 0, −1,
0, −1, 0, +1, 0, −1, 0, +1, 0, −1, 0, −1, 0, −1, 0, −1, 0, −1,
0, −1, 0, −1, 0, +1, 0, +1, 0, −1, 0, −1, 0, +1, 0, −1, 0, +1,
0, −1, 0, +1, 0, +1, 0, +1, 0, +1, 0, −1, 0, −1, 0, −1, 0, −1,
0, +1, 0, +1, 0, −1, 0, +1, 0, −1, 0, 0, 0, 0, 0, 0, 0, −1, 0, −1,
0, −1, 0, −1, 0, +1, 0, +1, 0, −1, 0, −1, 0, +1, 0, −1,
0, +1, 0, −1, 0, −1, 0, −1, 0, −1, 0, −1, 0, +1, 0, −1,
0, +1, 0, +1, 0, +1, 0, −1, 0, +1, 0, +1, 0, +1, 0, +1,
0, +1, 0, +1, 0, +1, 0, −1, 0, −1, 0, +1, 0, +1, 0, −1,
0, −1, 0, +1, 0, −1, 0, −1, 0, −1, 0, −1, 0, +1, 0, −1,
0, +1, 0, +1, 0, −1, 0, −1, 0, +1, 0, +1, 0, +1, 0, +1,
0, +1, 0, +1, 0, −1, 0, −1, 0, +1, 0, +1, 0, −1, 0, +1,
0, −1, 0, +1, 0, −1, 0, −1, 0, −1, 0, −1, 0, +1, 0, +1,
0, −1, 0, −1, 0, +1, 0, −1, 0, +1, 0, −1, 0, −1, 0, −1,
0, −1, 0, −1, 0, +1, 0, −1, 0, +1, 0, +1, 0, −1, 0, +1, 0, −1,
0, +1, 0, +1, 0, −1, 0, −1, 0, −1, 0, −1, 0, +1, 0, +1, 0, −1,
0, −1, 0, +1, 0, −1, 0, +1, 0, −1, 0, −1, 0, +1, 0, +1, 0, +1,
0, −1, 0, +1, 0, +1].

In one 1×HE-LTF embodiment, a 40 MHz 484-tone LTF, can be set equal to a 20 MHz 2×LTF. Thus, in one embodiment, 1×HE-LTF484(−244:4:244) @ 40 MHz=LTF_HE20_2×=[−1, −1, +1, +1, −1, +1, −1, −1, −1,
−1, +1, −1, +1, −1, −1, +1, +1, −1, +1, +1, +1, +1, +1, −1,
+1, −1, +1, −1, −1, +1, −1, +1, −1, −1, −1, −1, +1, −1,
+1, +1, +1, −1, −1, +1, −1, −1, −1, −1, +1, −1, −1,
+1, +1, +1, −1, −1, +1, 0, +1, −1, +1, +1, −1, +1, +1, −1, +1,
+1, −1, +1, −1, +1, +1, +1, +1, −1, +1, −1, +1, +1, −1,
−1, +1, −1, +1, −1, −1, −1, +1, +1, +1, −1, −1, +1, −1,
−1, +1, −1, −1, −1, +1, −1, +1, +1, −1, −1, +1, −1,
−1, −1, −1, −1, +1, −1, +1]. In various embodiments, a 1×HE-LTF can be used only with SU "whole bandwidth" allocations. The foregoing 40 MHz 1×HE-LTF can provide a worst-case PAPR of 6.7445 dB over all P and R values when applying single stream pilots.

In another 1×HE-LTF embodiment, 1×HE-LTF484(−244:4:244) @ 40 MHz=[c12.*M1(61:121), 0, c13.*M1(1:61)], where x=[+1, +1, +1, −1, −1, −1, +1, −1, −1, +1, −1], M1=[c1.*x, c2.*x, c3.*x, c4.*x, c5.*x, c6.*x, c7.*x, c8.*x, c9.*x, c10.*x, c11.*x], and [c1, c2, c3, c4, c5, c6, c7, c8, c9, c10, c11, c12, c13] is the rotation pattern C consisting of {+/−1} values. In various embodiments, the rotation pattern C=[c1, c2, c3, c4, c5, c6, c7, c8, c9, c10, c11, c12, c13]= [+1+1, −1, +1, −1, +1, +1, +1, +1, +1, −1, +1, −1], which can advantageously provide a worst-case PAPR of 5.4933 dB. Accordingly, 1×HE-LTF484(−244:4:244) @ 40 MHz=[−1,
+1, −1, −1, +1, −1, +1, +1, +1, −1, −1, −1, +1, −1, +1,
−1, +1, +1, −1, −1, −1, +1, −1, +1, −1, +1, +1, +1, −1,
−1, −1, +1, −1, −1, −1, +1, −1, +1, +1, +1, +1, −1, +1,
−1, −1, +1, −1, −1, −1, −1, +1, +1, +1, −1, +1, −1, +1,
−1, −1, +1, −1, −1, −1, −1, +1, +1, −1, +1, +1, −1, +1,
0 −1, −1, −1, +1, +1, +1, −1, +1, +1, −1, +1, −1, −1, −1, +1,
+1, +1, −1, +1, +1, −1, +1, +1, +1, +1, −1, −1, −1, +1, −1,
−1, +1, −1, −1, −1, −1, +1, +1, +1, −1, +1, +1, −1, +1, +1,
+1, +1, −1, −1, −1, +1, −1, −1, +1, −1, −1, −1, +1, +1,
+1].

In another 1×HE-LTF embodiment, 1×HE-LTF484(−244:4:244) @ 40 MHz=[+1, c1.*M2, c2.*M2, c3.*M4, c4.*M2, c5, c6.*M2, 0, c7.*M2, c8, c9.*M2, c10.*M4, c11.*M2, c12.*M2, c13], where M2=[+1, +1, +1, +1, +1, −1, −1, +1, +1, −1, +1, −1, +1], M4=[+1, +1, +1, −1, −1, +1, −1], and [c1, c2, c3, c4, c5, c6, c7, c8, c9, c10, c11, c12, c13] is the rotation pattern C consisting of {+/−1} values. In various embodiments, the rotation pattern C=[c1, c2, c3, c4, c5, c6, c7, c8, c9, c10, c11, c12, c13]=[+1, +1, −1, −1, −1, +1, +1, +1, −1, −1, +1, −1, +1], which can advantageously provide a worst-case PAPR of 5.7612 dB.

In another 1×HE-LTF embodiment, a 40 MHz 484-tone HE-LTF can be based on a 40 MHz HT-LTF, LTF_HT40= [+1, +1, −1, −1, +1, +1, −1, +1, −1, +1, +1, +1, +1, +1, +1,
−1, −1, +1, +1, −1, +1, −1, +1, +1, +1, +1, +1, +1, −1, −1,
+1, +1, −1, +1, −1, +1, −1, −1, −1, −1, −1, +1, +1, −1, −1,
+1, −1, +1, −1, +1, +1, +1, +1, −1, −1, −1, +1, 0, 0, 0, −1,
+1, +1, −1, +1, +1, −1, −1, +1, −1, +1, −1, +1, +1, +1, +1,
+1, +1, +1, −1, −1, +1, +1, −1, −1, +1, +1, +1, +1, +1, +1,
+1, −1, +1, +1, +1, −1, +1, +1, −1, −1, −1, −1, −1, −1, +1,
+1, −1, −1, +1, −1, +1, −1, +1, +1, +1, +1]. Thus, in one embodiment, 1×HE-LTF484(−244:4:244) @ 40 MHz=[c1, c2, c3, LTF_HT40(1:57), c4, 0, c9.*[c5, LTF_HT40(61:117), c6, c7, c8]], where [c1, c2, c3, c4, c5, c6, c7, c8, c9] is the rotation pattern C consisting of {+/−1} values. In various embodiments, the rotation pattern C=[c1, c2, c3, c4, c5, c6, c7, c8, c9]=[−1, −1, +1, −1, −1, +1, +1, +1, +1], which can advantageously provide a worst-case PAPR of 6.2672 dB.

In another 1×HE-LTF embodiment, a 40 MHz 484-tone HE-LTF can be based on a 20 MHz HT-LTF: LTF_HT20= [+1, +1, +1, +1, −1, −1, +1, +1, −1, +1, −1, +1, +1, +1, +1,
+1, +1, −1, −1, +1, +1, −1, +1, −1, +1, +1, +1, +1, 0, +1, −1,
−1, +1, −1, +1, −1, +1, −1, −1, −1, −1, −1, +1, −1, +1, −1,
−1, +1, −1, +1, −1, +1, +1, +1, +1, −1, −1]. Thus, in one embodiment, 1×HE-LTF484(−244:4:244) @ 40 MHz=[c1, LTF_HT20(1:28), c2, LTF_HT20(30:57), c3, c4. c5, 0, c6.*[c7, c8, c9, LTF_HT20(1:28), c10, LTF_HT20(30:57), c11]], where [c1, c2, c3, c4, c5, c6, c7, c8, c9, c10, c11] is the rotation pattern C consisting of {+/−1} values. In various embodiments, the rotation pattern C=[c1, c2, c3, c4, c5, c6, c7, c8, c9, c10, c11]=[−1, −1, −1, +1, −1, +1, +1, −1, +1, −1, −1], which can advantageously provide a worst-case PAPR of 6.2543 dB.

In another 1×HE-LTF embodiment, a 40 MHz 484-tone HE-LTF can be based on a mirrored and rotated 20 MHz 2×HE-LTF. In one embodiment, LTF_HE20 2×=[−1, −1, −1,
+1, +1, −1, +1, −1, −1, −1, −1, +1, −1, −1, −1, −1, +1, +1,
−1, +1, +1, +1, −1, +1, −1, −1, +1, −1, −1, −1, +1, −1, −1,
+1, −1, −1, −1, +1, −1, +1, +1, +1, −1, +1, −1, +1, −1, −1,
−1, −1, −1, +1, −1, −1, −1, +1, +1, +1, −1, −1, +1, 0, +1, −1,
+1, +1, −1, +1, +1, −1, +1, +1, −1, −1, −1, +1, +1, +1,
+1, −1, +1, +1, +1, −1, −1, +1, −1, −1, −1, −1, +1,
−1, +1, +1, −1, −1, +1, +1, −1, +1, −1, −1, −1, +1, −1,
+1, +1, +1, −1, −1, +1, −1, −1, −1, −1, −1, +1, −1, +1]. Thus, in one embodiment, 1×HE-LTF484(−244:4:244) @ 40 MHz [LTF_HE20 2×(1:62), −LTF_HE20 2×(123:−1:63)], which can advantageously provide a worst-case PAPR of 6.4445 dB over all P and R values when applying single stream pilots.

In another 1×HE-LTF embodiment, 1×HE-LTF484(−244:4:244) @ 40 MHz=[Ga, c1, c2.*Ga, c3, c4, c5, c6, c7, c8, c9, c10, 0, c11, c12, c13, c14, c15, c16, c17, c18, c19.*Gb, c20, c21.*Gb], where Ga is [+1, +1, +1, +1, −1, +1, +1, −1, −1, +1, −1, +1, −1, +1, −1, −1, +1, −1, +1, +1, +1, −1, −1, +1, +1, +1] and Gb is [+1, +1, +1, +1, −1, +1, +1, −1, −1, +1, −1, +1, +1, +1, +1, +1, −1, +1, −1, −1, −1, +1, +1, −1, −1, −1] (together forming a length-26 Golay pair), and [c1, c2, c3, c4, c5, c6, c7, c8, c9, c10, c11, c12, c13, c14, c15, c16, c17, c18, c19, c20, c21] is the rotation pattern C consisting of {+/−1} values. In various embodiments, the rotation pattern C=[c1, c2, c3, c4, c5, c6, c7, c8, c9, c10, c11, c12, c13, c14, c15, c16, c17, c18, c19, c20, c21]=[+1, +1, +1, −1, +1, −1, +1, −1, −1, −1, +1, +1, −1, −1, +1, −1, +1, +1, +1, +1, −1], which can advantageously provide a worst-case PAPR of 4.5428 dB. Accordingly, 1×HE-LTF484(−244:4: 244) @ 40 MHz=[+1, +1, +1, +1, −1, +1, +1, −1, −1, +1, −1, +1, −1, +1, −1, −1, +1, −1, +1, +1, +1, −1, −1, +1, +1, +1, +1, +1, +1, +1, −1, +1, +1, −1, −1, +1, −1, +1, −1, +1, −1, −1, +1, −1, +1, +1, +1, +1, +1, −1, −1, +1, −1, +1, +1, −1, −1, +1, +1, +1, −1, −1, +1, −1, −1, −1, 0, +1, +1, −1, −1, +1, −1, +1, +1, +1, +1, +1, −1, +1, +1, −1, −1, +1, −1, +1, +1, +1, +1, +1, −1, +1, −1, −1, −1, +1, +1, −1, −1, +1, +1, −1, −1, −1, −1, +1, −1, −1, +1, +1, −1, +1, −1, −1, −1, −1, −1, +1, −1, +1, +1, +1, −1, −1, −1, +1, +1, +1].

As used herein, it will be understood by one skilled in the art that the notation (X:Y:Z) uses MATLAB™ vector indexing notation and indicates every Y-th value of a vector from X to Z. Because the remaining values are zero, the full sequence can also be denoted as 1×HE-LTF484(−244:244) @ 40 MHz=[+1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, 0, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, +1].

In another 1×HE-LTF embodiment, 1×HE-LTF484(−244: 4:244) @ 40 MHz=[Gb, c1, c2.*Gb, c3, c4, c5, c6, c7, c8, c9, c10, 0, c11, c12, c13, c14, c15, c16, c17, c18, c19.*Ga, c20, c21.*Ga], where Ga is [+1, +1, +1, +1, −1, +1, +1, −1, −1, +1, −1, +1, −1, +1, −1, −1, +1, −1, +1, +1, +1, −1, −1, +1, +1, +1] and Gb is [+1, +1, +1, +1, −1, +1, +1, −1, −1, +1, −1, +1, +1, +1, +1, +1, −1, +1, −1, −1, −1, +1, +1, −1, −1, −1] (together forming a length-26 Golay pair), and [c1, c2, c3, c4, c5, c6, c7, c8, c9, c10, c11, c12, c13, c14, c15, c16, c17, c18, c19, c20, c21] is the rotation pattern C consisting of {+/−1} values. In various embodiments, the rotation pattern C=[c1, c2, c3, c4, c5, c6, c7, c8, c9, c10, c11, c12, c13, c14, c15, c16, c17, c18, c19, c20, c21]=[+1, +1, +1, +1, −1, +1, −1, −1, +1, −1, −1, −1, −1, −1, −1, −1, −1, −1, −1, +1, +1, −1], which can advantageously provide a worst-case PAPR of 4.5651 dB.

LTF for 80 MHz PPDU

FIG. 8A shows example 80 MHz transmissions 800. The transmissions 800 have 12 left edge tones, 7 DC tones, and 11 right edge tones, and a total of 994 usable tones for OFDMA, and a total of 996 usable tones for whole BW allocation with reduced number of DC tones being 5. Although FIG. 8A shows five example transmissions 800 using various combinations of 26-, 52-, 106-, 107-, 242-, and 996-tone blocks, allocations within any given transmission can include multiple tone blocks of different sizes, having different arrangements, in various embodiments. For example, in some embodiments 484-tone blocks can replace sets of two 242-tone blocks. In the illustrated embodiment, each 80 MHz transmission 800 is a duplicate of four 20 MHz transmissions 750, which in various embodiments, can be the 20 MHz transmissions 600 of FIG. 6A or any other 20 MHz transmission discussed herein. Additionally or alternatively, each 80 MHz transmission 800 is a duplicate of two 40 MHz transmissions 850, which in various embodiments, can be the 40 MHz transmissions 700 of FIG. 7A or any other 40 MHz transmission discussed herein. In the illustrated embodiment, each 80 MHz transmission 800 further includes an additional 26-tone block divided into two separate 13-tone portions on either side of the 7 DC tones.

The first of the illustrated transmissions 800 includes four 20 MHz portions 750 each including nine 26-tone blocks, 2*A outer leftover tones, 2*B middle leftover tones, 2*C inner leftover tones, and 2*D additional inner leftover tones. In the illustrated embodiment, A=1, B=2, C=0, and D=1. The first of the illustrated transmissions 800 further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like. In an embodiment, pilot tones can be located at tone indices −494, −480, −468, −454, −440, −426, −414, −400, −386, −372, −360, −346, −334, −320, −306, −292, −280, −266, −252, −238, −225, −212, −198, −184, −172, −158, −144, −130, −118, −104, −92, −78, −64, −50, −38, −24, −10, 10, 24, 38, 50, 64, 78, 92, 104, 118, 130, 144, 158, 172, 184, 198, 212, 225, 238, 252, 266, 280, 292, 306, 320, 334, 346, 360, 372, 386, 400, 414, 426, 440, 454, 468, 480, and 494.

The second of the illustrated transmissions 800 includes four 20 MHz portions 750 each including four 52-tone blocks, one 26-tone block, 2*A outer leftover tones, 2*B middle leftover tones, 2*C inner leftover tones, and 2*D additional inner leftover tones. In the illustrated embodiment, A=1, B=2, C=0, and D=1. The second of the illustrated transmissions 800 further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like. In an embodiment, pilot tones can be located at tone indices −494, −480, −468, −454, −440, −426, −414, −400, −386, −372, −360, −346, −334, −320, −306, −292, −280, −266, −252, −238, −225, −212, −198, −184, −172, −158, −144, −130, −118, −104, −92, −78, −64, −50, −38, −24, −10, 10, 24, 38, 50, 64, 78, 92, 104, 118, 130, 144, 158, 172, 184, 198, 212, 225, 238, 252, 266, 280, 292, 306, 320, 334, 346, 360, 372, 386, 400, 414, 426, 440, 454, 468, 480, and 494.

The third of the illustrated transmissions 800 includes four 20 MHz portions 750 each including two blocks having 106 tones (102 usable, plus 4 pilot), one 26-tone block, and D leftover tones on each side of the 106-tone blocks. In the illustrated embodiment, D=1. Thus, in the portions where two 106-tone blocks are adjacent, there are a total of 2 leftover tones between the 106-tone blocks (one for each block). The third of the illustrated transmissions 800 further includes an additional 26-tone block divided into two separate 13-tone portions on either side of the 7 DC tones. As discussed herein, leftover tones can variously be used as edge tones, DC tones, control tones, additional guard tones (for example, in the case of non-contiguous channel bonding), and the like. In an embodiment, pilot tones can be located at tone indices −494, −468, −426, −400, −386, −372, −360, −334, −292, −266, −252, −225, −184, −158, −144, −130, −118, −92, −50, −24, −10, 10, 24, 50, 92, 118, 130, 144, 158, 184, 225, 252, 266, 292, 334, 360, 372, 386, 400, 426, 468, and 494.

The fourth of the illustrated transmissions 800 includes four 20 MHz portions 750. Each 20 MHz portion 750 includes a single 242-tone block. The fourth of the illustrated transmissions 800 further includes an additional 26-tone block divided into two separate 13-tone portions on either side of the 7 DC tones. In an embodiment, pilot tones can be located at tone indices −494, −468, −426, −400, −360, −334, −292, −266, −252, −225, −184, −158, −118, −92, −50, −24, −10, 10, 24, 50, 92, 118, 158, 184, 225, 252, 266, 292, 334, 360, 400, 426, 468, and 494.

The fifth of the illustrated transmissions 800 includes a single-user "whole bandwidth" tone plan having 5 DC tones in various embodiments. Accordingly, the SU tone plan can include 996 usable tones. In an embodiment, pilot tones can be located at tone indices −468, −400, −334, −266, −226, −158, −92, −24, 24, 92, 158, 226, 266, 334, 400, and 468.

In various embodiments, the transmission 800 of FIG. 8A can be used for transmission of an HE-LTF (such as the HE-LTF 465 of FIG. 4) for an 80 MHz PPDU. The HE-LTF can be constructed with a base sequence x=[+1, +1, +1, −1, −1, −1, +1, −1, −1, +1, −1] (11 tones). A portion of a rotation pattern C=[$c_1$, $c_2$, $c_3$, $c_4$, $c_5$, $c_6$, $c_7$, $c_8$, $c_9$, $c_{10}$, $c_{11}$, $c_{12}$, $c_{13}$, $c_{14}$, $c_{15}$, $c_{16}$, $c_{17}$, $c_{18}$, $c_{19}$, $c_{20}$, $c_{21}$, $c_{22}$, . . . ], consisting of ±1 values, can be applied to the base sequence x, resulting in a sequence M1=[$c_1$.*x, $c_2$.*x, $c_3$.*x, $c_4$.*x, $c_5$.*x, $c_6$.*x, $c_7$.*x, $c_8$.*x, $c_9$.*x, $c_{10}$.*x, $c_{11}$.*x] (121 tones). In 4× embodiments, the HE-LTF can further include another sequence M2=[+1, +1, +1, +1, +1, −1, −1, +1, +1, −1, +1, −1, +1]. In 2× embodiments, the HE-LTF can further include another sequence M3=[+1, +1, +1, −1, −1, +1, −1].

In one 4×HE-LTF embodiment, a 996-tone LTF (plus five DC tones) can be formed as [M1, $c_{12}$.*M1, $c_{13}$.*M1, $c_{14}$.*M1, $c_{15}$.*M2, $c_{16}$, 0, 0, 0, 0, 0, $c_{17}$, $c_{18}$.*M2, $c_{19}$.*M1, $c_{20}$.*M1, $c_{21}$.*M1, $c_{22}$.*M1]. In one embodiment, the rotation pattern C can be [+1, +1, +1, −1, −1, −1, +1, −1, −1, +1, −1, +1, +1, −1, +1, +1, −1, +1, +1, −1, +1, +1, +1, +1, −1, +1]. In another embodiment, the rotation pattern C can be [−1, −1, −1, +1, +1, +1, −1, +1, +1, −1, +1, +1, +1, −1, −1, −1, +1, −1, +1, +1, −1, +1]. These rotation patterns can advantageously minimize the worst-case PAPRs for allocations of 996-tone RUs, as shown in FIG. 8B. Note that FIG. 8B shows only PAPRs for the left-hand side of FIG. 8A, and the right-hand side consists of mirrored PAPR values. For example first row of FIG. 8B shows worst-case PAPRs (in dB) for each 24-tone RU shown in the first row of FIG. 8A, respectively. The second row of FIG. 8B shows worst-case PAPRs (in dB) for each 52- and 26-tone RU shown in the second row of FIG. 8A, respectively. The third row of FIG. 8B shows worst-case PAPRs (in dB) for each 106- and 26-tone RU shown in the third row of FIG. 8A, respectively. The fourth row of FIG. 8B shows worst-case PAPRs (in dB) for each 242-tone RU shown in the fourth row of FIG. 8A, respectively. The fifth row of FIG. 8B shows worst-case PAPRs (in dB) for each 484-tone RU (not shown). The sixth row of FIG. 8B shows the worst-case PAPR (in dB) for a single-user "whole bandwidth" tone plan having 7 DC tones in various embodiments.

Figures 8C, 8D, 8E:
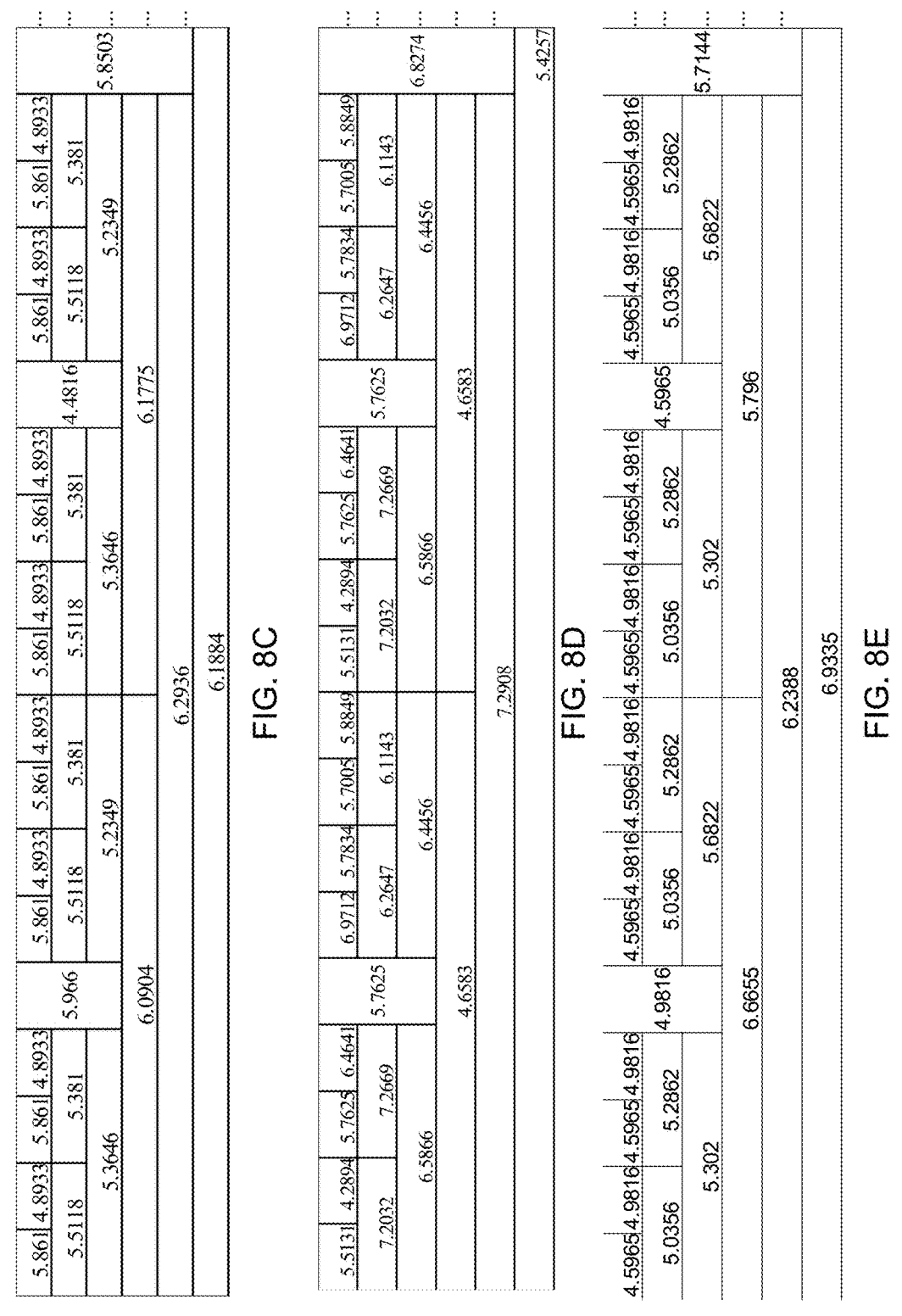

In another 4×HE-LTF embodiment, a 996-tone LTF (plus five DC tones) can be formed as [[$c_1$, $c_2$.*[Ga, −Gb], $c_3$, $c_4$, $c_5$.*[Ga, Gb], $c_6$, $c_7$.*Gb, $c_8$, $c_9$.*[Ga, −Gb], $c_{10}$, $c_{11}$, $c_{12}$.*[Ga, Gb], $c_{13}$, [$c_1$, $c_2$.*[Ga, −Gb], $c_3$, $c_4$, $c_5$.*[Ga, Gb], $c_6$, $c_7$.*Ga, (−1)*[$c_8$, $c_9$.*[Ga, −Gb], $c_{10}$, $c_{11}$, $c_{12}$.*[Ga, Gb], $c_{13}$]], $c_{14}$.*Ga(1:13), $c_{15}$, 0, 0, 0, 0, 0, $c_{16}$, $c_{14}$.*Ga(14:26), [$c_1$, $c_2$.*[Ga, −Gb], $c_3$, $c_4$, $c_5$.*[Ga, Gb], $c_6$, $c_7$.*Gb, $c_8$, $c_9$.*[Ga, −Gb], $c_{10}$, $c_{11}$, $c_{12}$.*[Ga, Gb], $c_{13}$]], (−1)*[$c_1$, $c_2$.*[Ga, −Gb], $c_3$, $c_4$, $c_5$.*[Ga, Gb], $c_6$, $c_7$.*Ga, (−1)*[$c_8$, $c_9$.*[Ga, −Gb], $c_{10}$, $c_{11}$, $c_{12}$.*[Ga, Gb], $c_{13}$]]], where Ga is [+1, +1, +1, +1, −1, +1, +1, −1, −1, +1, −1, +1, −1, +1, −1, −1, +1, −1, +1, +1, +1, −1, −1, +1, +1, +1] and Gb is [+1, +1, +1, +1, −1, +1, +1, −1, −1, +1, −1, +1, +1, +1, +1, +1, −1, +1, −1, −1, −1, +1, +1, −1, −1, −1] (together forming a length-26 Golay pair). In one embodiment, the rotation pattern C can be [+1, −1, +1, −1, −1, −1, +1, −1, +1, +1, −1, −1, −1, −1, −1, +1]. These rotation patterns can advantageously minimize the worst-case PAPRs for allocations of 996-tone RUs, two 484-tone RUs, and four 242-tone RUs, as shown in FIG. 8C. Note that FIG. 8C shows only PAPRs for the left-hand side of FIG. 8A, and the right-hand side consists of mirrored PAPR values. For example first row of FIG. 8C shows worst-case PAPRs (in dB) for each 24-tone RU shown in the first row of FIG. 8A, respectively. The second row of FIG. 8C shows worst-case PAPRs (in dB) for each 52- and 26-tone RU shown in the second row of FIG. 8A, respectively. The third row of FIG. 8C shows worst-case PAPRs (in dB) for each 106- and 26-tone RU shown in the third row of FIG. 8A, respectively. The fourth row of FIG. 8C shows worst-case PAPRs (in dB) for each 242-tone RU shown in the fourth row of FIG. 8A, respectively. The fifth row of FIG. 8C shows worst-case PAPRs (in dB) for each 484-tone RU (not shown). The sixth row of FIG. 8C shows the worst-case PAPR (in dB) for a single-user "whole bandwidth" tone plan having 7 DC tones in various embodiments.

In another 4×HE-LTF embodiment, a 996-tone LTF (plus five DC tones) can be formed as $LTF_{996}$=[+1, −Ga, Gb, +1, −1, −Ga, −Gb, −1, Gb, −1, Ga, −Gb, +1, −1, −Ga, −Gb, −1, +1, −Ga, Gb, +1, −1, −Ga, −Gb, −1, Ga, +1, −Ga, Gb, −1, +1, Ga, Gb, +1, −Ga(1:13), −1, 0, 0, 0, 0, 0, +1, −Ga(14:26), +1, −Ga, Gb, +1, −1, −Ga, −Gb, −1, Gb, −1, Ga, −Gb, +1, −1, −Ga, −Gb, −1, −1, Ga, −Gb, −1, +1, Ga, Gb, +1, −Ga, −1, Ga, −Gb, +1, −1, −Ga, −Gb, −1], where Ga is [+1, +1, +1, +1, −1, +1, +1, −1, −1, +1, −1, +1, −1, +1, −1, −1, +1, −1, +1, +1, +1, −1, −1, +1, +1, +1] and Gb is [+1, +1, +1, +1, −1, +1, +1, −1, −1, +1, −1, +1, +1, +1, +1, +1, −1, +1, −1, −1, −1, +1, +1, −1, −1, −1] (together forming a length-26 Golay pair). In various embodiment, this LTF pattern can advantageously minimize the worst-case PAPRs for allocations of 996-tone RUs, two 484-tone RUs, and four 242-tone RUs, as shown in FIG. 8C. Note that FIG. 8C shows only PAPRs for the left-hand side of FIG. 8A, and the right-hand side consists of mirrored PAPR values. For example first row of FIG. 8C shows worst-case PAPRs (in dB) for each 24-tone RU shown in the first row of FIG. 8A, respectively. The second row of FIG. 8C shows worst-case PAPRs (in dB) for each 52- and 26-tone RU shown in the second row of FIG. 8A, respectively. The third row of FIG. 8C shows worst-case PAPRs (in dB) for each 106- and 26-tone RU shown in the third row of FIG. 8A, respectively. The fourth row of FIG. 8C shows worst-case PAPRs (in dB) for each 242-tone RU shown in the fourth row of FIG. 8A, respectively. The fifth row of FIG. 8C shows worst-case PAPRs (in dB) for each 484-tone RU (not shown). The sixth row of FIG. 8C shows the worst-case PAPR (in dB) for a single-user "whole bandwidth" tone plan having 7 DC tones in various embodiments.

In one 2×HE-LTF embodiment a 996-tone LTF (plus three DC tones), can be formed as [c12.*M1, c13.*M1, c14.*M3, 0, 0, 0, c15.*M3, c16.*M1, c17.*M1]. In one embodiment, the rotation pattern C can be [+1, +1, +1, −1, −1, −1, +1, −1, −1, +1, −1, +1, −1, +1, +1, −1, −1]. In another embodiment, the rotation pattern C can be [+1, +1, +1, −1, −1, −1, +1, −1, −1, +1, −1, −1, +1, −1, −1, +1, +1]. In another embodiment, the rotation pattern C can be [−1, −1, −1, +1, +1, +1, −1, +1, +1, −1, +1, +1, −1, −1, −1, −1, −1]. In another embodiment, the rotation pattern C can be [−1, −1, −1, +1, +1, +1, −1, +1, +1, −1, +1, −1, +1, +1, +1, +1, +1]. These rotation patterns can advantageously provide PAPRs for allocations of 996-tone RUs, as shown in FIG. 8D. For example, the first row of FIG. 8D shows worst-case PAPRs (in dB) for each 24-tone RU shown in the first row of FIG. 8A, respectively. The second row of FIG. 8D shows worst-case PAPRs (in dB) for each 52- and 26-tone RU shown in the second row of FIG. 8A, respectively. The third row of FIG. 8D shows worst-case PAPRs (in dB) for each 106- and 26-tone RU shown in the third row of FIG. 8A, respectively. The fourth row of FIG. 8D shows worst-case PAPRs (in dB) for each 242-tone RU shown in the fourth row of FIG. 8A, respectively. The fifth row of FIG. 8D shows worst-case PAPRs (in dB) for each 484-tone RU (not shown). The sixth row of FIG. 8D shows the worst-case PAPR (in dB) for a single-user "whole bandwidth" tone plan having 7 DC tones in various embodiments.

In another 2×HE-LTF embodiment a 996-tone LTF (plus three DC tones), can be formed as [[[c1, c2.*[M2, −M22], c3, c4.*[M2, M22], c5.*M23, c6, c7.*[M2, −M22], c8, c9.*[M2, M22]], [c1, c2.*[M2, −M22], c3, c4.*[M2, M22], c5.*M2,(−1)*[c6, c7.*[M2, −M22], c8, c9.*[M2, M22]]], c10.*M4, 0, 0, 0, c11.*M4(7:−1:1), [c9.*[M2, −M23], c8, c7.*[M2, M23], c6, c5.*M22, c4.*[M2, −M23], c3, c2.*[M2, M23], c1], (−1)*[c9.*[M2, −M23], c8, c7.*[M2, M23], c6, c5.*M2,(−1)*[c4.*[M2, −M23], c3, c2.*[M2, M23], c1]]]], where M4 is [+1, +1, +1, −1, −1, +1, −1]. In one embodiment, the rotation pattern C can be [+1, −1, −1, +1, +1, −1, +1, +1, +1, +1, −1]. These rotation patterns can advantageously provide PAPRs for allocations of 996-tone RUs, two 484-tone RUs, and four 242-tone RUs, as shown in FIG. 8E. For example, the first row of FIG. 8E shows worst-case PAPRs (in dB) for each 24-tone RU shown in the first row of FIG. 8A, respectively. The second row of FIG. 8E shows worst-case PAPRs (in dB) for each 52- and 26-tone RU shown in the second row of FIG. 8A, respectively. The third row of FIG. 8E shows worst-case PAPRs (in dB) for each 106- and 26-tone RU shown in the third row of FIG. 8A, respectively. The fourth row of FIG. 8E shows worst-case PAPRs (in dB) for each 242-tone RU shown in the fourth row of FIG. 8A, respectively. The fifth row of FIG. 8E shows worst-case PAPRs (in dB) for each 484-tone RU (not shown). The sixth row of FIG. 8E shows the worst-case PAPR (in dB) for a single-user "whole bandwidth" tone plan having 7 DC tones in various embodiments.

In another 2×HE-LTF embodiment a 996-tone LTF (plus three DC tones), can be formed as $LTF_{996}(-500:2:500)$=[+1, −M2, M22, −1, M2, M22, M23, −1, M2, −M22, +1, M2, M22, +1, −M2, M22, −1, M2, M22, M2, +1, −M2, M22, −1, −M2, −M22], M4, 0, 0, 0, −M4(7:−1:1), M2, −M23, +1, M2, M23, −1, M22, M2, −M23, −1, −M2, −M23, +1, −M2, M23, −1, −M2, −M23, +1, −M2, M2, −M23, −1, −M2, −M23, +1], where M2 is [+1, +1, +1, +1, +1, −1, −1, +1, +1, −1, +1, −1, +1], M22 is [M2(1:7), −M2(8:13)], M23 is [−M2(1:6), M2(7:13)], and M4 is [+1, +1, +1, −1, −1, +1, −1]. In various embodiment, this LTF pattern can advantageously provide PAPRs for allocations of 996-tone RUs, two 484-tone RUs, and four 242-tone RUs, as shown in FIG. 8E. For example, the first row of FIG. 8E shows worst-case PAPRs (in dB) for each 24-tone RU shown in the first row of FIG. 8A, respectively. The second row of FIG. 8E shows worst-case PAPRs (in dB) for each 52- and 26-tone RU shown in the second row of FIG. 8A, respectively. The third row of FIG. 8E shows worst-case PAPRs (in dB) for each 106- and 26-tone RU shown in the third row of FIG. 8A, respectively. The fourth row of FIG. 8E shows worst-case PAPRs (in dB) for each 242-tone RU shown in the fourth row of FIG. 8A, respectively. The fifth row of FIG. 8E shows worst-case PAPRs (in dB) for each 484-tone RU (not shown). The sixth row of FIG. 8E shows the worst-case PAPR (in dB) for a single-user "whole bandwidth" tone plan having 7 DC tones in various embodiments.

In another 2×HE-LTF embodiment a 996-tone LTF (plus three DC tones), can be formed as [[[c1, c2.*[M2, −M22], c3, c4.*[M2, M22], c5.*M23, c6, c7.*[M2, −M22], c8, c9.*[M2, M22]], [c1, c2.*[M2, −M22], c3, c4.*[M2, M22], c5.*M2,(−1)*[c6, c7.*[M2, −M22], c8, c9.*[M2, M22]]], c10.*M6(1:7), 0, 0, 0, c10.*M6(8:14), [c9.*[M2, −M23], c8, c7.*[M2, M23], c6, c5.*M22, c4.*[M2, −M23], c3, c2.*[M2, M23], c1], (−1)*[c9.*[M2, −M23], c8, c7.*[M2, M23], c6, c5.*M2,(−1)*[c4.*[M2, −M23], c3, c2.*[M2, M23], c1]]]], where M6 is [+1, +1, −1, −1, −1, +1, +1, +1, −1, −1, +1, −1, −1, +1]. In one embodiment, the rotation pattern C can be [+1, −1, +1, +1, +1, −1, +1, +1, +1, +1]. These rotation patterns can advantageously provide PAPRs for allocations of 996-tone RUs, two 484-tone RUs, and four 242-tone RUs, as shown in FIG. 8E. For example, the first row of FIG. 8E shows worst-case PAPRs (in dB) for each 24-tone RU shown in the first row of FIG. 8A, respectively. The second row of FIG. 8E shows worst-case PAPRs (in dB) for each 52- and 26-tone RU shown in the second row of FIG. 8A, respectively. The third row of FIG. 8E shows worst-case PAPRs (in dB) for each 106- and 26-tone RU shown in the third row of FIG. 8A, respectively. The fourth row of FIG. 8E shows worst-case PAPRs (in dB) for each 242-tone RU shown in the fourth row of FIG. 8A, respectively. The fifth row of FIG. 8E shows worst-case PAPRs (in dB) for each 484-tone RU (not shown). The sixth row of FIG. 8E shows the worst-case PAPR (in dB) for a single-user "whole bandwidth" tone plan having 7 DC tones in various embodiments.

Figure 8F:
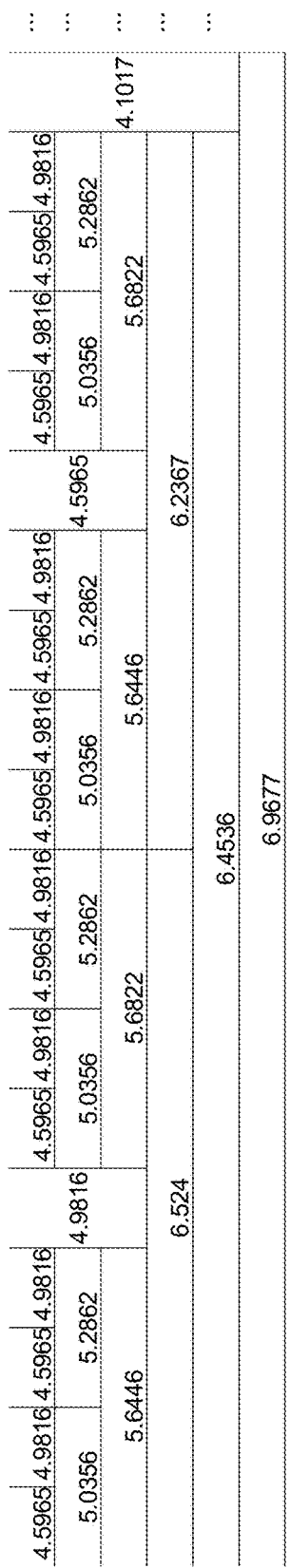

FIG. 9 shows a flowchart 900 for an example method of communicating over a wireless communication network using a resource unit. The method can be implemented in whole or in part by the devices described herein, such as the wireless device 202 shown in FIG. 2 or the AP 104 shown in FIG. 1. Although the illustrated method is described herein with reference to the wireless communication system 100 discussed above with respect to FIG. 1, and the transmissions 600-800 discussed above with respect to FIGS. 6-8, a person having ordinary skill in the art will appreciate that the illustrated method can be implemented by another device or transmission described herein, or any other suitable device or transmission. Although the illustrated method is described herein with reference to a particular order, in various embodiments, blocks herein can be performed in a different order, or omitted, and additional blocks can be added.

At block 910, the AP 104 generates a high-efficiency long training (HE-LTF) field, based on at least one of a sequence x=[+1, +1, +1, −1, −1, −1, +1, −1, −1, +1, −1], a rotation pattern B=[b1−by], a rotation pattern C=[c1−cy], a sequence M1=[c1.*x, c2.*x, c3.*x, c4.*x, c5.*x, c6.*x, c7.*x, c8.*x, c9.*x, c10.*x, c11.*x], a sequence M2=[+1, +1, +1, +1, +1, −1, −1, +1, +1, −1, +1, −1, +1], a sequence M22=[M2(1:7), −M2(8:13)], a sequence M23=[−M2(1:6), M2(7:13)], a sequence M3=[+1, +1, +1, −1, −1, +1, −1], a sequence M4=[+1, +1, +1, −1, −1, +1, −1], a sequence M5=[+1, +1, −1, +1, −1, +1, +1, +1, −1, −1, −1, −1, −1, +1], a sequence M6=[+1, +1, −1, −1, −1, +1, +1, +1, −1, −1, +1, −1, −1, +1], a sequence Ga=[+1, +1, +1, +1, −1, +1, +1, −1, −1, +1, −1, +1, −1, +1, −1, −1, +1, −1, +1, +1, +1, −1, −1, +1, +1, +1], a sequence Gb=[+1, +1, +1, +1, −1, +1, +1, −1, −1, +1, −1, +1, +1, +1, +1, −1, +1, −1, −1, −1, +1, +1, −1, −1, −1], a sequence N1=[+1, +1, +1, +1, +1, +1, +1, +1, +1, −1, +1, −1, −1, +1, +1, −1, +1, −1, +1, +1, +1, −1, +1, −1, +1, +1], a sequence N2=[+1, −1, +1, −1, +1, +1, +1, +1, −1, −1, +1, −1, −1, +1, +1, −1, −1, +1, +1, −1, +1, +1, +1, +1], a sequence Nc=[+1, +1, +1, +1, −1, −1, +1, +1, +1, +1, 1, +1], a sequence O1=[+1, −1, +1, −1, +1, −1, +1, −1, +1, +1, +1, +1, −1, +1, +1, −1, −1, −1, −1, +1, +1, −1, −1, −1], a sequence O2=[+1, −1, +1, +1, −1, +1, +1, +1, −1, −1, −1, −1, −1, +1, +1, −1, −1, +1, +1, +1, −1, +1, +1, +1, +1], a sequence Oc=[+1, +1, +1, +1, −1, −1, +1, +1, +1, +1, −1, +1, −1, +1, −1, +1, −1, −1, +1, +1, −1, −1, +1, −1, +1], a sequence Ma=Ga(1:2:25), and a sequence Mb=Gb(1:2:25). The AP 104 generates the HE-LTF according to at least one of [+1, −Ga, −Gb, −1, Ga, −Gb, Ga(1:13), +1, −1, 0, 0, 0, +1, +1, Ga(14:26), −Ga, −Gb, +1, −Ga, Gb, +1] for transmission over a 20 MHz channel, [+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1] for transmission over a 40 MHz channel, [+1, −1, −1, −1, −1, +1, −1, −1, +1, +1, −1, +1, −1, +1, −1, +1, +1, −1, +1, −1, −1, −1, +1, +1, −1, −1, −1, −1, −1, −1, −1, −1, +1, +1, −1, +1, +1, −1, −1, −1, −1, −1, +1, +1, +1, +1, −1, +1, +1, +1, −1, −1, +1, −1, +1, +1, +1, +1, −1, +1, +1, −1, −1, −1, −1, −1, +1, +1, +1, −1, +1, +1, +1, +1, +1, −1, +1, +1, −1, −1, −1, −1, +1, +1, −1, +1, +1, +1, −1, −1, −1, −1, −1, −1, +1, −1, +1, +1, +1, +1, −1, +1, +1, −1, +1, +1, −1, −1, −1, −1, −1, +1, −1, +1, +1, +1, +1, +1, −1, −1, +1, −1, −1, +1, −1, −1, −1, −1, −1, −1, +1, +1, −1, −1, −1, −1, −1, −1, −1, −1, +1, −1, +1, +1, −1, −1, +1, +1, +1, −1, −1, −1, −1, −1, −1, −1, −1, −1, −1, +1, −1, +1, +1, −1, −1, +1, +1, +1, −1, −1, +1, +1, −1, +1, +1, +1, −1, +1, +1, +1, +1, −1, −1, +1, −1, −1, +1, +1, −1, +1, +1, +1, +1, +1, −1, +1, +1, −1, −1, +1, 0, 0, 0, 0, 0, −1, +1, +1, +1, +1, −1, +1, +1, −1, +1, +1, −1, −1, +1, −1, −1, −1, −1, −1, +1, +1, +1, −1, −1, +1, +1, +1, +1, +1, −1, −1, −1, +1, +1, −1, −1, +1, +1, +1, −1, +1, +1, +1, −1, −1, +1, −1, −1, −1, +1, +1, +1, +1, −1, +1, +1, −1, +1, −1, +1, −1, −1, −1, −1, +1, +1, +1, −1, +1, +1, −1, +1, −1, −1, −1, +1, −1, +1, −1, +1, +1, −1, +1, −1, −1, −1, −1, −1, +1, −1, −1, +1, −1, −1, −1, −1, −1, −1, −1, +1, +1, −1, −1, +1, +1, −1, −1, −1, −1, −1, −1, −1, −1, +1, −1, −1, +1, +1, +1, +1, −1, −1, +1, +1, +1, −1, +1, −1, −1, −1, −1, −1, −1, +1, +1, −1, −1, −1, +1, −1, +1, +1, −1, +1, −1, +1, +1, +1, +1, +1, +1, +1, +1, +1, +1, +1, −1, +1, +1, −1, +1, +1, +1, −1, +1, +1, +1, +1, −1, −1, −1, +1, +1, −1, −1, −1, −1] for transmission over a 40 MHz channel, [+1, −Ga, Gb, +1, −1, −Ga, −Gb, −1, Gb, −1, Ga, −Gb, +1, −1, −Ga, −Gb, −1, +1, −Ga, Gb, +1, −1, −Ga, −Gb, −1, Ga, +1, −Ga, Gb, −1, +1, Ga, Gb, +1, −Ga(1:13), −1, 0, 0, 0, 0, 0, +1, −Ga(14:26), +1, −Ga, Gb, +1, −1, −Ga, −Gb, −1, Gb, −1, Ga, −Gb, +1, −1, −Ga, −Gb, −1, −1, Ga, −Gb, −1, +1, Ga, Gb, +1, −Ga, −1, Ga, −Gb, +1, −1, −Ga, −Gb, −1] for transmission over a 80 MHz channel, [+1, −M2, M22, M2, −M23, −M4, −1, 0, +1, −M4(7:−1:1), −M2, −M22, M2, M23, −1] for transmission over a 20 MHz channel, [+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1] for transmission over a 40 MHz channel, [+1, −1, −1, −1, −1, −1, +1, +1, −1, −1, +1, −1, +1, −1, −1, −1, −1, −1, −1, −1, +1, +1, +1, +1, −1, +1, −1, +1, −1, −1, −1, −1, −1, +1, +1, −1, −1, +1, −1, +1, −1, +1, +1, +1, −1, −1, −1, −1, −1, +1, +1, +1, +1, −1, +1, +1, +1, +1, −1, +1, −1, +1, −1, −1, −1, −1, −1, −1, +1, +1, +1, +1, −1, +1, +1, +1, −1, −1, −1, −1, −1, −1, −1, −1, −1, +1, +1, +1, +1, +1, −1, +1, −1, −1, −1, −1, +1, +1, −1, −1, +1, +1, +1, +1, −1, −1, +1, −1, +1, +1, +1, −1, −1, +1, +1, +1, −1, −1, +1, +1, +1, +1, +1, −1, +1, +1, −1, −1, +1, +1, −1, −1, +1, −1, −1, −1, +1, +1, −1, 0, 0, 0, −1, −1, −1, −1, +1, +1, −1, −1, −1, −1, −1, −1, −1, +1, +1, +1, −1, +1, −1, +1, +1, +1, +1, +1, +1, +1, +1, −1, +1, −1, +1, −1, −1, −1, −1, −1, −1, −1, −1, −1, −1, −1, +1, +1, +1, +1, +1, +1, −1, +1, +1, −1, +1, −1, −1, −1, −1, −1, −1, −1, −1, −1, −1, −1, +1, −1, −1, +1, −1, +1, −1, +1, +1, +1, +1, +1, +1, −1, −1, +1, −1, +1, −1, +1, −1, +1, −1, +1, −1, +1] for transmission over a 40 MHz channel, [+1, −M2, M22, −1, M2, M22, M23, −1, M2, −M22, +1, M2, M22, +1, −M2, M22, −1, M2, M22, M2, +1, −M2, M22, −1, −M2, −M22], M4, 0, 0, 0, −M4(7:−1:1), M2, −M23, +1, M2, M23, −1, M22, M2, −M23, −1, −M2, −M23, +1, −M2, M23, −1, −M2, −M23, +1, −M2, M2, −M23, −1, −M2, −M23, +1] for transmission over a 80 MHz channel, [M1, 0, 0, 0, c12.*M1] for transmission over a 20 MHz channel, [+1, c1.*Ga, c2.*Gb, c3, c4.*Ga, c5.*Gb, c6.*Ga(1:13), c7, c8, 0, 0, 0, c9, c10, c11.*Ga(14:26), c12.*Ga, c13.*Gb, c14, c15.*Ga, c16.*Gb, c17] for transmission over a 20 MHz channel, [+1, c1.*Ga, c2.*Gb, c3, c4.*Ga, c5.*Gb, c6.*Ga(1:13), c7, c8, 0, 0, 0, c9, c10, c6.*Ga(14:26), c11.*Ga, c12.*Gb, c13, c14.*Ga, c15.*Gb, c16] for transmission over a 20 MHz channel, [+1, c1.*N1, c2.*N2, c3, c4.*N1, c5.*N2, c6.*Nc(1:13), c7, c8, 0, 0, 0, c9, c10, c6.*Nc(14:26), c11.*N2, c12.*N1, c13, c14.*N2, c15.*N1, c16] for transmission over a 20 MHz channel, [+1, c1.*O1, c2.*O2, c3, c4.*O1, c5.*O2, c6.*Oc(1:13), c7, c8, 0, 0, 0, c9, c10, c6.*Oc(14:26), c11.*O1, c12.*O2, c13, c14.*O1, c15.*O2, c16] for transmission over a 20 MHz channel, [c12.*M1(61:121), 0, c13.*M1(1:61)] for transmission over a 20 MHz channel, [+1, c1.*Ma, c2.*Mb, c3.*Ma, c3.*Mb, c4.*M4, c5, 0, c6, c7.*M4(7:−1:1), c8.*Ma, c9.*Mb, c10.*Ma, c10.*Mb, c11] for transmission over a 20 MHz channel, [+1, c1.*Ma, c2.*Mb, c3.*Ma, c3.*Mb, c4.*M5(1:7), c5, 0, c6, c4.*M5(8:14), c7.*Ma, c8.*Mb, c9.*Ma, c9.*Mb, c10] for transmission over a 20 MHz channel, [+1, c1.*M2, c2.*M22, c3.*M2, c4.*M23, c5.*M4, c6, 0, c7, c8.*M4(7:−1:1), c9.*M2, c10.*M22, c11.*M2, c12.*M23, c13] for transmission over a 20 MHz channel, [+1, c1.*M2, c2.*M22, c3.*M2, c4.*M23, c5.*M6(1:7), c6, 0, c7, c5.*M6(8:14), c8.*M2, c9.*M22, c10.*M2, c11.*M23, c12] for transmission over a 20 MHz channel, [M1, c12.*M1, 0, 0, 0, 0, 0, c13.*M1, c14.*M1] for transmission over a 40 MHz channel, [+1, c1.*[Ga, Gb], c2, c3, c4.*[Ga, -Gb], c5, c6.*Gb, c7, c8*[Ga, Gb], c9, c10, c11.*[Ga, -Gb], c12, 0, 0, 0, 0, 0, b1, b2.*[Ga, Gb], b3, b4, b5.*[Ga, -Gb], b6, b7.*Ga, b8, b9.*[Ga, Gb], b10, b11, b12.*[Ga, -Gb], b13] for transmission over a 40 MHz channel, [+1, c1.*[Ga, Gb], c2, c3, c4.*[Ga, -Gb], c5, c6.*Gb, c7, c1.*[Ga, Gb], c8, c9, c4.*[Ga, Gb], c10, 0, 0, 0, 0, 0, b1, c1.*[-Ga, -Gb], b2, b3, c4.*[-Ga, Gb], b4, b5.*Ga, b6, c1.*[Ga, Gb], b7, b8, c4.*[-Ga, Gb], b9] for transmission over a 40 MHz channel, [+1, c1.*[Ga, Gb], c2, c3, c4.*[Ga, -Gb], c5, c6.*Gb, c7, c1.*[Ga, Gb], c8, c9, c4.*[-Ga, Gb], c10, 0, 0, 0, 0, 0, b1, c1.*[-Ga, -Gb], b2, b3, c4.*[-Ga, Gb], b4, b5.*Ga, b6, c1.*[Ga, Gb], b7, b8, c4.*[-Ga, Gb], b9] for transmission over a 40 MHz channel, [M1, 0, 0, 0, c12.*M1] for a 40 MHz HE-LTF for transmission over a 40 MHz channel, [M1(121:-1:1), 0, 0, 0, c12.*M1] for transmission over a 40 MHz channel, [+1, c1.*[M2, M22], c2, c3.*[M2, -M22], c4.*M23, c5, c6.[M2, M22], c7, c8.*[-M2, M22], 0, 0, 0, b1.*[-M2, M23], b2, b3.*[-M2, -M23], b4, b5.*M2, b6.*[M2, -M23], b7, b8.*[-M2, -M23], b9] for transmission over a 40 MHz channel, [M1, c12.*M1, c13.*M1, c14.*M1, c15.*M2, c16, 0, 0, 0, 0, 0, c17, c18.*M2, c19.*M1, c20.*M1, c21.*M1, c22.*M1] for transmission over an 80 MHz channel, [[c1, c2.*[Ga, -Gb], c3, c4, c5.*[Ga, Gb], c6, c7.*Gb, c8, c9.*[Ga, -Gb], c10, c11, c12.*[Ga, Gb], c13, [c1, c2.*[Ga, -Gb], c3, c4, c5.*[Ga, Gb], c6, c7.*Ga, (-1)*[c8, c9.*[Ga, -Gb], c10, c11, c12.*[Ga, Gb], c13]], c14.*Ga(1:13), c15, 0, 0, 0, 0, 0, c16, c14.*Ga(14:26), [c1, c2.*[Ga, -Gb], c3, c4, c5.*[Ga, Gb], c6, c7.*Gb, c8, c9.*[Ga, -Gb], c10, c11, c12.*[Ga, Gb], c13], (-1)*[c1, c2.*[Ga, -Gb], c3, c4, c5.*[Ga, Gb], c6, c7.*Ga, (-1)*[c8, c9.*[Ga, -Gb], c10, c11, c12.*[Ga, Gb], c13]]] for transmission over an 80 MHz channel, [c12.*M1, c13.*M1, c14.*M3, 0, 0, 0, c15.*M3, c16.*M1, c17.*M1] for transmission over an 80 MHz channel, [[[c1, c2.[M2, -M22], c3, c4.*[M2, M22], c5.*M23, c6, c7.*[M2, -M22], c8, c9.[M2, M22]], [c1, c2.*[M2, -M22], c3, c4.*[M2, M22], c5.*M2,(-1)*[c6, c7.*[M2, -M22], c8, c9.*[M2, M22]]], c10.*M4, 0, 0, 0, c11.*M4(7:-1:1), [c9.*[M2, -M23], c8, c7.*[M2, M23], c6, c5.*M22, c4.*[M2, -M23], c3, c2.*[M2, M23], c1], (-1)*[c9.*[M2, -M23], c8, c7.*[M2, M23], c6, c5.*M22,(-1)*[c4.*[M2, M23], c3, c2.*[M2, M23], c1]]]] for transmission over an 80 MHz channel, and [[c1, c2.*[M2, -M22], c3, c4.*[M2, M22], c5.*M23, c6, c7.*[M2, -M22], c8, c9.*[M2, M22]], [c1, c2.*[M2, -M22], c3, c4.*[M2, M22], c5.*M2,(-1)*[c6, c7.*[M2, -M22], c8, c9.*[M2, M22]]], c10.*M6(1:7), 0, 0, 0, c10.*M6(8:14), [c9.*[M2, -M23], c8, c7.*[M2, M23], c6, c5.*M22, c4.*[M2, -M23], c3, c2.*[M2, M23], c1], (-1)*[c9.*[M2, -M23], c8, c7.*[M2, M23], c6, c5.*M2,(-1)*[c4.*[M2, -M23], c3, c2.*[M2, M23], c1]]] for transmission over an 80 MHz channel.

At block 920, the AP 104 a packet including the HE-LTF field. For example, the packet can be any of the packets 400 and 600-800 of FIGS. 4 and 6-8. The packet can include, for example, the HE-LTF 465 (FIG. 4) generated according to any of the sequences discussed herein.

In various embodiments, the rotation pattern C equals at least one of [+1, +1, +1, -1, -1, -1, +1, -1, -1, +1, -1, +1], [-1, -1, -1, +1, +1, +1, -1, +1, +1, -1, +1, +1], [+1, -1, +1, +1, +1, -1, +1, -1, -1, -1, +1, +1, +1, -1], [-1, -1, +1, +1, +1, -1, +1, +1, +1, -1, -1, +1, +1], [-1, +1, -1, +1, +1, +1, +1, +1, +1, -1, -1, -1, -1, -1], and [+1, +1, -1, -1, +1, +1, -1, -1, +1, -1, -1, -1, +1, +1, -1, -1, +1, +1, -1, -1, -1, +1, +1, -1, -1, -1, +1, +1, -1, -1, +1, +1, -1, -1, -1, -1, -1, -1, -1, -1, +1, -1]. In various embodiments, the rotation pattern C equals at least one of [+1, +1, -1, -1, -1, -1, +1, -1, +1, +1, -1, +1, -1], [+1, +1, -1, -1, -1, -1, +1, -1, +1, +1, -1, -1, +1], [-1, -1, +1, +1, +1, +1, -1, +1, -1, -1, +1, +1, -1], [-1, -1, +1, +1, +1, -1, +1, -1, -1, +1, -1, +1], [+1, -1, +1, +1, -1, -1, +1, +1, -1, -1, -1], [-1, +1, +1, +1, +1, -1, +1, -1, +1, +1, +1, -1, +1, +1], [-1, +1, +1, -1, -1, -1, +1, -1, -1, -1, +1, +1, -1], and [-1, +1, +1, -1, -1, +1, +1, +1, +1, -1, -1, +1].

In various embodiments, the rotation pattern C equals at least one of [+1, -1, +1, +1, -1, +1, +1, +1, -1, -1, -1, +1, -1, +1], [-1, +1, -1, -1, +1, -1, -1, -1, +1, +1, +1, +1, -1, +1], [+1, +1, +1, -1, -1, -1, -1, +1, +1, +1, +1, -1], [-1, +1, -1, +1, +1, +1, -1, -1, -1, +1], and [-1, -1, -1, +1, +1, +1, -1, -1, -1, +1, +1, +1], and the rotation pattern B equals at least one of [-1, -1, -1, -1, +1, -1, +1, +1, +1, +1, +1, +1, +1], [-1, +1, +1, -1, -1, -1, +1, -1, +1], and [-1, +1, +1, +1, -1, +1, -1, +1, -1]. In various embodiments, the rotation pattern C equals at least one of [+1, +1, +1, -1, -1, -1, +1, -1, -1, +1, -1, +1] and [-1, -1, -1, +1, +1, +1, -1, +1, +1, -1, +1, +1].

In various embodiments, the rotation pattern C equals at least one of [+1, -1, -1, -1, +1, +1, +1, +1, +1, -1, +1, +1], [-1, +1, +1, +1, -1, -1, -1, -1, -1, +1, -1, +1], and [-1, +1, -1, -1, -1, +1, -1, +1], and the rotation pattern B equals [+1, +1, -1, +1, +1, -1, +1, +1, +1].

In various embodiments, the rotation pattern C equals at least one of [+1, +1, +1, -1, -1, -1, +1, -1, -1, +1, -1, +1, +1, -1, +1, +1, -1, +1, +1, +1, +1, -1, +1], [-1, -1, -1, +1, +1, +1, -1, +1, +1, -1, +1, +1, +1, -1, +1, +1, -1, +1, +1, +1, +1, -1, +1, +1], and [+1, -1, +1, -1, -1, -1, +1, -1, +1, +1, -1, -1, -1, -1, +1]. In various embodiments, the rotation pattern C equals at least one of [+1, +1, +1, -1, -1, -1, +1, -1, -1, +1, -1, +1, +1, -1, +1, -1, +1, +1, +1, -1, -1, +1, +1], [+1, +1, +1, -1, -1, -1, -1, +1, +1, +1, -1, -1, -1, +1, +1], [-1, -1, -1, +1, +1, +1, -1, -1, -1, -1, -1], [-1, -1, -1, +1, +1, +1, -1, +1, +1, -1, +1, +1, +1, +1, +1, +1, +1, +1, +1, +1], [+1, -1, -1, +1, +1, -1, +1, +1, +1, +1, +1, +1, +1, -1], and [+1, -1, +1, +1, +1, -1, +1, +1, +1, +1, +1, +1]. In various embodiments, a plurality of pilot tones are multiplied by an R-value, all other tones are multiplied by a P-value, and the rotation pattern C includes a sequence that minimizes a maximal peak-to-average power ratio of the HE-LTF over all possible P- and R-values.

In an embodiment, the method shown in FIG. 9 can be implemented in a wireless device that can include a generating circuit, transmitting circuit. Those skilled in the art will appreciate that a wireless device can have more components than the simplified wireless device described herein. The wireless device described herein includes components useful for describing some features of implementations.

The generating circuit can be configured to generate the HE-LTF. In an embodiment, the generating circuit can be configured to implement block 910 of the flowchart 900 (FIG. 9). The generating circuit can include one or more of the DSP 220 (FIG. 2), the processor 204 (FIG. 2), and the memory 206 (FIG. 2). In some implementations, means for generating can include the generating circuit.

The transmitting circuit can be configured to transmit the packet, for example through a transmitter and an antenna of a mobile station or access point. In an embodiment, the generating circuit can be configured to implement block 920 of the flowchart 900 (FIG. 9). The transmitting circuit can include one or more of the transmitter 210 (FIG. 2), the transceiver 214 (FIG. 2), the processor 204 (FIG. 2), the DSP 220 (FIG. 2), the antenna 216 (FIG. 2), and the memory 206 (FIG. 2). In some implementations, means for transmitting can include the transmitting circuit.

Figure 10:
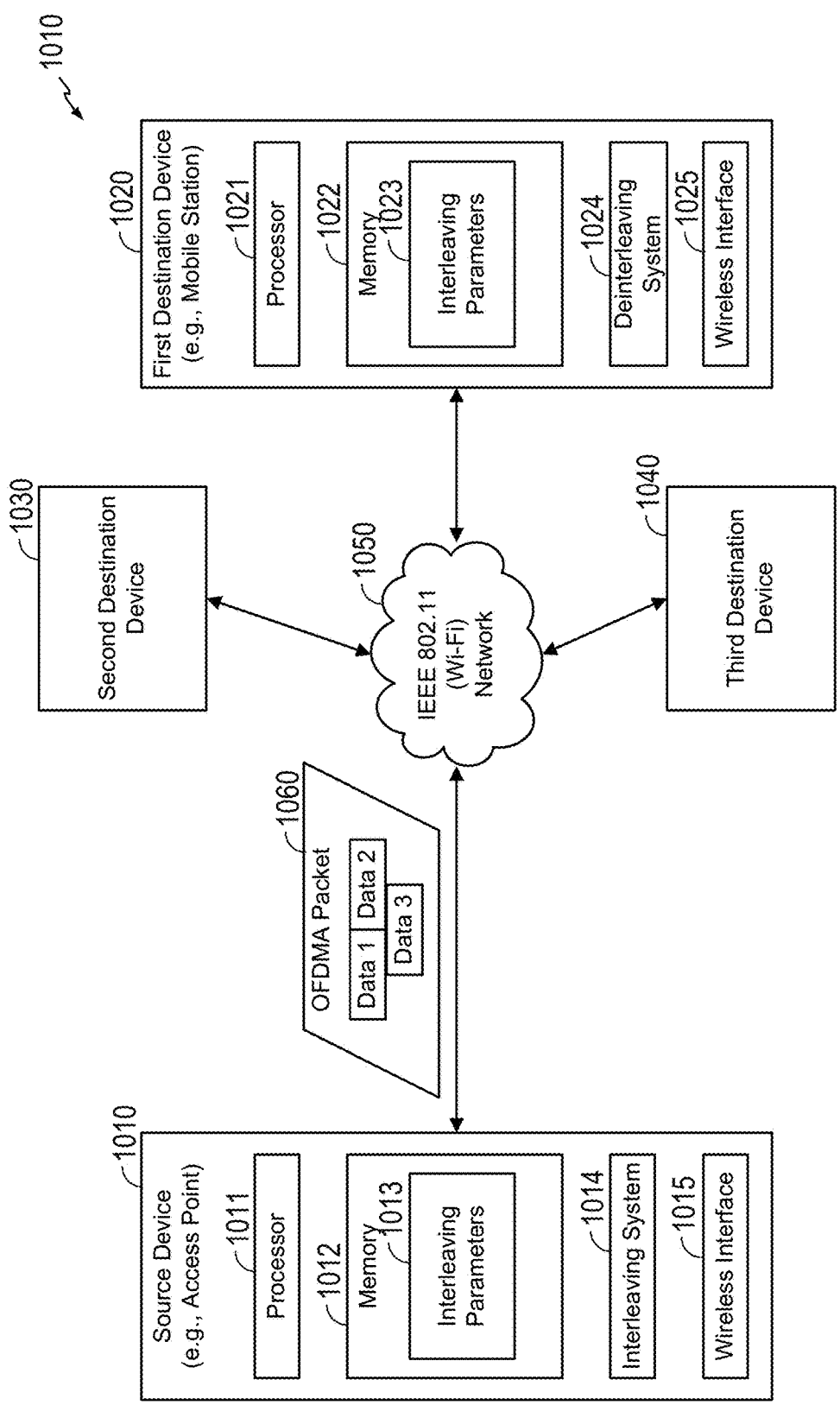
FIG. 10 shows a system that is operable to generate interleaving parameters for orthogonal frequency-division multiple access (OFDMA) tone plans, according to an embodiment.

FIG. 10 shows a system 1000 that is operable to generate interleaving parameters for orthogonal frequency-division multiple access (OFDMA) tone plans, according to an embodiment. The system 1000 includes a first device (e.g., a source device) 1010 configured to wirelessly communicate with a plurality of other devices (e.g., destination devices) 1020, 1030, and 1040 via a wireless network 1050. In alternate embodiments, a different number of source devices destination devices can be present in the system 1000. In various embodiments, the source device 1010 can include the AP 104 (FIG. 1) and the other devices 1020, 1030, and 1040 can include STAs 106 (FIG. 1). The system 1000 can include the system 100 (FIG. 1). In various embodiments, any of the devices 1010, 1020, 1030, and 1040 can include the wireless device 202 (FIG. 2).

In a particular embodiment, the wireless network 1050 is an Institute of Electrical and Electronics Engineers (IEEE) 802.11 wireless network (e.g., a Wi-Fi network). For example, the wireless network 1050 can operate in accordance with an IEEE 802.11 standard. In a particular embodiment, the wireless network 1050 supports multiple access communication. For example, the wireless network 1050 can support communication of a single packet 1060 to each of the destination devices 1020, 1030, and 1040, where the single packet 1060 includes individual data portions directed to each of the destination devices. In one example, the packet 1060 can be an OFDMA packet, as further described herein.

The source device 1010 can be an access point (AP) or other device configured to generate and transmit multiple access packet(s) to multiple destination devices. In a particular embodiment, the source device 1010 includes a processor 1011 (e.g., a central processing unit (CPU), a digital signal processor (DSP), a network processing unit (NPU), etc.), a memory 1012 (e.g., a random access memory (RAM), a read-only memory (ROM), etc.), and a wireless interface 1015 configured to send and receive data via the wireless network 1050. The memory 1012 can store binary convolutional code (BCC) interleaving parameters 1013 used by an interleaving system 1014 to interleave data according to the techniques described with respect to an interleaving system 1014 of FIG. 11.

As used herein, a "tone" can represent a frequency or set of frequencies (e.g., a frequency range) within which data can be communicated. A tone can alternately be referred to as a subcarrier. A "tone" can thus be a frequency domain unit, and a packet can span multiple tones. In contrast to tones, a "symbol" can be a time domain unit, and a packet can span (e.g., include) multiple symbols, each symbol having a particular duration. A wireless packet can thus be visualized as two-dimensional structure that spans a frequency range (e.g., tones) and a time period (e.g., symbols).

As an example, a wireless device can receive a packet via a 20 megahertz (MHz) wireless channel (e.g., a channel having 20 MHz bandwidth). The wireless device can perform a 256-point fast Fourier transform (FFT) to determine 256 tones in the packet. A subset of the tones can be considered "useable" and the remaining tones can be considered "unusable" (e.g., can be guard tones, direct current (DC) tones, etc.). To illustrate, 238 of the 256 tones can be useable, which may include a number of data tones and pilot tones.

In a particular embodiment, the interleaving parameters 1013 can be used by the interleaving system 1014 during generation of the multiple access packet 1060 to determine which data tones of the packet 1060 are assigned to individual destination devices. For example, the packet 1060 can include distinct sets of tones allocated to each individual destination device 1020, 1030, and 1040. To illustrate, the packet 1060 can utilize interleaved tone allocation.

The destination devices 1020, 1030, and 1040 can each include a processor (e.g., a processor 1021), a memory (e.g., a memory 1022), and a wireless interface (e.g., a wireless interface 1025). The destination devices 1020, 1030, and 1040 can also each include a deinterleaving system 1024 configured to deinterleave packets (e.g., single access packets or multiple access packets), as described with reference to a MIMO detector 1118 of FIG. 11. In one example, the memory 1022 can store interleaving parameters 1023 identical to the interleaving parameters 1013.

During operation, the source device 1010 can generate and transmit the packet 1060 to each of the destination devices 1020, 1030, and 1040 via the wireless network 1050. The packet 1060 can include distinct sets of data tones that are allocated to each individual destination device according to an interleaved pattern.

The system 1000 of FIG. 10 can thus provide OFDMA data tone interleaving parameters for use by source devices and destination devices to communicate over an IEEE 802.11 wireless network. For example, the interleaving parameters 1013, 1023 (or portions thereof) can be stored in a memory of the source and destination devices, as shown, can be standardized by a wireless standard (e.g., an IEEE 802.11 standard), etc. It should be noted that various data tone plans described herein can be applicable for both downlink (DL) as well as uplink (UL) OFDMA communication.

For example, the source device 1010 (e.g., an access point) can receive signal(s) via the wireless network 1050. The signal(s) can correspond to an uplink packet. In the packet, distinct sets of tones can be allocated to, and carry uplink data transmitted by, each of the destination devices (e.g., mobile stations) 1020, 1030, and 1040.

Figure 11:
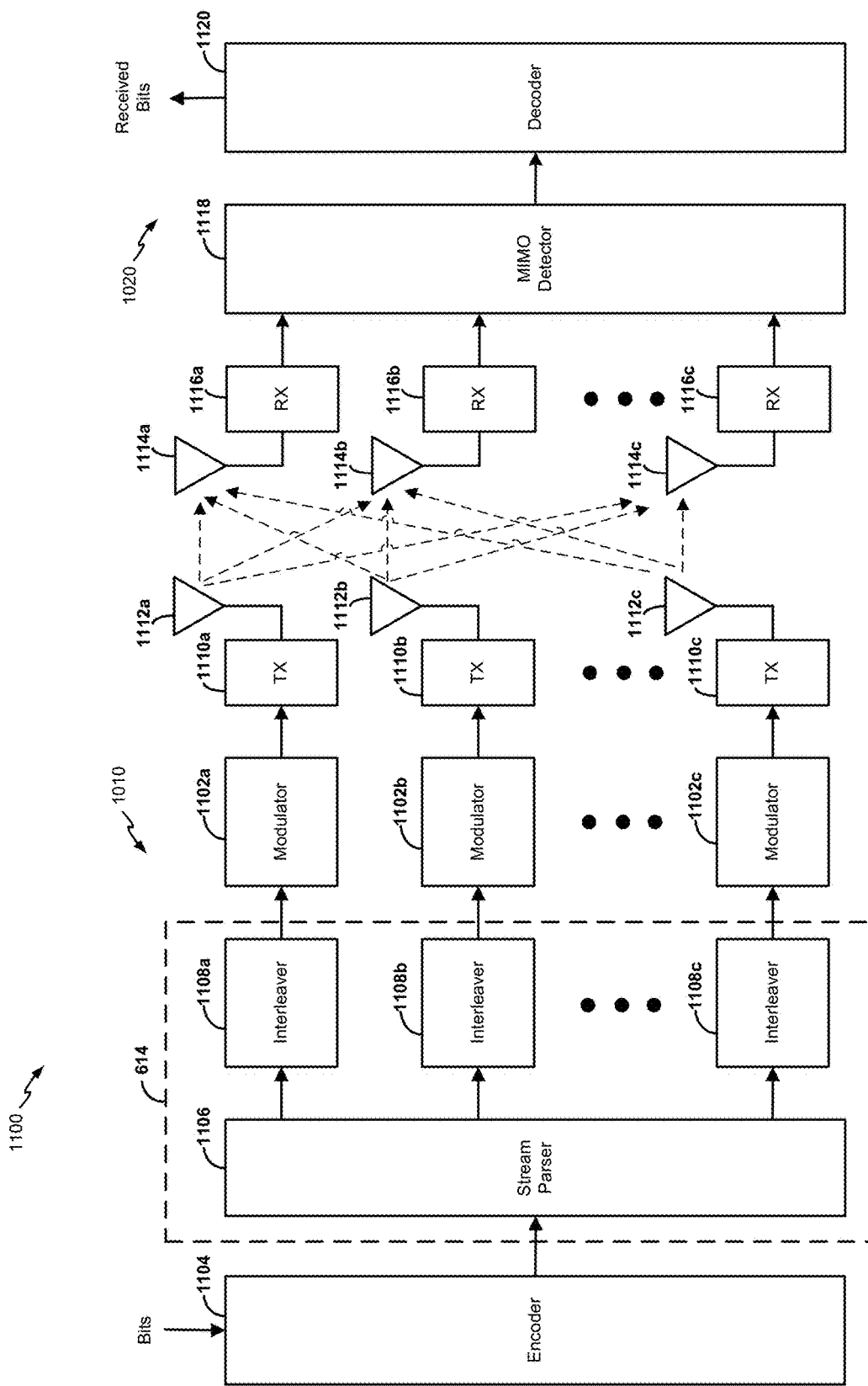
FIG. 11 shows an example multiple-input-multiple-output (MIMO) system that can be implemented in wireless devices, such as the wireless device of FIG. 10, to transmit and receive wireless communications.

FIG. 11 shows an example multiple-input-multiple-output (MIMO) system 1100 that can be implemented in wireless devices, such as the wireless device of FIG. 10, to transmit and receive wireless communications. The system 1100 includes the first device 1010 of FIG. 10 and the destination device 1020 of FIG. 10.

The first device 1010 includes an encoder 1104, the interleaving system 1014, a plurality of modulators 1102a-1102c, a plurality of transmission (TX) circuits 1110a-1110c, and a plurality of antennas 1112a-1112c. The destination device 1020 includes a plurality of antennas 1114a-1114c, a plurality of receive (RX) circuits 1116a-1116c, a MIMO detector 1118, and a decoder 1120.

A bit sequence can be provided to the encoder 1104. The encoder 1104 can be configured to encode the bit sequence. For example, the encoder 1104 can be configured to apply a forward error correcting (FEC) code to the bit sequence. The FEC code can be a block code, a convolutional code (e.g., a binary convolutional code), etc. The encoded bit sequence can be provided to the interleaving system 1014.

The interleaving system 1014 can include a stream parser 1106 and a plurality of spatial stream interleavers 1108a-1108c. The stream parser 1106 can be configured to parse the encoded bit stream from the encoder 1104 to the plurality of spatial stream interleavers 1108a-1108c.

Each interleaver 1108a-1108c can be configured to perform frequency interleaving.

For example, the stream parser 1106 can output blocks of coded bits per symbol for each spatial stream. Each block can be interleaved by a corresponding interleaver 1108a-1108c that writes to rows and reads out columns. The number of columns (Ncol), or the interleaver depth, can be based on the number of data tones (Ndata). The number of rows (Nrow) can be a function of the number of columns (Ncol) and the number of data tones (Ndata). For example, the number of rows (Nrow) can be equal to the number of data tones (Ndata) divided by the number of columns (Ncol) (e.g., Nrow=Ndata/Ncol).

LTF for 160 MHz PPDU

In various embodiments, 160 MHz transmissions can be organized in a similar manner as the 80 MHz transmissions 800 of FIG. 8A. For example, the 160 MHz transmissions can include two 80 MHz segments 800. In various embodiments, each 80 MHz segment 800 can include rotation on a per-segment basis. This approach can result in a worst-case PAPR greater than 9 dB for 4× implementations and greater than 8.7 dB for 2× implementations. In other embodiments, rotation can be applied on a per-RU basis. For example, rotation can be applied on each 242-tone block and the central 26-tone block shown in FIG. 8A. This approach can advantageously lower LTF PAPR over the entire 160 MHz transmission.

Although FIG. 8A shows five example 80 MHz segments 800 (from which 160 MHz transmissions can be formed) using various combinations of 26-, 52-, 106-, 107-, 242- and 996-tone blocks, allocations within any given transmission can include multiple tone blocks of different sizes, having different arrangements, in various embodiments. For example, 484-tone blocks can replace sets of two 242-tone blocks (which can be referred to as 2×242-tone blocks). As another example a 1992-tone SU "whole bandwidth" transmission can replace sets of two 996-tone blocks (which can be referred to as 2×996-tone blocks). In certain embodiments (e.g., 80+80 Mhz), 2×996-tone blocks can be disregarded.

Each 160 MHz transmission can be a duplicate of two 80 MHz transmissions, with or without rotation applied, which in various embodiments, can be the 80 MHz transmissions 800 of FIG. 8A or any other 80 MHz transmission discussed herein. Additionally or alternatively, each 160 MHz transmissions can be a duplicate of eight 20 MHz transmissions 750, which in various embodiments, can be the 20 MHz transmissions 600 of FIG. 6A or any other 20 MHz transmission discussed herein. Additionally or alternatively, each 160 MHz transmission can be a duplicate of four 40 MHz transmissions 850, which in various embodiments, can be the 40 MHz transmissions 700 of FIG. 7A or any other 40 MHz transmission discussed herein.

In one 4×HE-LTF embodiment, a 160 MHz 2015-tone LTF (including 23 DC tones) can be formed as LTF160 MHz=[LTF80 MHz_firstsegment996_4×, zeros(1, 23), LTF80 MHz_secondsegment996_4×]. Each 80 MHz 4×996-tone segment (LTF80 MHz_firstsegment996_4× and LTF80 MHz_secondsegment996_4×) can be formed by applying one or more rotation sequences A1-A5 and B1-B5 to one or more of the following base sequences Qa=[+1, +1, +1, +1, +1, +1, −1, +1, +1, +1, −1, +1, +1, −1, +1, −1, −1, +1, +1, −1, +1, −1], Qap=[+1, +1, +1, +1, +1, −1, −1, +1, +1, +1, −1, +1, +1, −1, −1, −1, +1, −1, +1, +1, −1, +1, +1, +1, −1, +1, −1, +1, −1], Qac=Qa with even indices reversed, Qapc=Qap with even indices reversed, Qb=[+1, +1, +1, +1, −1, −1, +1, +1, +1, +1, −1, +1, +1, −1, −1, −1, +1, −1, +1, +1, −1, +1, +1, −1, +1, −1, +1], Qbp=[+1, +1, +1, +1, −1, −1, +1, +1, +1, +1, −1, +1, +1, −1, −1, −1, +1, −1, +1, +1, −1, +1, +1, +1, −1, +1], Qbc=Qb with even indices reversed, Qbpc=Qbp with even indices reversed, and Qc=[+1, −1, +1, −1, +1, +1, −1, −1, −1, +1, +1, +1, +1, +1, +1, −1, +1, +1, −1, +1, +1, −1, −1, +1, +1, +1, +1, −1, −1, +1, +1, −1]. As used herein, "with even indices reversed" means that, for example, Qac(1)=Qa(1), Qac(2)=Qa(2)*(−1), Qac(3)=Qa(3), Qac(4)=Qa(4)*(−1), and so on, and where Vector(x) is the xth bit of Vector.

The first 80 MHz 4×996-tone segment can be formed as LTF80 MHz_firstsegment996_4×=[B1*[+1, Qac, −Qapc, −1, −1, Qa, Qap, −1, Qb, +1, −Qac, Qapc, −1, +1, Qa, Qap, −1], B2*[+1, −Qac, Qapc, −1, +1, −Qa, −Qap, +1, Qb, +1, −Qac, Qapc, −1, −1, Qa, Qap, −1], B3*[−Qc(1:13), +1, 0, 0, 0, 0, 0, +1, −Qc(14:26)], B4*[+1, −Qbc, Qbpc, +1, −1, −Qb, −Qbp, −1, −Qap, +1, Qbc, −Qbpc, −1, +1, −Qb, −Qbp, +1], B5*[+1, Qbc, −Qbpc, −1, +1, Qb, Qbp, −1, −Qap, −1, Qbc, −Qbpc, −1, +1, −Qb, −Qbp, +1]].

The second 80 MHz 4×996-tone segment can be formed as LTF80 MHz_secondsegment996_4×=[A1*[+1, Qac, −Qapc, −1, −1, Qa, Qap, −1, Qb, +1, −Qac, Qapc, −1, +1, Qa, Qap, −1], A2*[+1, −Qac, Qapc, −1, +1, −Qa, −Qap, +1, Qb, +1, −Qac, Qapc, −1, −1, Qa, Qap, −1], A3*[−Qc(1:13), +1, 0, 0, 0, 0, 0, +1, −Qc(14:26)], A4*[+1, −Qbc, Qbpc, +1, −1, −Qb, −Qbp, −1, −Qap, +1, Qbc, −Qbpc, −1, +1, −Qb, −Qbp, +1], A5*[+1, Qbc, −Qbpc, −1, +1, Qb, Qbp, −1, −Qap, −1, Qbc, −Qbpc, −1, +1, −Qb, −Qbp, +1]].

In various embodiments, the following sets of rotation patterns A1-A5 and B1-B5 can advantageously provide the worst-case 160 MHz PAPRs of 7.2673 dB: [A1, A2, A3, A4, A5]=[+1, +1, +1, −1, −1] and [B1, B2, B3, B4, B5]=[+1, +1, +1, +1, +1], [A1, A2, A3, A4, A5]=[+1, +1, +1, +1, +1] and [B1, B2, B3, B4, B5]=[−1, −1, −1, +1, +1], [A1, A2, A3, A4, A5]=[+1, +1, −1, +1, +1] and [B1, B2, B3, B4, B5]=[+1, +1, +1, −1, −1], [A1, A2, A3, A4, A5]=[−1, −1, +1, −1, −1] and [B1, B2, B3, B4, B5]=[+1, +1, +1, −1, −1], [A1, A2, A3, A4, A5]=[−1, −1, −1, −1, −1] and [B1, B2, B3, B4, B5]=[+1, +1, +1, −1, −1], [A1, A2, A3, A4, A5]=[−1, −1, −1, +1, +1] and [B1, B2, B3, B4, B5]=[+1, +1, −1, +1, +1], [A1, A2, A3, A4, A5]=[+1, +1, +1, −1, −1] and [B1, B2, B3, B4, B5]=[−1, −1, +1, −1, −1], [A1, A2, A3, A4, A5]=[+1, +1, −1, +1, +1] and [B1, B2, B3, B4, B5]=[−1, −1, −1, +1, +1], [A1, A2, A3, A4, A5]=[−1, −1, +1, −1, −1] and [B1, B2, B3, B4, B5]=[−1, −1, −1, +1, +1], [A1, A2, A3, A4, A5]=[−1, −1, −1, +1, +1] and [B1, B2, B3, B4, B5]=[−1, −1, −1, −1, −1]. In various embodiments, (for example, shown in the first two sets of rotation patterns above), one 80 MHz segment can be fixed without applying any rotation.

These rotation patterns can advantageously provide the worst-case PAPRs for various combinations of RU-sizes as shown in FIG. 12A. Note that FIG. 12A shows only PAPRs RUs larger than 242 tones. 242-tone RUs and smaller can have the same PAPRs as discussed above with respect to the 80 MHz transmissions of FIGS. 8A-8E. Thus, the third row of FIG. 12A shows worst-case PAPRs (in dB) for each 2×242-tone RU. The fourth row of FIG. 12A shows worst-case PAPRs (in dB) for each 996-tone RU. The fifth row of FIG. 12A shows worst-case PAPRs (in dB) for a single-user "whole bandwidth" tone plan.

In one 2×HE-LTF embodiment, a 160 MHz 1013-tone LTF (including 11 DC tones) can be formed as LTF160 MHz=[LTF80 MHz_firstsegment996_2×, zeros(1, 11), LTF80 MHz_secondsegment996_2×]. Each 80 MHz 2×996-tone segment (LTF80 MHz_firstsegment996_2× and LTF80 MHz_secondsegment996_2×) can be formed by applying one or more rotation sequences A1-A5 and B1-B5 to one or more of the following base sequences Sa=[+1, +1, +1, −1, +1, +1, +1, −1, +1, −1, −1, +1, −1], Sap=[+1, +1, −1, −1, +1, +1, +1, −1, +1, +1, −1, +1, −1], Sac=Sa with even indices reversed, Sapc=Sap with even indices reversed, Sb=[+1, +1, +1, −1, −1, −1, +1, −1, −1, −1, +1, +1, −1], Sbp=[+1, +1, +1, +1, −1, −1, −1, +1, −1, −1, +1, +1, −1], Sbc=Sb with even indices reversed, Sbpc=Sbp with even indices reversed, and Sc=[+1, −1, −1, −1, +1, +1, +1, +1, −1, −1, +1, +1, −1, +1].
As used herein, "with even indices reversed" means that, for example, Sac(1)=Sa(1), Sac(2)=Sa(2)*(−1), Sac(3)=Sa(3), Sac(4)=Sa(4)*(−1), and so on, and where Vector(x) is the xth bit of Vector. As used herein, "zeros" is a vector of zeros, and vector indices are indicated in parentheses. Thus, for example, zeros(1, 11) constitutes 11 zeros, Sa(1) constitutes the first index value of the vector Sa, Sc(8:14) constitutes the eighth through fourteenth index values of the vector Sc, and so on.

The first 80 MHz 2×996-tone segment can be formed as LTF80 MHz_firstsegment996_2×=[B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1]].

The second 80 MHz 2×996-tone segment can be formed as LTF80 MHz_secondsegment996_2×=[A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]].

In various embodiments, the following sets of rotation patterns A1-A5 and B1-B5 can advantageously provide the worst-case 160 MHz PAPRs of 6.7151 dB, 6.8629 dB, and 6.9880 dB, respectively: [A1, A2, A3, A4, A5]=[+1, −1, +1, +1, −1] and [B1, B2, B3, B4, B5]=[+1, +1, +1, +1, +1]; [A1, A2, A3, A4, A5]=[+1, +1, +1, +1, +1] and [B1, B2, B3, B4, B5]=[−1, +1, −1, −1, +1] (assuming fixing the second segment as regular 80 MHz LTF sequence without rotation); and [A1, A2, A3, A4, A5]=[+1, +1, +1, −1, −1] and [B1, B2, B3, B4, B5]=[+1, +1, +1, +1, +1] (assuming fixing the first segment as regular 80 MHz LTF sequence without rotation, and applying rotation to the second segment cut at a center 26-tone block boundary).

The first set of rotations patterns above can advantageously provide the worst-case PAPRs for various combinations of RU-sizes as shown in FIG. 12B. Note that FIG. 12B shows only PAPRs RUs larger than 242 tones. 242-tone RUs and smaller can have the same PAPRs as discussed above with respect to the 80 MHz transmissions of FIGS. 8A-8E. Thus, the third row of FIG. 12B shows worst-case PAPRs (in dB) for each 2×242-tone RU. The fourth row of FIG. 12B shows worst-case PAPRs (in dB) for each 996-tone RU. The fifth row of FIG. 12B shows worst-case PAPRs (in dB) for a single-user "whole bandwidth" tone plan.

The second set of rotations patterns above can advantageously fix the second 80 MHz segment without rotation, and can provide the worst-case PAPRs for various combinations of RU-sizes as shown in FIG. 12C. Note that FIG. 12C shows only PAPRs RUs larger than 242 tones. 242-tone RUs and smaller can have the same PAPRs as discussed above with respect to the 80 MHz transmissions of FIGS. 8A-8E. Thus, the third row of FIG. 12C shows worst-case PAPRs (in dB) for each 2×242-tone RU. The fourth row of FIG. 12A shows worst-case PAPRs (in dB) for each 996-tone RU. The fifth row of FIG. 12A shows worst-case PAPRs (in dB) for a single-user "whole bandwidth" tone plan.

The third set of rotations patterns above can advantageously fix the first 80 MHz segment without rotation, and can provide the worst-case PAPRs for various combinations of RU-sizes as shown in FIG. 12D. In an embodiment, the third set of rotation patterns above can apply rotation to the second segment cut at a center 26-tone block boundary (for example, where the tone plan includes a first 242-tone block, followed by a second 242-tone block, followed by a center 26-tone block, followed by a third 242-tone block, followed by a fourth 242-tone block, the second segment rotation can be applied starting at the boundary between the center 26-tone block and the third 242-tone block). Note that FIG. 12C shows only PAPRs RUs larger than 242 tones. 242-tone RUs and smaller can have the same PAPRs as discussed above with respect to the 80 MHz transmissions of FIGS. 8A-8E. Thus, the third row of FIG. 12C shows worst-case PAPRs (in dB) for each 2×242-tone RU. The fourth row of FIG. 12A shows worst-case PAPRs (in dB) for each 996-tone RU. The fifth row of FIG. 12A shows worst-case PAPRs (in dB) for a single-user "whole bandwidth" tone plan. As will be apparent from the foregoing discussion of 160 MHz LTFs, 80+80 MHz LTFs can be similarly formed using duplicates of 80 MHz LTFs. Accordingly, in one embodiment, an 80+80 MHz 1013-tone LTF (including 11 DC tones) can be formed as LTF160 MHz=[LTF80 MHz_firstsegment996_2×, zeros(1, 11), LTF80 MHz_secondsegment996_2×].

Implementing Technology

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

As used herein, a phrase referring to "at least one of" a list of items refers to any combination of those items, including single members. As a first example, "at least one of a and b" (also "a or b") is intended to cover a, b, and a-b, as well as any combination with multiples of the same element (e.g., a-a, a-a-a, a-a-b, a-b-b, b-b, b-b-b, or any other ordering of a and b). As a second example, "at least one of: a, b, and c" (also "a, b, or c") is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. An apparatus configured to communicate over a wireless communication network, the apparatus comprising:
   a memory that stores instructions; and
   a processor coupled with the memory and configured to execute the instructions to generate a high-efficiency long training (HE-LTF) field according to at least one of:
   [Ga, c1, c2.*Ga, c3, c4, c5, c6, c7, c8, c9, c10, 0, c11, c12, c13, c14, c15, c16, c17, c18, c19.*Gb, c20, c21.*Gb] for transmission over a 40 MHz channel, wherein Ga=[+1, +1, +1, +1, −1, +1, +1, −1, −1, +1, −1, +1, −1, +1, −1, −1, +1, −1, +1, +1, +1, −1, −1, +1, +1, +1], Gb=[+1, +1, +1, +1, −1, +1, +1, −1, −1, +1, −1, +1, +1, +1, +1, +1, −1, +1, −1, −1, −1, +1, +1, −1, −1, −1], and [c1, c2, c3, c4, c5, c6, c7, c8, c9, c10, c11, c12, c13, c14, c15, c16, c17, c18, c19, c20, c21]=[+1, +1, +1, −1, +1, −1, +1, −1, −1, −1, +1, +1, −1, −1, +1, −1, +1, +1, +1, +1, −1];
   [+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1] for transmission over a 40 MHz channel, wherein M2=[+1, +1, +1, +1, +1, −1, −1, +1, +1, −1, +1, −1, +1], M22=[M2(1:7), −M2(8:13)], and M23=[−M2(1:6), M2(7:13)];
   [+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1] for transmission over a 40 MHz channel;
   [B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for transmission over a 160 MHz channel, wherein [A1, A2, A3, A4, A5]=[+1, −1, +1, +1, −1], [B1, B2, B3, B4, B5]=[+1, +1, +1, +1, +1], Sa=[+1, +1, +1, −1, +1, +1, +1, −1, +1, −1, −1, +1, −1], Sap=[+1, +1, −1, −1, +1, +1, +1, −1, +1, +1, −1, +1, −1], Sac=Sa with even indices reversed, Sapc=Sap with even indices reversed, Sb= [+1, +1, +1, −1, −1, −1, −1, +1, −1, −1, −1, +1, −1], Sbp=[+1, +1, +1, +1, −1, −1, −1, +1, −1, −1, +1, +1, −1], Sbc=Sb with even indices reversed, Sbpc=Sbp with even indices reversed, and Sc=[+1, −1, −1, −1, +1, +1, +1, +1, −1, −1, +1, +1, −1, +1]; or

[B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1], 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for transmission over an 80+80 MHz channel; and a transmitter configured to transmit a packet including the HE-LTF field.

2. The apparatus of claim 1, wherein a plurality of pilot tones are multiplied by an R-value, all other tones are multiplied by a P-value, and the rotation pattern C comprises a sequence that minimizes a maximal peak-to-average power ratio of the HE-LTF over all possible P- and R-values.

3. The apparatus of claim 1, wherein the processor is configured to generate the HE-LTF field based on the sequence [Ga, c1, c2.*Ga, c3, c4, c5, c6, c7, c8, c9, c10, 0, d1, c12, c13, c14, c15, c16, c17, c18, c19.*Gb, c20, c21.*Gb] for 1× transmission over the 40 MHz channel.

4. The apparatus of claim 3, wherein the sequence [Ga, c1, c2.*Ga, c3, c4, c5, c6, c7, c8, c9, c10, 0, c11, c12, c13, c14, c15, c16, c17, c18, c19.*Gb, c20, c21.*Gb] is [+1, +1, +1, +1, −1, +1, +1, −1, −1, +1, −1, +1, −1, +1, −1, −1, +1, −1, +1, +1, +1, −1, −1, +1, +1, +1, +1, +1, +1, +1, +1, +1, −1, +1, +1, −1, −1, +1, −1, +1, −1, +1, −1, −1, +1, −1, +1, +1, +1, −1, −1, +1, +1, +1, +1, −1, +1, −1, +1, −1, −1, −1, 0, +1, +1, −1, −1, +1, −1, +1, +1, +1, +1, +1, +1, −1, +1, +1, −1, −1, +1, −1, +1, +1, +1, +1, −1, +1, −1, −1, −1, +1, +1, −1, −1, +1, −1, +1, −1, −1, −1, −1, +1, −1, +1, +1, −1, −1, −1, −1, +1, +1, +1, −1, −1, +1, +1, +1] and indicates every fourth value of the HE-LTF field, which is [+1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, −1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, −1, 0, 0, 0, −1, 0, 0, 0, −1, 0, 0, 0, +1, 0, 0, 0, +1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, +1].

5. The apparatus of claim 1, wherein the processor is configured to generate the HE-LTF field based on the sequence [+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1] for 2× transmission over a 40 MHz channel.

6. The apparatus of claim 5, wherein the sequence [+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1] is [+1, −1, −1, −1, −1, −1, +1, +1, −1, −1, +1, −1, +1, −1, −1, −1, −1, −1, −1, +1, +1, +1, +1, −1, +1, −1, +1, −1, −1, −1, −1, −1, +1, +1, −1, −1, +1, −1, +1, −1, +1, +1, +1, +1, −1, −1, −1, −1, +1, −1, +1, −1, +1, +1, +1, +1, +1, −1, +1, −1, −1, +1, −1, +1, −1, −1, +1, +1, +1, +1, −1, −1, +1, +1, +1, +1, −1, −1, +1, −1, +1, −1, +1, +1, +1, +1, +1, −1, −1, −1, −1, +1, −1, +1, −1, −1, −1, −1, −1, −1, −1, +1, +1, −1, −1, +1, −1, +1, −1, +1, +1, +1, +1, +1, −1, −1, −1, −1, +1, −1, +1, −1, 0, 0, 0, −1, −1, −1, −1, −1, +1, +1, −1, −1, +1, −1, +1, −1, −1, −1, −1, −1, −1, +1, +1, +1, +1, +1, +1, +1, +1, −1, −1, +1, +1, −1, −1, +1, −1, −1, −1, −1, +1, −1, +1, +1, +1, −1, −1, +1, +1, +1, +1, +1, +1, +1, −1, +1, +1, +1, −1, −1, +1, −1, +1, −1, +1, −1, −1, +1, −1, −1, −1, −1, +1, −1, +1, −1, +1, −1, −1, −1, −1, +1, −1, +1, −1, +1, −1, −1, +1, +1, −1, +1, −1, +1, −1, −1, −1, −1, −1, +1, +1, −1, +1, −1, −1, +1, −1, +1, −1, +1] and indicates every other value of the HE-LTF field, which is [+1, 0, −1, 0, −1, 0, −1, 0, −1, 0, −1, 0, +1, 0, +1, 0, −1, 0, −1, 0, +1, 0, −1, 0, +1, 0, −1, 0, −1, 0, −1, 0, −1, 0, −1, 0, +1, 0, +1, 0, +1, 0, +1, 0, −1, 0, +1, 0, −1, 0, +1, 0, −1, 0, +1, 0, −1, 0, +1, 0, −1, 0, −1, 0, −1, 0, +1, 0, +1, 0, −1, 0, −1, 0, +1, 0, +1, 0, −1, 0, −1, 0, +1, 0, +1, 0, +1, 0, +1, 0, +1, 0, −1, 0, −1, 0, +1, 0, −1, 0, +1, 0, +1, 0, +1, 0, +1, 0, −1, 0, −1, 0, −1, 0, +1, 0, −1, 0, +1, 0, +1, 0, −1, 0, −1, 0, +1, 0, −1, 0, −1, 0, +1, 0, +1, 0, +1, 0, −1, 0, −1, 0, +1, 0, −1, 0, +1, 0, −1, 0, +1, 0, −1, 0, +1, 0, −1, 0, −1, 0, +1, 0, −1, 0, +1, 0, −1, 0, +1, 0, +1, 0, +1, 0, +1, 0, −1, 0, −1, 0, 0, 0, 0, 0, 0, 0, −1, 0, −1, 0, −1, 0, −1, 0, −1, 0, +1, 0, +1, 0, −1, 0, −1, 0, +1, 0, −1, 0, +1, 0, −1, 0, −1, 0, −1, 0, −1, 0, −1, 0, +1, 0, +1, 0, +1, 0, +1, 0, −1, 0, +1, 0, +1, 0, +1, 0, +1, 0, +1, 0, −1, 0, −1, 0, +1, 0, +1, 0, −1, 0, +1, 0, −1, 0, +1, 0, −1, 0, −1, 0, −1, 0, +1, 0, −1, 0, −1, 0, +1, 0, +1, 0, +1, 0, +1, 0, +1, 0, +1, 0, −1, 0, +1, 0, +1, 0, +1, 0, +1, 0, +1, 0, +1, 0, +1, 0, +1, 0, −1, 0, +1, 0, −1, 0, −1, 0, +1, 0, +1, 0, −1, 0, +1, 0, −1, 0, −1, 0, +1, 0, −1, 0, −1, 0, +1, 0, −1, 0, +1, 0, +1, 0, −1, 0, +1, 0, −1, 0, +1, 0, +1, 0, −1, 0, +1, 0, −1, 0, −1, 0, +1, 0, +1, 0, −1, 0, −1, 0, +1, 0, +1, 0, −1, 0, +1, 0, −1, 0, −1, 0, +1, 0, +1, 0, −1, 0, +1, 0, +1, 0, +1, 0, +1, 0, +1, 0, −1, 0, +1, 0, −1, 0, −1, 0, +1, 0, −1, 0, +1, 0, −1, 0, +1].

7. The apparatus of claim 1, wherein the processor is configured to generate the HE-LTF field based on the sequence [+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1] for 4× transmission over a 40 MHz channel.

8. The apparatus of claim 7, wherein the sequence [+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1] is [+1, −1, −1, −1,
−1, +1, −1, −1, +1, +1, −1, +1, −1, +1, −1, +1, +1, −1, +1,
−1, −1, −1, +1, +1, −1, −1, −1, −1, −1, −1, −1, +1, −1, −1,
+1, +1, −1, +1, −1, −1, −1, −1, +1, −1, +1, +1, +1, −1,
−1, +1, +1, +1, −1, −1, +1, +1, +1, +1, −1, +1, +1, −1, −1,
+1, −1, +1, −1, +1, −1, −1, +1, −1, +1, +1, −1, −1, +1,
+1, +1, −1, −1, −1, −1, −1, +1, −1, +1, +1, −1, +1, −1,
−1, −1, −1, +1, −1, +1, +1, +1, −1, −1, +1, +1, +1, +1,
+1, +1, +1, −1, +1, +1, −1, +1, −1, +1, +1, +1, +1, +1,
−1, +1, −1, −1, −1, +1, +1, −1, −1, −1, −1, −1, −1, −1,
+1, −1, −1, +1, +1, −1, −1, +1, −1, +1, +1, −1, +1, −1,
−1, +1, −1, +1, −1, −1, −1, −1, −1, +1, −1, −1, +1, −1,
+1, −1, +1, −1, −1, −1, −1, −1, +1, +1, −1, +1, −1, −1,
+1, +1, +1, −1, −1, −1, −1, −1, −1, +1, −1, −1, +1, +1, −1,
+1, −1, +1, −1, +1, −1, −1, +1, −1, −1, +1, +1, −1, −1,
−1, +1, +1, +1, +1, −1, +1, +1, −1, −1, +1, −1, +1, +1,
+1, +1, −1, +1, −1, −1, −1, +1, +1, −1, −1, −1, +1, 0, 0, 0,
0, 0, −1, +1, +1, +1, +1, −1, +1, +1, −1, −1, +1, −1, +1, −1,
+1, −1, −1, −1, +1, −1, +1, +1, +1, −1, −1, +1, +1, +1, +1,
+1, +1, −1, +1, −1, +1, +1, −1, +1, +1, +1, +1, +1, −1,
+1, −1, −1, −1, +1, +1, −1, −1, +1, +1, −1, −1, −1, −1,
+1, −1, −1, +1, +1, −1, −1, +1, +1, +1, +1, −1, −1, −1,
−1, −1, +1, −1, −1, −1, +1, +1, +1, +1, −1, +1, +1, −1,
−1, −1, −1, +1, +1, +1, −1, +1, −1, −1, −1, −1, +1, +1,
−1, −1, −1, +1, −1, −1, −1, +1, +1, +1, −1, −1, −1, −1,
−1, +1, −1, −1, +1, +1, −1, −1, −1, +1, +1, −1, +1, −1,
+1, −1, −1, −1, +1, −1, +1, +1, +1, −1, −1, −1, +1, −1,
+1, +1, +1, −1, −1, +1, +1, −1, +1, −1, −1, −1, −1, +1,
−1, −1, +1, −1, +1, −1, +1, +1, +1, −1, +1, −1, −1, −1,
−1, +1, +1, −1, −1, −1, +1, +1, +1, −1, +1, +1, +1, −1,
+1, −1, +1, +1, +1, +1, +1, −1, +1, −1, −1, −1, +1, −1,
−1, −1, −1] and indicates values of the HE-LTF field.

9. The apparatus of claim 1, wherein the processor is configured to generate the HE-LTF field based on the sequence [B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for 2× transmission over the 160 MHz channel.

10. The apparatus of claim 1, wherein the processor is configured to generate the HE-LTF field based on the sequence [B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for 2× transmission over the 80+80 MHz channel.

11. A method of communicating over a wireless communication network, the method comprising:

generating a high-efficiency long training (HE-LTF) field according to at least one of:

[Ga, c1, c2.*Ga, c3, c4, c5, c6, c7, c8, c9, c10, 0, c11, c12, c13, c14, c15, c16, c17, c18, c19.*Gb, c20, c21.*Gb] for transmission over a 40 MHz channel, wherein Ga=[+1, +1, +1, +1, −1, +1, +1, −1, −1, +1, −1, +1, −1, +1, −1, −1, +1, −1, +1, +1, +1, −1, −1, +1, +1, +1], Gb=[+1, +1, +1, +1, −1, +1, +1, −1, −1, +1, −1, +1, +1, +1, +1, +1, −1, +1, −1, −1, −1, +1, +1, −1, −1, −1], and [c1, c2, c3, c4, c5, c6, c7, c8, c9, c10, c11, c12, c13, c14, c15, c16, c17, c18, c19, c20, c21]=[+1, +1, +1, −1, +1, −1, +1, −1, −1, −1, +1, +1, −1, −1, +1, −1, +1, +1, +1, +1, −1];

[+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1] for transmission over a 40 MHz channel, wherein M2=[+1, +1, +1, +1, +1, −1, −1, +1, +1, −1, +1, −1, +1], M22=[M2(1:7), −M2(8:13)], and M23=[−M2(1:6), M2(7:13)];

[+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1] for transmission over a 40 MHz channel;

[B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for transmission over a 160 MHz channel, wherein [A1, A2, A3, A4, A5]=[+1, −1, +1, +1, −1], [B1, B2, B3, B4, B5]=[+1, +1, +1, +1, +1], Sa=[+1, +1, +1, −1, +1, +1, +1, −1, +1, −1, −1, +1, −1], Sap=[+1, +1, −1, −1, +1, +1, +1, −1, +1, +1, −1, +1, −1], Sac=Sa with even indices reversed, Sapc=Sap with even indices reversed, Sb=[+1, +1, +1, −1, −1, −1, +1, −1, −1, +1, −1], Sbp=[+1, +1, +1, +1, −1, −1, −1, +1, −1, −1, +1, +1, −1], Sbc=Sb with even indices reversed, Sbpc=Sbp with even indices reversed, and Sc=[+1, −1, −1, −1, +1, +1, +1, +1, −1, −1, +1, +1, −1, +1]; or

[B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for transmission over an 80+80 MHz channel; and transmitting a packet including the HE-LTF field.

12. The method of claim 11, wherein a plurality of pilot tones are multiplied by an R-value, all other tones are multiplied by a P-value, and the rotation pattern C comprises a sequence that minimizes a maximal peak-to-average power ratio of the HE-LTF over all possible P- and R-values.

13. The method of claim 11, wherein generating the HE-LTF field comprises generating the HE-LTF field based on the sequence [Ga, c1, c2.*Ga, c3, c4, c5, c6, c7, c8, c9, c10, 0, c11, c12, c13, c14, c15, c16, c17, c18, c19.*Gb, c20, c21.*Gb] for 1× transmission over the 40 MHz channel.

14. The method of claim 13, wherein the sequence [Ga, c1, c2.*Ga, c3, c4, c5, c6, c7, c8, c9, c10, 0, c11, c12, c13, c14, c15, c16, c17, c18, c19.*Gb, c20, c21.*Gb] is [+1, +1, +1, +1, −1, +1, +1, −1, −1, +1, −1, +1, −1, +1, −1, +1, −1, +1, +1, +1, −1, −1, +1, +1, +1, +1, +1, +1, +1, −1, +1, +1, −1, −1, +1, −1, +1, −1, +1, −1, −1, +1, −1, +1, +1, +1, −1, −1, +1, +1, +1, +1, −1, +1, −1, +1, −1, −1, −1, 0, +1, +1, −1, −1, +1, −1, +1, +1, +1, +1, +1, +1, −1, +1, +1, −1, −1, +1, −1, +1, +1, +1, +1, +1, −1, +1, −1, −1, −1, +1, +1, −1, −1, −1, +1, −1, −1, −1, −1, +1, −1, −1, +1, +1, −1, +1, −1, −1, −1, −1, −1, +1, −1, +1, +1, +1, −1, −1, +1, +1, +1] and indicates every fourth value of the HE-LTF field, which is [+1, 0, 0, 0, +1, 0, 0, 0, +1, 0, 0, 0, +1, 0, 0, 0, −1, 0, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, +1, 0, 0, 0, +1, 0, 0, 0, +1, 0, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, −1, 0, 0, 0, −1, 0, 0, 0, 0, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, +1, 0, 0, 0, +1, 0, 0, 0, +1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, +1, 0, 0, 0, +1, 0, 0, 0, +1, 0, 0, 0, −1, 0, 0, 0, +1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, −1, 0, 0, 0, −1, 0, 0, 0, +1, 0, 0, 0, −1, 0, 0, 0, −1, 0, 0, 0, +1, 0, 0, 0, −1, 0, 0, 0, +1, 0, 0, 0, +1, 0, 0, 0, −1, 0, 0, 0, −1, 0, 0, 0, +1, 0, 0, 0, +1, 0, 0, 0, +1].

15. The method of claim 11, wherein generating the HE-LTF field comprises generating the HE-LTF field based on the sequence [+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1] for 2× transmission over a 40 MHz channel.

16. The method of claim 15, wherein the sequence [+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1] is [+1, −1, −1, −1, −1, −1, +1, +1, −1, −1, +1, −1, +1, −1, −1, −1, −1, −1, +1, +1, +1, −1, +1, −1, +1, +1, −1, −1, −1, −1, +1, −1, +1, +1, +1, −1, −1, +1, +1, +1, −1, −1, +1, −1, −1, −1, −1, +1, +1, −1, −1, −1, −1, +1, +1, +1, +1, +1, +1, −1, +1, −1, −1, −1, −1, −1, +1, +1, +1, +1, +1, −1, +1, −1, −1, +1, +1, −1, −1, +1, +1, +1, +1, +1, −1, −1, −1, −1, −1, −1, −1, −1, −1, −1, −1, −1, −1, +1, +1, −1, −1, +1, +1, −1, +1, +1, +1, +1, +1, +1, −1, −1, −1, +1, −1, +1, −1, 0, 0, 0, −1, −1, −1, −1, −1, +1, +1, +1, +1, +1, −1, −1, −1, −1, −1, +1, +1, +1, +1, +1, +1, +1, +1, +1, +1, −1, +1, +1, −1, +1, −1, −1, −1, −1, −1, −1, −1, +1, −1, −1, +1, +1, +1, +1, +1, +1, −1, +1, −1, +1, +1, −1, +1, −1, +1, −1, −1, −1, −1, −1, +1, −1, +1, −1, −1, −1, −1, −1, −1, +1, −1, +1, −1, −1, −1, −1, −1, +1, +1, −1, +1, −1, +1, +1, −1, −1, −1, −1, +1, −1, +1, +1, −1, −1, +1, +1, +1, +1, +1, +1, +1, +1, −1, +1, +1, +1, +1, −1, −1, +1, +1, −1, +1, +1, −1, −1, +1, −1, +1, −1, −1, +1, +1, +1, +1, +1, +1, +1, +1, +1, +1, +1, +1, +1, +1, −1, +1, +1, +1, +1, −1, −1, +1, −1, +1, +1, −1, −1, −1, +1, +1, −1, −1, +1, −1, +1, +1, −1, −1, −1, +1, +1, −1, −1, +1, +1, −1, −1, +1, +1, −1, −1, +1, +1, −1, −1, +1, −1, +1, +1, −1, +1, +1, −1, −1, +1, −1, −1, +1, +1, −1, −1, +1, +1, +1, −1, +1, −1, +1, +1, −1, +1, −1, +1, +1, +1, +1, +1, −1, +1, +1, −1, −1, +1, +1, −1, +1, +1, −1, −1, +1, −1, +1, −1, −1, −1, −1, +1, −1, −1, +1, +1, −1, +1, −1, +1, −1, −1, −1, −1, +1, −1, −1, +1, +1, −1, +1, −1, +1, +1, −1, −1, +1, +1, −1, −1, −1, +1, +1, +1, +1, +1, −1, +1, +1, +1, +1, +1, +1, −1, −1, +1, +1, +1, −1, −1, −1, −1, +1] and indicates every other value of the HE-LTF field, which is [+1, 0, −1, 0, −1, 0, −1, 0, −1, 0, +1, 0, +1, 0, −1, 0, −1, 0, +1, 0, +1, 0, 0, +1, 0, −1, 0, −1, 0, −1, 0, −1, 0, −1, 0, +1, 0, +1, 0, +1, 0, −1, 0, +1, 0, −1, 0, +1, 0, +1, 0, −1, 0, −1, 0, −1, 0, +1, 0, +1, 0, −1, 0, −1, 0, −1, 0, +1, 0, +1, 0, −1, 0, −1, 0, −1, 0, +1, 0, +1, 0, +1, 0, +1, 0, −1, 0, −1, 0, −1, 0, +1, 0, −1, 0, +1, 0, +1, 0, +1, 0, +1, 0, −1, 0, +1, 0, +1, 0, −1, 0, −1, 0, +1, 0, −1, 0, +1, 0, +1, 0, −1, 0, +1, 0, −1, 0, −1, 0, +1, 0, +1, 0, +1, 0, +1, 0, +1, 0, +1, 0, −1, 0, +1, 0, +1, 0, −1, 0, −1, 0, +1, 0, −1, 0, +1, 0, +1, 0, +1, 0, −1, 0, +1, 0, −1, 0, +1, 0, +1, 0, +1, 0, +1, 0, +1, 0, −1, 0, +1, 0, −1, 0, −1, 0, +1, 0, −1, 0, +1, 0, +1, 0, +1, 0, −1, 0, +1, 0, −1, 0, −1, 0, +1, 0, −1, 0, +1, 0, +1, 0, +1, 0, −1, 0, −1, 0, 0, 0, 0, 0, 0, 0, −1, 0, −1, 0, −1, 0, −1, 0, −1, 0, +1, 0, +1, 0, −1, 0, −1, 0, +1, 0, −1, 0, +1, 0, −1, 0, −1, 0, −1, 0, −1, 0, +1, 0, −1, 0, +1, 0, +1, 0, +1, 0, +1, 0, +1, 0, +1, 0, +1, 0, −1, 0, −1, 0, +1, 0, +1, 0, −1, 0, +1, 0, −1, 0, −1, 0, −1, 0, +1, 0, −1, 0, −1, 0, +1, 0, +1, 0, +1, 0, +1, 0, +1, 0, +1, 0, −1, 0, −1, 0, +1, 0, +1, 0, +1, 0, +1, 0, +1, 0, +1, 0, +1, 0, −1, 0, +1, 0, +1, 0, −1, 0, −1, 0, −1, 0, −1, 0, −1, 0, +1, 0, −1, 0, −1, 0, −1, 0, +1, 0, −1, 0, +1, 0, +1, 0, −1, 0, −1, 0, +1, 0, −1, 0, −1, 0, −1, 0, −1, 0, −1, 0, +1, 0, −1, 0, −1, 0, +1, 0, +1, 0, −1, 0, +1, 0, −1, 0, +1, 0, +1, 0, +1, 0, +1, 0, −1, 0, +1, 0, +1].

17. The method of claim 11, wherein generating the HE-LTF field comprises generating the HE-LTF field based on the sequence [+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1] for 4× transmission over a 40 MHz channel.

18. The method of claim 17, wherein the sequence [+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1] is [+1, −1, −1, −1, −1, +1, −1, +1, +1, −1, +1, −1, +1, +1, −1, −1, −1, −1, +1, +1, −1, +1, −1, +1, −1, +1, +1, −1, +1, −1, −1, −1, +1, +1, −1, −1, −1, −1, −1, −1, −1, −1, +1, −1, −1, +1, +1, −1, +1, −1, −1, +1, +1, −1, +1, −1, +1, −1, +1, +1, −1, +1, +1, −1, −1, −1, −1, −1, −1, −1, +1, −1, −1, −1, +1, −1, +1, −1, −1, −1, −1, −1, +1, +1, +1, −1, −1, +1, +1, −1, −1, −1, −1, −1, −1, +1, +1, +1, −1, +1, +1, −1, −1, +1, +1, −1, −1, −1, −1, +1, +1, −1, −1, +1, +1, +1, +1, +1, +1, −1, +1, −1, −1, +1, +1, −1, −1, −1, −1, +1, −1, +1, −1, −1, +1, +1, −1, −1, −1, −1, −1, −1, −1, −1, +1, −1, −1, +1, −1, −1, +1, +1, −1, +1, +1, −1, −1, +1, +1, +1, −1, −1, +1, +1, +1, +1, −1, +1, +1, −1, −1, +1, −1, +1, −1, +1, −1, −1, +1, −1, −1, +1, +1, −1, −1, −1, +1, −1, +1, +1, −1, +1, −1, −1, −1, +1, 0, 0, 0, 0, 0, −1, +1, +1, +1, +1, −1, +1, +1, −1, −1, +1, −1, +1, −1, +1, −1, −1, +1, −1, +1, +1, +1, +1, −1, −1, +1, +1, +1, +1, +1, +1, −1, +1, +1, −1, −1, +1, −1, +1, +1, −1, −1, −1, −1, +1, −1, −1, −1, −1, +1, −1, −1, −1, −1, +1, −1, +1, −1, +1, +1, −1, −1, +1, +1, −1, +1, +1, +1, +1, +1, +1, +1, +1, −1, +1, +1, +1, +1, +1, +1, −1, −1, −1, +1, +1, −1, −1, −1, +1, +1, +1, +1, −1, +1, −1, −1, +1, −1, −1, −1, +1, −1, +1, −1, −1, +1, +1, +1, −1, −1, −1, +1, +1, +1, +1, +1, −1, +1, +1, −1, −1, +1, −1, +1, −1, −1, +1, +1, −1, +1, −1, −1, +1, −1, −1, −1, −1, +1, −1, +1, +1, −1, −1, −1, −1, +1, −1, +1, −1, +1, +1, −1, −1, +1, −1, +1, −1, +1, +1, −1, −1, −1, +1, −1, −1, −1, −1, +1, −1, −1, −1, −1, +1, −1, +1, −1, +1, +1, −1, +1, −1, −1, −1, +1, +1, −1, −1, −1, −1, −1, −1, −1, +1, −1, −1, +1, +1, −1, +1, −1, −1, −1, −1, +1, −1, +1, +1, +1, −1, −1, +1, +1, −1, +1, −1, −1, −1, +1, −1, −1, +1, +1, −1, +1, +1, +1, −1, +1, −1, +1, −1, −1, −1, +1, −1, −1, +1, +1, −1, −1, +1, +1, +1, +1, −1, +1, −1, −1, −1, +1, −1, +1, −1, +1, +1, +1, +1, +1, +1, −1, +1, −1, −1, −1, +1, +1, −1, −1, −1, −1] and indicates values of the HE-LTF field.

19. The method of claim 11, wherein generating the HE-LTF field comprises generating the HE-LTF field based on the sequence [B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1]], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for 2× transmission over the 160 MHz channel.

20. The method of claim 11, wherein generating the HE-LTF field comprises generating the HE-LTF field based on the sequence [B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1]], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for 2× transmission over the 80+80 MHz channel.

21. An apparatus for communicating over a wireless communication network, the apparatus comprising:

means for generating a high-efficiency long training (HE-LTF) field according to at least one of:

[Ga, c1, c2.*Ga, c3, c4, c5, c6, c7, c8, c9, c10, 0, c11, c12, c13, c14, c15, c16, c17, c18, c19.*Gb, c20, c21.*Gb] for transmission over a 40 MHz channel, wherein Ga=[+1, +1, +1, +1, −1, +1, +1, −1, −1, +1, −1, +1, −1, +1, −1, −1, +1, −1, +1, +1, +1, −1, −1, +1, +1, +1], Gb=[+1, +1, +1, +1, −1, +1, +1, −1, −1, +1, −1, +1, +1, +1, +1, −1, +1, −1, −1, −1, +1, +1, −1, −1, −1], and [c1, c2, c3, c4, c5, c6, c7, c8, c9, c10, c11, c12, c13, c14, c15, c16, c17, c18, c19, c20, c21]=[+1, +1, +1, −1, +1, −1, +1, −1, −1, −1, +1, +1, −1, −1, +1, −1, +1, +1, +1, +1, −1];

[+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1] for transmission over a 40 MHz channel, wherein M2=[+1, +1, +1, +1, +1, −1, −1, +1, +1, −1, +1, −1, +1], M22=[M2(1:7), −M2(8:13)], and M23=[−M2(1:6), M2(7:13)];

[+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1] for transmission over a 40 MHz channel;

[B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1]], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for transmission over a 160 MHz channel, wherein [A1, A2, A3, A4, A5]=[+1, −1, +1, +1, −1], [B1, B2, B3, B4, B5]=[+1, +1, +1, +1, +1], Sa=[+1, +1, +1, −1, +1, +1, +1, −1, +1, −1, −1, +1, −1], Sap=[+1, +1, −1, −1, +1, +1, +1, −1, +1, +1, −1, +1, −1], Sac=Sa with even indices reversed, Sapc=Sap with even indices reversed, Sb=[+1, +1, +1, −1, −1, −1, −1, +1, −1, −1, −1, +1, −1], Sbp=[+1, +1, +1, +1, −1, −1, −1, +1, −1, −1, +1, +1, −1], Sbc=Sb with even indices reversed, Sbpc=Sbp with even indices reversed, and Sc=[+1, −1, −1, −1, +1, +1, +1, +1, −1, −1, +1, +1, −1, +1]; or

[B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1]], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for transmission over an 80+80 MHz channel; and means for transmitting a packet including the HE-LTF field.

22. A non-transitory computer-readable medium comprising code that, when executed, causes an apparatus to:

generate a high-efficiency long training (HE-LTF) field according to at least one of:

[Ga, c1, c2.*Ga, c3, c4, c5, c6, c7, c8, c9, c10, 0, c11, c12, c13, c14, c15, c16, c17, c18, c19.*Gb, c20, c21.*Gb] for transmission over a 40 MHz channel, wherein Ga=[+1, +1, +1, +1, −1, +1, +1, −1, −1, +1, −1, +1, −1, +1, −1, −1, +1, −1, +1, +1, +1, −1, −1, +1, +1, +1], Gb=[+1, +1, +1, +1, −1, +1, +1, −1, −1, +1, −1, +1, +1, +1, +1, −1, +1, −1, −1, −1, +1, +1, −1, −1, −1], and [c1, c2, c3, c4, c5, c6, c7, c8, c9, c10, c11, c12, c13, c14, c15, c16, c17, c18, c19, c20, c21]=[+1, +1, +1, −1, +1, −1, +1, −1, −1, −1, +1, +1, −1, −1, +1, −1, +1, +1, +1, +1, −1];

[+1, −M2, −M22, +1, −M2, M22, −M23, −1, M2, M22, −1, −M2, M22, 0, 0, 0, −M2, M23, +1, M2, M23, +1, M2, −M2, M23, +1, −M2, −M23, +1] for transmission over a 40 MHz channel, wherein M2=[+1, +1, +1, +1, +1, −1, −1, +1, +1, −1, +1, −1, +1], M22=[M2(1:7), −M2(8:13)], and M23=[−M2(1:6), M2(7:13)];

[+1, −Ga, −Gb, −1, −1, Ga, −Gb, +1, Gb, −1, −Ga, −Gb, −1, −1, −Ga, Gb, +1, 0, 0, 0, 0, 0, −1, Ga, Gb, +1, +1, −Ga, Gb, +1, −Ga, +1, −Ga, −Gb, −1, +1, −Ga, Gb, −1] for transmission over a 40 MHz channel;

[B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for transmission over a 160 MHz channel, wherein [A1, A2, A3, A4, A5]=[+1, −1, +1, +1, −1], [B1, B2, B3, B4, B5]=[+1, +1, +1, +1, +1], Sa=[+1, +1, +1, −1, +1, +1, +1, −1, +1, −1, −1, +1, −1], Sap=[+1, +1, −1, −1, +1, +1, +1, −1, +1, +1, −1, +1, −1], Sac=Sa with even indices reversed, Sapc=Sap with even indices reversed, Sb=[+1, +1, +1, −1, −1, −1, −1, +1, −1, −1, −1, +1, −1], Sbp=[+1, +1, +1, +1, −1, −1, −1, +1, −1, −1, +1, +1, −1], Sbc=Sb with even indices reversed, Sbpc=Sbp with even indices reversed, and Sc=[+1, −1, −1, −1, +1, +1, +1, +1, −1, −1, +1, +1, −1, +1]; or

[B1*[+1, Sac, Sapc, +1, Sa, −Sap, Sbc, −1, Sapc, Sac, +1, Sap, −Sa], B2*[+1, −Sa, Sap, −1, Sac, Sapc, Sb, +1, Sap, −Sa, +1, −Sapc, −Sac], B3*[Sc(1:7), 0, 0, 0, Sc(8:14)], B4*[−Sb, −Sbp, −1, −Sbc, Sbpc, −1, Sac, Sbp, Sb, +1, Sbpc, −Sbc, −1], B5*[Sbc, −Sbpc, +1, −Sb, −Sbp, −1, −Sa, Sbpc, −Sbc, +1, −Sbp, −Sb, +1], 0, 0, 0, 0, 0, 0, 0, 0, 0, 0, 0, [A1*[+1, Sac, Sapc, +1, Sa, −Sap, Sbc, −1, Sapc, Sac, +1, Sap, −Sa], A2*[+1, −Sa, Sap, −1, Sac, Sapc, Sb, +1, Sap, −Sa, +1, −Sapc, −Sac], A3*[Sc(1:7), 0, 0, 0, Sc(8:14)], A4*[−Sb, −Sbp, −1, −Sbc, Sbpc, −1, Sac, Sbp, Sb, +1, Sbpc, −Sbc, −1], A5*[Sbc, −Sbpc, +1, −Sb, −Sbp, −1, −Sa, Sbpc, −Sbc, +1, −Sbp, −Sb, +1]] for transmission over an 80+80 MHz channel; and transmit a packet including the HE-LTF field.

\* \* \* \* \*